United States Patent
Gunner

(10) Patent No.: US 10,538,297 B2
(45) Date of Patent: Jan. 21, 2020

(54) SURFBOARD LEASH PLUG ADAPTER WITH MOUNTING MECHANISM FOR DEVICES AND RELATED METHODS

(71) Applicant: Matthew Gunner, Santa Barbara, CA (US)

(72) Inventor: Matthew Gunner, Santa Barbara, CA (US)

(*) Notice: Subject to any disclaimer, the term of this patent is extended or adjusted under 35 U.S.C. 154(b) by 18 days.

(21) Appl. No.: 15/660,966

(22) Filed: Jul. 27, 2017

(65) Prior Publication Data

US 2018/0057123 A1 Mar. 1, 2018

Related U.S. Application Data

(60) Provisional application No. 62/477,128, filed on Mar. 27, 2017, provisional application No. 62/368,088, filed on Jul. 28, 2016.

(51) Int. Cl.

| | |
|---|---|
| *G03B 17/00* | (2006.01) |
| *E05B 73/00* | (2006.01) |
| *F16B 2/10* | (2006.01) |
| *B63B 35/79* | (2006.01) |
| *F16B 2/18* | (2006.01) |
| *F16B 37/04* | (2006.01) |

(Continued)

(52) U.S. Cl.
CPC ............ *B63B 35/85* (2013.01); *F16M 11/10* (2013.01); *F16M 11/14* (2013.01); *F16M 11/2064* (2013.01); *F16M 11/40* (2013.01); *F16M 13/022* (2013.01); *G03B 17/561* (2013.01); *G03B 29/00* (2013.01); *B63B 35/79* (2013.01); *B63B 35/7933* (2013.01); *B63B 35/7936* (2013.01); *B63B 2035/794* (2013.01); *E05B 73/007* (2013.01); *F16B 2/10* (2013.01); *F16B 37/042* (2013.01); *F16M 2200/024* (2013.01); *Y10T 24/1368* (2015.01); *Y10T 24/1397* (2015.01)

(58) Field of Classification Search
CPC . B63B 35/79; B63B 35/7933; B63B 35/7936; B63B 35/85; B63B 2035/794; G03B 17/561; Y10T 24/1397; Y10T 24/1368
USPC ................ 248/690, 689, 205.2, 226.11, 309; 24/3.13, 3.2, 583.1; 441/74, 75; 411/337, 347
See application file for complete search history.

(56) References Cited

U.S. PATENT DOCUMENTS

| | | | | |
|---|---|---|---|---|
| 4,820,220 | A | * | 4/1989 | Fruzzetti ............. B63B 35/7933 24/115 K |
| 4,938,725 | A | * | 7/1990 | Beck ................... B63B 35/7933 441/74 |

(Continued)

OTHER PUBLICATIONS

RAM Leash Plug Adapter, published at least as early as Mar. 18, 2016, available online at http://www.rammount.com/part/RAPB405U.

(Continued)

*Primary Examiner* — Tan Le
(74) *Attorney, Agent, or Firm* — William K. Nelson; Jared E. Christensen

(57) ABSTRACT

An adapter system for attachment to a surfboard leash plug receive bar. The adapter system is able to be secured to and removed from a surfboard without any damage or alteration done to the surfboard. The adapter attaches to the surfboard leash plug and provides a surfboard tail mount for devices, including but not limited to a camera.

22 Claims, 38 Drawing Sheets

(51) Int. Cl.
*B63B 35/85* (2006.01)
*G03B 17/56* (2006.01)
*G03B 29/00* (2006.01)
*F16M 11/14* (2006.01)
*F16M 13/02* (2006.01)
*F16M 11/10* (2006.01)
*F16M 11/40* (2006.01)
*F16M 11/20* (2006.01)

(56) References Cited

U.S. PATENT DOCUMENTS

| | | | |
|---|---|---|---|
| 5,119,649 A * | 6/1992 | Spence | B63B 35/7946 |
| | | | 114/172 |
| 6,688,145 B2 * | 2/2004 | Tan | A63C 11/005 |
| | | | 441/74 |
| 8,014,656 B2 | 9/2011 | Woodman | |
| 8,150,248 B1 | 4/2012 | Woodman | |
| 9,669,906 B2 * | 6/2017 | Carnevali | B63B 35/7933 |
| 2014/0267743 A1 | 9/2014 | Tapia et al. | |

OTHER PUBLICATIONS

YakAttack SUP Leash Plug Adapter Starter Kit, published at least as early as Mar. 18, 2016, available online at http://www.yakattack.us/LPA_1001_p/lpa1001.htm.

* cited by examiner

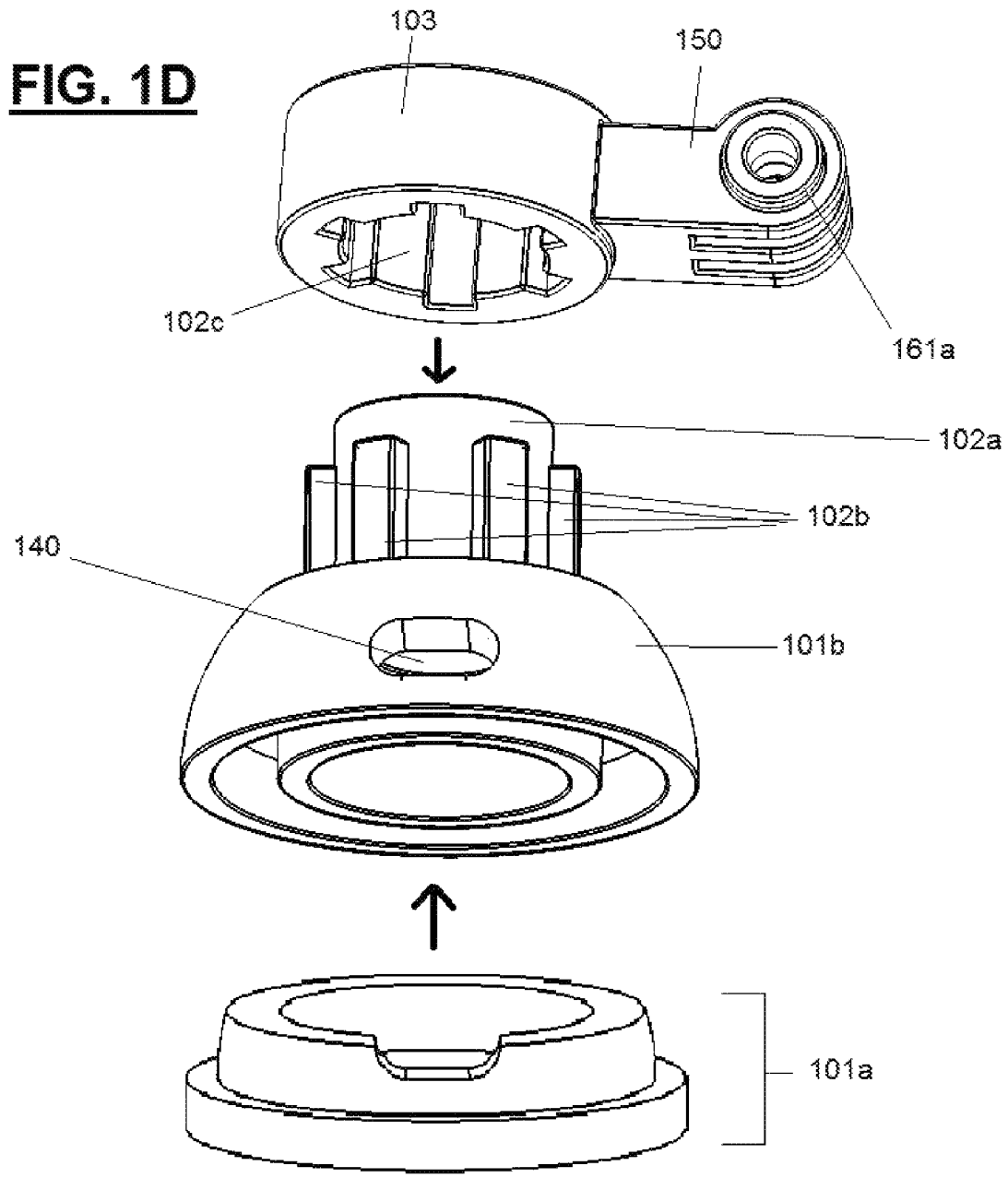

FIG. 1E`
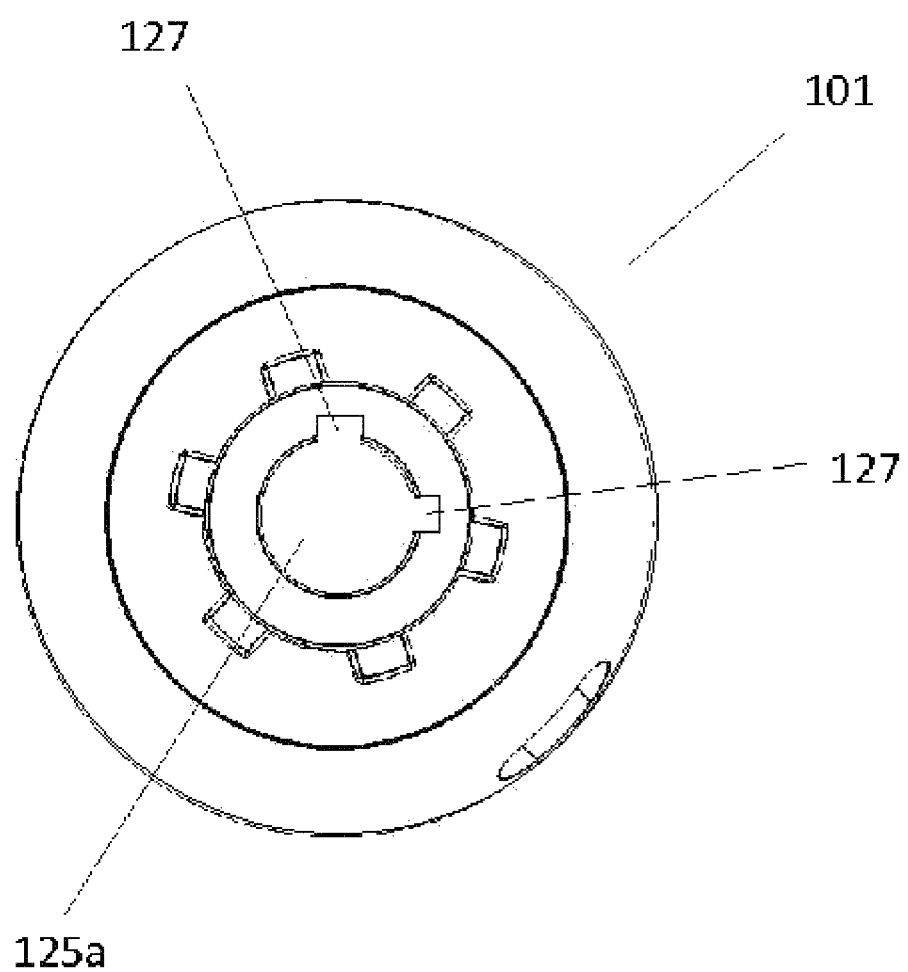

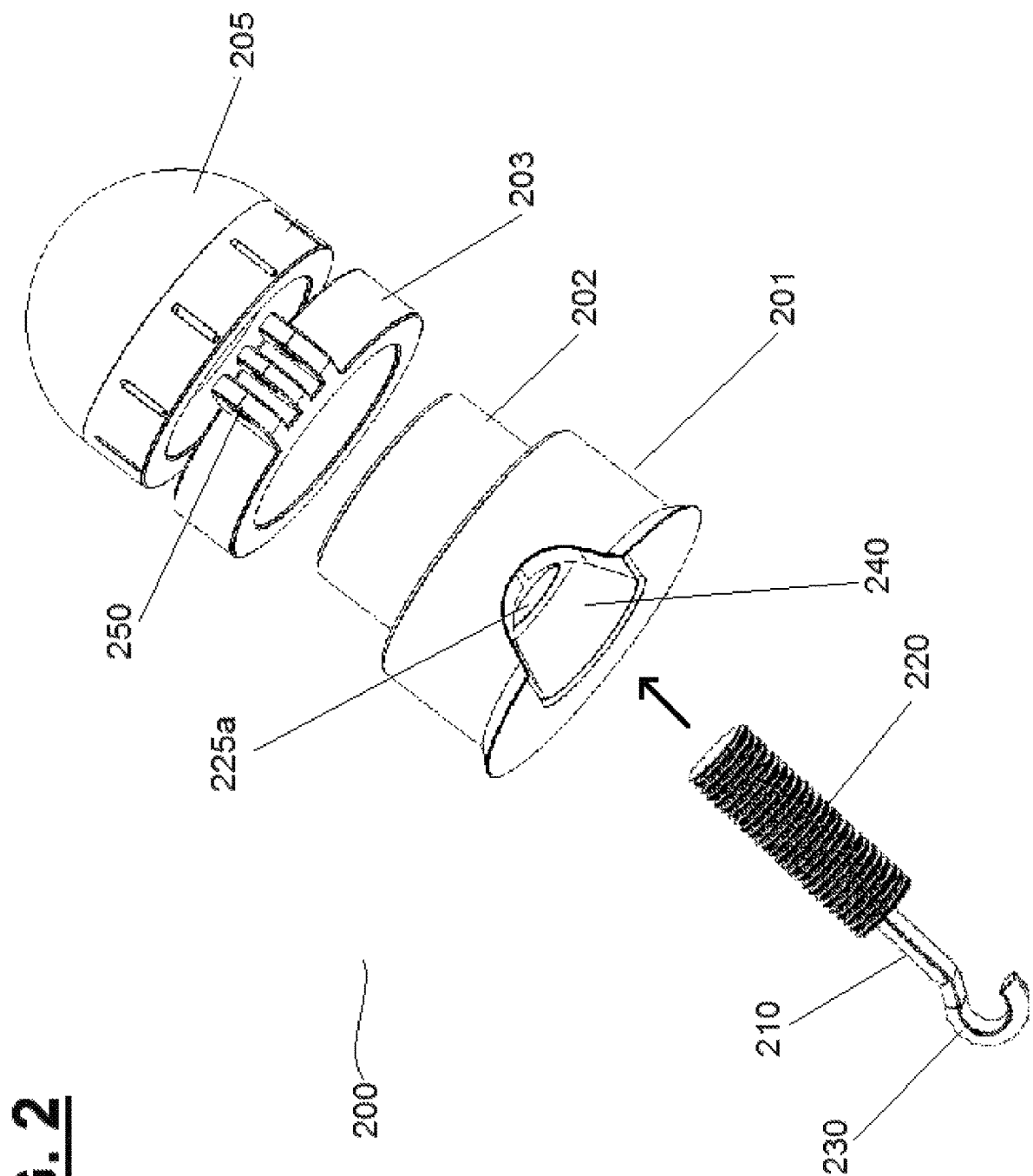

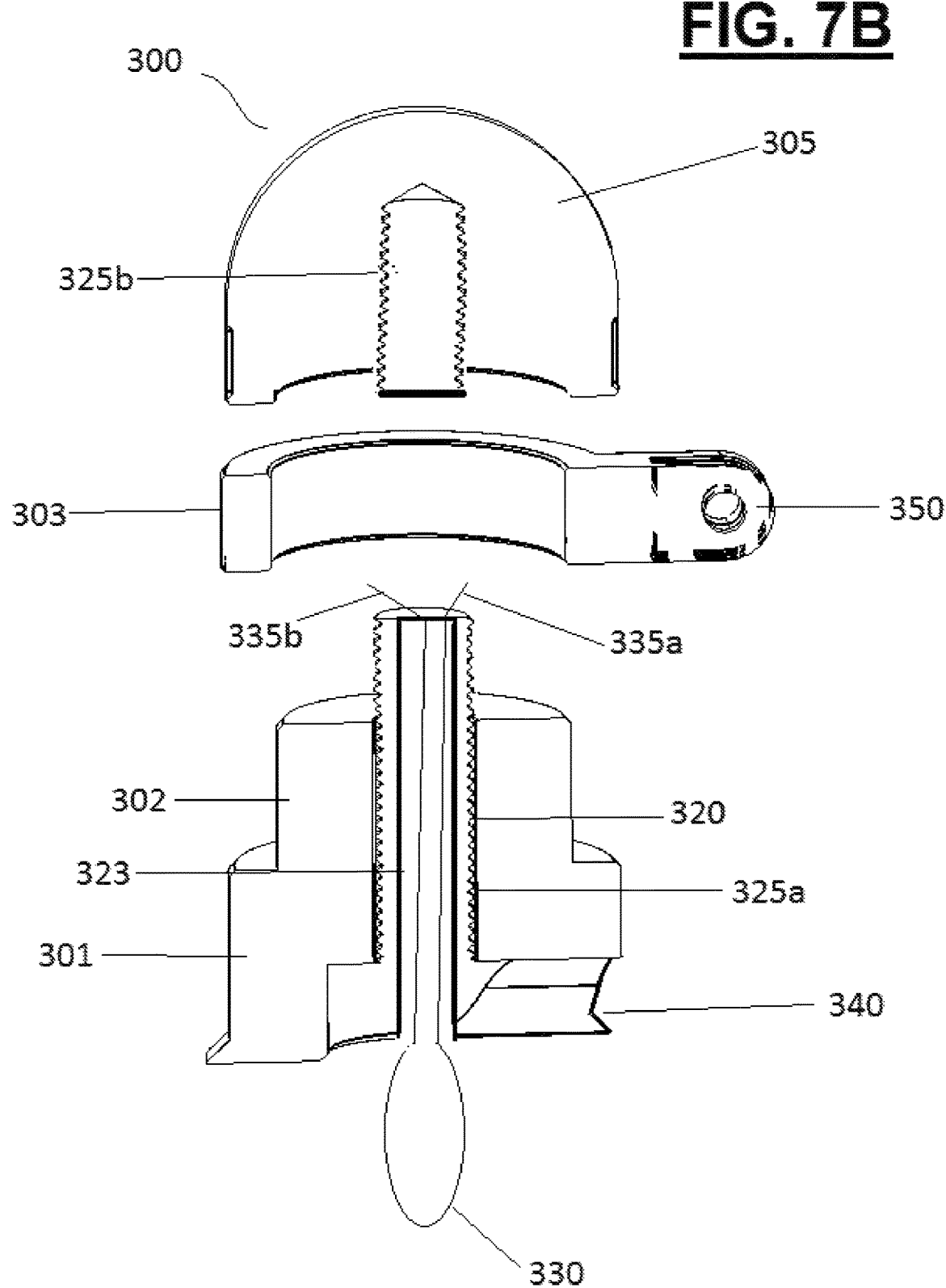

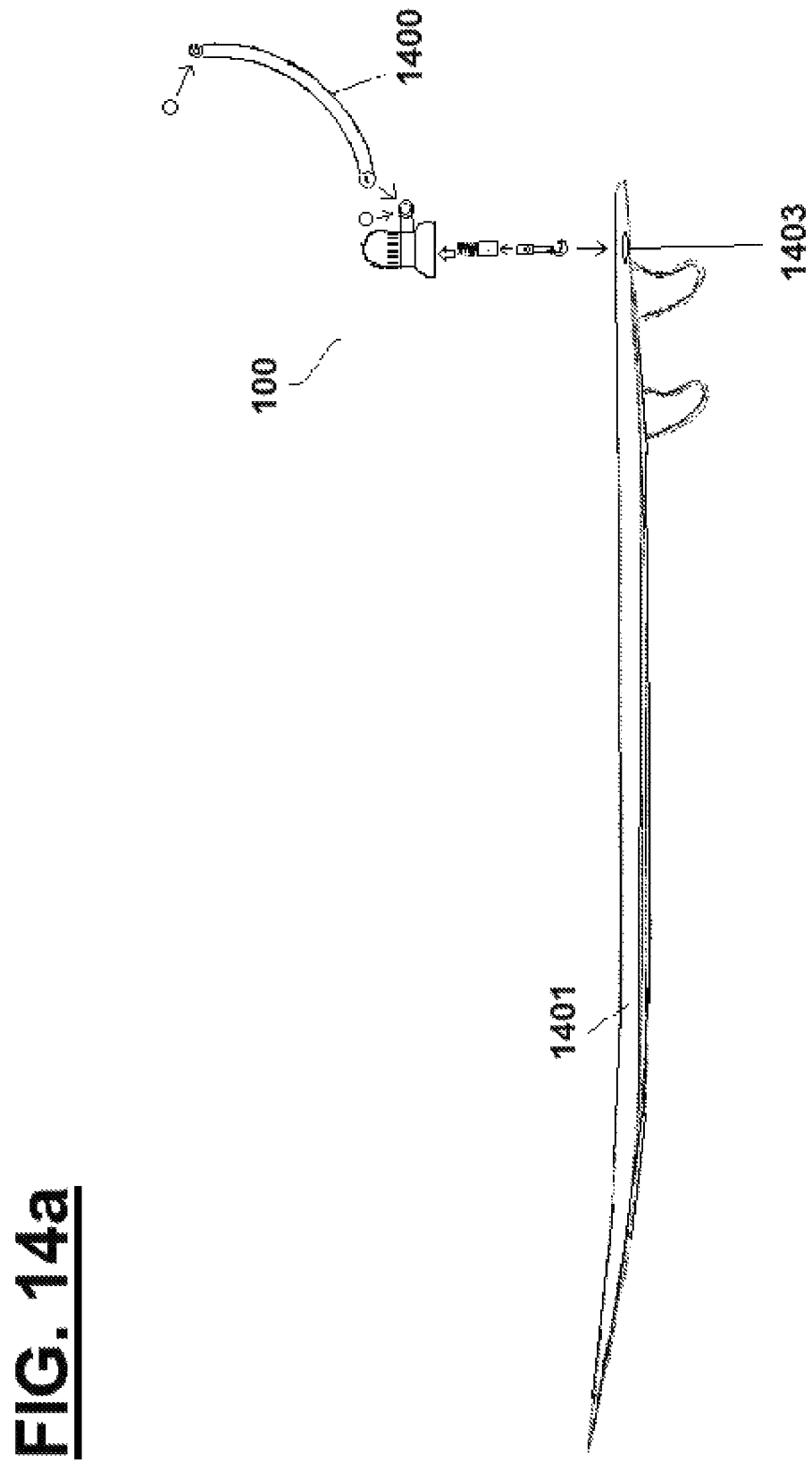

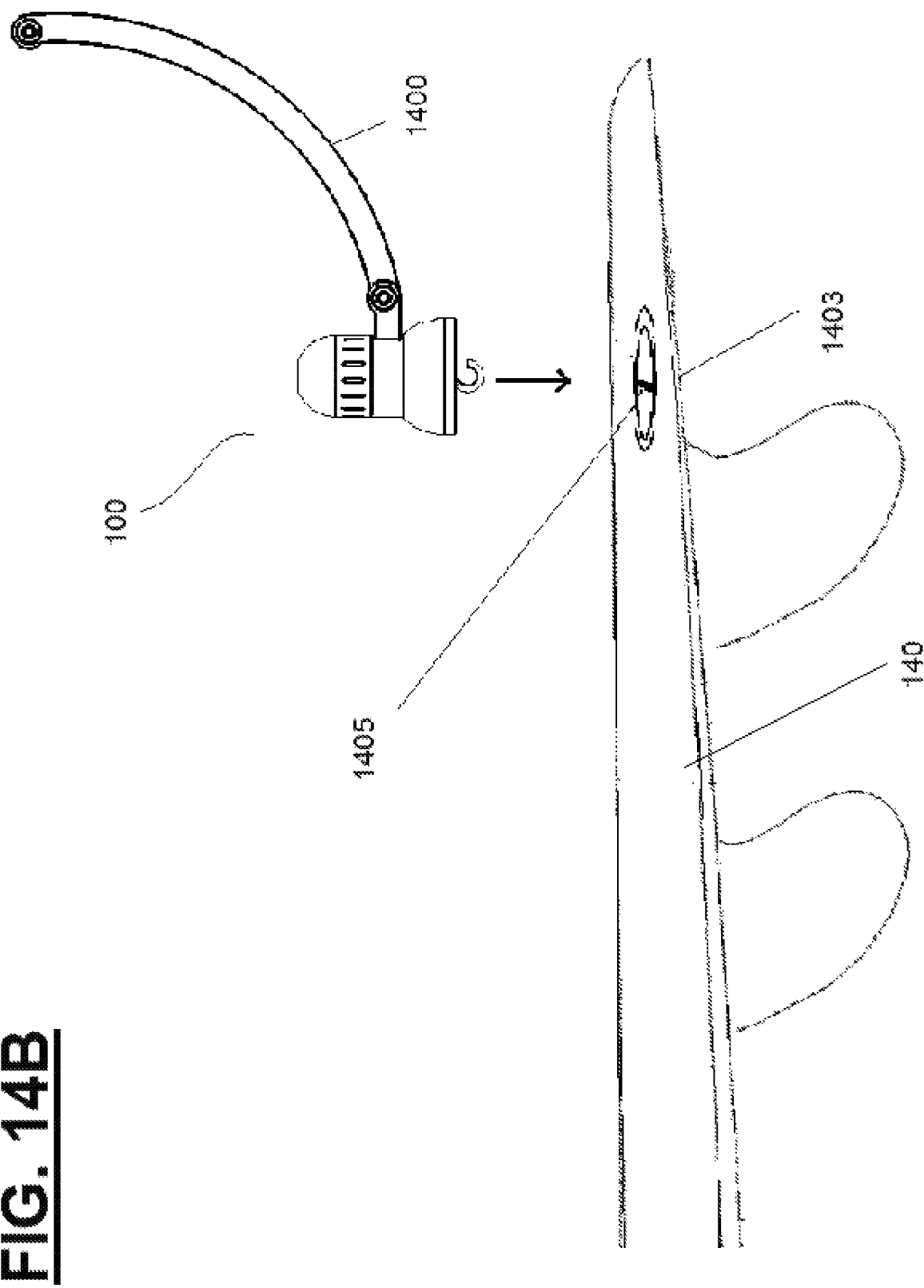

SURFBOARD LEASH PLUG ADAPTER WITH MOUNTING MECHANISM FOR DEVICES AND RELATED METHODS

This is a US non-provisional utility patent application claiming priority to pending U.S. Provisional Patent Application Nos. 62/368,088, filed Jul. 28, 2016, and 62/477,128, filed Mar. 27, 2017, both of which are incorporated herein by this reference in their entireties.

FIELD OF THE INVENTION

The present invention relates to improved devices for securing and attaching portable devices, such as a camera, and methods of using the same. The adapter may be operable to be mounted in a surfboard plug. The adapter may be quickly installed to any surfboard leash plug for quickly mounting a device.

DISCUSSION OF THE BACKGROUND

It has become common for people to take first-person-style video of outdoor activities and sports using portable cameras. However, carrying, accessing, and using a hand held device while participating in a sport occupies at least one hand of the participant when the use of both hands are required in a majority of outdoor activities and sports. Surfing, a physical, high paced activity or sport, requires that one have free use of one's entire body to balance and control themselves while riding the surfboard. Also, it would be difficult or perhaps impossible for one engaged in surfing to transition from a prone position on the board to a standing position while holding a conventional hand-held camera or device. It would also be dangerous to operate a handheld device in an effort to capture an image or video while surfing. Falling while riding a large wave can result in the surfer being subjected to rip currents and sustained underwater entrapment, both of which are hazards, due to ocean energy and breaking waves. Both hands should be free to balance on the surfboard while riding a wave. Distraction of the body and mind should be minimized in the dynamic ocean environment.

Due to the difficulties of having to manually hold a device during surfing, surfers are often forced to rely on another to capture photographs or videos. However, this approach does not allow for the desired first-person perspective video.

Mounting mechanisms for surfboards have been previously made, but have deficiencies. These prior mounting mechanisms typically require that the mechanism be affixed to the board by an adhesive (e.g., a glue or cement) or by drilling a hole in the surface of the surfboard to install a special anchor for receiving the mounting mechanisms. Such conventional mounting devices permanently alter, and may damage, the original structure and aesthetics of the surfboard.

Therefore, an improved mounting mechanism for positioning a device on a surfboard is desired.

SUMMARY OF THE INVENTION

The present invention provides for an improved mounting adapter for positioning devices on a surfboard. The mounting adapter offers significant advancements to attaching a device, including but not limited to a water resistant camera, to a surfboard. The adapter is compatible with all surfboards that have a surfboard leash plug with an attachment bar therein (which is a standard surfboard feature). The mounting adapter may quickly be fastened to the surfboard leash plug, and the desired device may then be mounted on the adapter and adjusted to a proper horizontal axis and vertical plane, allowing the user to quickly position a device on his surfboard at various angles for capturing first-person-perspective photos and/or videos. The mounting adapter may have an attachment member (e.g., a hook structure, loop structure, etc.) for engaging with the attachment bar of a leash plug, a base member for engaging with the surface of the surfboard adjacent to the leash plug and receiving the attachment member through a central hole therethrough; a device mounting member that sits over the base member for connecting to a camera or other device; and an upper fastening member that is internally threaded for engaging an upper threaded portion of the attachment member and compressing the base member and the device mounting member down toward the surface of the surfboard as it is threaded onto the upper threaded portion of the attachment member.

It is necessary to create tension between the mounting adapter and the surfboard in order to secure the mounting adapter to a surfboard. The attachment member has a lower portion that interacts with surfboard plug bar, and is used in combination with the upper fastener to create tension. In some embodiments, the central hole in the base member may be a smooth-bore hole that passively receives the attachment member. In other embodiments, the central hole in the base member may be threaded, allowing the user to tighten the base member against the surface of the surfboard prior to attaching the device-mounting member and the upper fastening member. In some embodiments, the device-mounting member may be fixed in position when it is placed on the base member by an interlocking structure between the base member and the device-mounting member (e.g., such as pegs and complementary holes, complementary interal/external splines, complementary male/female polygonal geometries [e.g., tabs and slots], interlocking hooks and flanges [e.g., Storz-style connectors], or other connecting structures). In other embodiments, the device-mounting member may comprise a securing member for attachment to the base member, and an extension member with a device engagement mechanism for mounting a device at a preferred height and angle above the surfboard. The securing member may also be rotationally positioned about an axis collinear with the base member and cap member at a desired angle in a 360° range in a plane that is parallel to the upper surface of the surfboard to place the device (e.g., a camera) at a preferred position. The upper fastening member may fix the mounting member in a desired position and provide a smooth, blunt surface at the upper end of the mounting device for reducing the risk of injury. Various embodiments of the device are described below to aid in describing the invention, but one of ordinary skill in the art will understand that the scope of the invention is not limited to the examples provided herein.

The surfboard leash plug mounting adapter may be secured to the surfboard via the attachment member, which affixes to the attachment bar within a surfboard leash plug. In some embodiments, the attachment member may have a hook structure for engaging to the attachment bar of the leash plug, in other embodiments the attachment member may be a wire loop structure, and in still other embodiments the attachment member may have other structures for engaging the attachment bar. In embodiments in which the attachment member has a hook-shape that interacts with the attachment bar of a surfboard leash plug, the hook structure may protrude below the base structure of the mounting adapter, and engage directly with the attachment bar. After the hook structure is engaged with the attachment bar, the attachment bar may be passed through a central hole in the base structure and the base structure may be positioned on the upper surface of the surfboard. The device-mounting member and the upper fastening member can then be placed, in concentric alignment, over the base member and attached, and the upper fastening member may be tightened down over the other components to thereby tightly engage the device mounting adapter to the surfboard.

In other embodiments, the lower anchoring member can be a flexible wire, which creates a loop around the attachment bar of the surfboard leash plug, with two ends that pass through and fasten within a longitudinal channel in the attachment member. The wire loop may be wrapped around the attachment bar and then fastened into the channel by fastening structures in the attachment member (e.g., tightening screws, locking pins, etc.). In such embodiments, the wire loop may be inserted into channel of the attachment member, such that the desired length between the attachment bar and the inferior end of the attachment member is achieved, and positionally secured via the tightening screws. Once the base member and ring mounting device are assembled, the upper fastening device can then be installed, reducing slack and creating tension as complementary threads are advanced, thereby firmly engaging the attachment bar. These foregoing examples of the attachment member are not meant to be an exhaustive list, and one of ordinary skill in the art will recognize that the scope of the present invention includes equivalent attachment structures.

The mounting adapter may include a base structure having a sufficient size and shape to be installed over any original surfboard manufacturer's leash plug, allowing the mounting adapter of the present invention to be a universally applicable leash plug mounting adapter. In some embodiments, the central hole in the base member may be a smooth-bore hole that passively receives the attachment member, and is placed against the upper surface of the surfboard to be tightened down on the upper surface of the surfboard by the upper fastening member. The upper fastening member may have engagement structures (e.g., threading, locking pins, etc.) that allow it to engage with the upper portion of the attachment member when the upper fastening member is positioned over the device mounting member and the base member, enabling the user to apply force to the base member through the engagement of the upper fastening member with the attachment member. As the user fastens the upper fastening member to the attachment member, the upper fastening member applies compressive force to the device-mounting member and the base member, and substantial tensile stress is applied to the attachment member as it is pulled upward by the engagement of the upper fastening member and downward by the engagement with the leash plug attachment bar. As a result, the base member and the device-mounting member are pinched between the upper fastening member and the upper surface of the surfboard, thereby firmly engaging the base member with the upper surface of the surfboard.

In other embodiments, the base structure may engage with the attachment member and be operable to be tightened down over the attachment member such that the attachment member is securely engaged with the attachment bar and the bottom of the base structure is firmly secured over the surface of the surfboard adjacent to, and in vertical alignment with, the leash plug prior to the attachment of the device-mounting member or the upper fastening member. The superior end of the attachment member may be engaged with the base structure of the mounting adapter such that when the base structure is engaged with the attachment member and in its final installed position, the base structure is firmly pressed against the surface of the surfboard. As an example, and without limitation, the centrol hole of the base member may be threaded and the attachment member may be complementarily threaded for engagement with the threaded central hole of the base member.

In such embodiments, the threaded receiver in the base member may be threaded down onto the threading on the superior portion of the attachment member until the base member contacts the surface of the surfboard and applies significant pressure to the surface of the surfboard, thereby tightening the engagement of the inferior end of the attachment member with the attachment bar of the leash plug. In other examples, and without limitation, the attachment member has a series of notches that may interact with a receiver in the base member, in which an engagement mechanism (e.g., a spring and ball, pin or other similar devices) engages with one of the notches on the attachment member to lock the attachment member into position. These examples are not meant to be an exhaustive list, as one with ordinary skill in the art will recognize that the scope of the invention includes equivalent attachment mechanisms.

The lower portion of the base member may have a generally cylindrical shape that encompasses the leash plug when the mounting adapter is installed, and in some examples may include a lateral opening in the lower portion of the base to allow a leash to be installed in the leash plug simultaneously with the mounting adapter and/or to provide some access for holding the attachment member in place while engaging the base member with the attachment member. In other examples, and without limitation, the lower portion of the base member may have various other shapes (e.g., a tripod shape, a pyramidal shape, an elliptical shape, a rectangular shape, etc.) which may have one or more open sides for allowing the leash to be installed simultaneously therewith and/or to allow access to the attachment member under the base during installation.

The leash plug mounting adapter also includes a device mounting member for receiving and engaging a device (e.g., a camera). In some embodiments, and without limitation, the mounting member may include a securing member, the securing member being attached between the base member and a cap member, and an extension member with a device engagement mechanism for connecting to a device (e.g., a camera). In other embodiments, the device engagement mechanism may be attached directly to the securing member. The device engagement mechanism may be a pivoting joint that allows the device to be positioned in a range of angles along a vertical plane. For example, and without limitation, the pivoting joint may enable the attached device to be positioned in a range from about −45° to about 45° relative to a plane that is parallel to the upper surface of the surfboard. The mounting member, by way of the securing member, may also be roationally positioned about an axis collinear with the base member and cap member at a desired angle in a 360° range in a plane that is parallel to the upper surface of the surfboard to place the device (e.g., a camera) at a preferred position.

In some embodiments, and without limitation, the device mounting member may be a separate, discrete component of the mounting adapter. The device-mounting member may have an interlocking engagement with the base member, such that the device-mounting member is fixed in position when it is placed on the base member. The device-mounting member and the base member may have complementary interlocking structures such as pegs and complementary holes, complementary interal/external splines, complementary male/female polygonal geometries, interlocking hooks and flanges (e.g., Storz-style connectors), or other such interlocking structures. In such embodiments, a device (e.g., a camera) may be attached to the directly to a device engagement mechanism on the device-mounting member. In such embodiments, the device may be positioned (e.g., to face the device in a particular direction) by rotating the base member and device mounting member together to place the device in a desired position. In other embodiments, the device-mounting member and the base member may have no interlocking structures, and the device-mounting member may be freely rotated and positioned over the base member prior to the attachment of the upper fastening member. In still other embodiments, and without limitation, the mounting member may be fixedly and/or integrally attached to either the base member or a cap member that positions over the base member.

The upper fastening member may be engaged over the mounting member and the base to complete the installation of the mounting adapter. The upper fastening member may be a cap-like structure that is positioned over the mounting member and may be attached to the superior end of the attachment member to thereby bind the upper fastening member with the other parts of the mounting adapter. In some embodiments, and without limitation, the upper fastening member may be tightened down over the base member and the device-mounting member (once the base member and the mounting member are in a desired position) to fix them in position. In other embodiments, and without limitation, the base member may be individually securable to the attachement member, and the upper fastening member may function to secure the device-mounting member in a desired position over the base member. In still other embodiments, and without limitation, the mounting member may be attached directly to the upper fastening member and may be adjustably positioned thereon (e.g., it may be rotationally adjustable relative to the upper fastening member). In such embodiments, the upper fastening member and the mounting member may be attached to the attachment member together over the base member. The upper fastening member may have a smooth and/or rounded upper surface to prevent injury and discomfort to the surfer when the mounting adapter is attached to the surfboard (e.g., in the case of surfer/mounting adapter interference).

The device mounting adapter of the present invention may include a securing member wherein the securing member is placed in position and secured between the base member and the cap member. Some embodiments may include an extension member (e.g. a boom attachment) having a lower end attached to the securing member and an upper end with a device engagement mechanism. In some embodiments, and without limitation, the extension member may be removably attached to the securing member by various attachment mechanisms (e.g., threading, a clamp, a Storz-style coupling, etc.). In other embodiments, the extension member may be permanently attached to the securing member via a weld or an adhesive agent.

In some embodiments, the extension member may extend the connection between a device (e.g., a camera) and the device-mounting member such that the device may be mounted at a preferred distance above an upper surface of a surfboard. The extension member may have a length in a range of about 4 inches to about 7 feet (e.g., in a range of about 12 inches to about 48 inches, or any value or range of values therein) above the board. For example, and without limitation, the extension member may allow the user to position a camera at a rear end of a surfboard suspended at a substantial distance from the upper surface of the surfboard with an elevated view.

In some embodiments, and without limitation, the extension member may comprise a flexible portion and a rigid portion, the flexible portion allowing movement of the extension member and the attached device so as to reduce the chance for damage to the device, or injury to a user upon falling from the surfboard. The flexible portion absorbs vibrational energy and thus prevents the mounting device from jostling, loosening, and disengaging from the leash plug receiver and the upper surface of the board, and it reduces the vibrational energy experienced by the device, thereby reducing wear and tear on the device. In some embodiments, the flexible member may be located at the lower end of the extension member. In other embodiments, the flexible member may be located at other positions in said extension member. In some embodiments, the flexible portion may comprise a spring (e.g., a coil spring, a leaf spring, etc.), a spring loaded joint, or a flexible flat bar capable of bending and resuming a former shape, the flexible flat bar comprising any appropriate material or combination of materials for flexing and resume a former shape. In yet other embodiments, the flexible portion may comprise a pneumatic joint.

The extension member may also include a rigid portion that may comprise a rigid bar, rod, tube, frame, or other rigid structure operable to attach to and support an electronic device. The rigid portion may be located at the upper end of the extension member. In some embodiments, the extension member may have 2 or more rigid portions (e.g., where the flexible portion is located in a middle area of the extension member). The rigid portion(s) may be made from a rigid material such as wood, metal, metal alloy, plastic, hardened rubber, composites, or other appropriate rigid material. In some embodiments, and without limitation, the upper end of the extension member may connect to the device engagement mechanism in a static manner. In other embodiments the extension member may connect to the device engagement mechanism via a moveable joint (e.g., a pivoting joint, a rotatable joint, etc.) that allows the device engagement mechanism and the device to move with respect to the upper end of the extension member. In some embodiments, the extension member may also include one or more joints (e.g., pivoting joints) along its length that allow the device to be positioned lateral to the vertical plane along the length of the surfboard. The one or more joints may allow a camera device to be positioned lateral to the person riding the surfboard to avoid obstruction of the images taken by the camera device by the body of the person.

Several embodiments are discussed below, but the example embodiments shall not to be interpreted as an exhaustive list. One with ordinary skill in the art will recognize that the scope of the present invention includes further variations and equivalents to the specific examples described herein.

In one embodiment, the present invention relates to a device mounting adapter system for attachment to a surfboard leash plug receiver, the adapter system comprising a base system for engagement with a surface of a surfboard, the base system comprising a base member having a base surface for interfacing with the surface of the surfboard and a passage therein, and an attachment member with an inferior end having an anchor structure for engaging an attachment bar within the surfboard leash plug receiver and a superior end for insertion into the passage of the base member; a device-mounting member on the base member for engaging and supporting a device; and a fastening cap having a fastening receiver for engaging the superior end of the attachment member, wherein engagement of the fastening cap with the superior end of the attachment member secures the device mounting adapter system to the surfboard when the anchor structure is engaged with the attachment bar.

In some implementations, the attachment member may have an inferior end that has a hook-like shape for engaging the attachment bar, the interior diameter of the hook-like shape being up to about 0.32 inch. In some implementations, the attachment member may include a flexible wire that engages the attachment bar and includes a first end and a second end, at least one transverse hole to receive at least one fastening device, and an interior channel for receiving the flexible wire wherein the interior channel has a diameter of up to about 0.50 inch (e.g., about 0.125 inches to about 0.33 inches, about 0.25 inches, about 0.125 inches, or any value therein) and the attachment member has an outer diameter of up to about 0.75 inches (e.g., about 0.33 in. to about 0.75 in., about 0.5 in., or any value therein). In some implementations, the attachment member is threaded, and the passage in the base member has complementary threading and/or the fastening cap has a hole with complementary threading for receiving the attachment member. In some implementations, the attachment member includes at least one notch to be engaged by at least one locking member in the base member, where the base member includes a first channel housing a first locking member housed and/or the fastening cap includes a second channel housing a second locking member. The first locking member and/or the second locking member may each have a cross section that is complementary to a set of notch grooves in the attachment member.

In some implementations, the device mounting adapter may include a device mounting member comprising a securing member and an extension member, wherein the securing member is placed in position and secured between the base member and the cap member and the extension member (e.g. a boom attachment) has a lower end attached to the securing member and an upper end with a device engagement mechanism. In some implementations, the device engagement mechanism may be attached to the extension member via a moveable joint such that a device may be positioned at a preferred angle relative to an upper surface of the surfboard. In some embodiments, and without limitation, the extension member may comprise a flexible portion and a rigid portion, the flexible portion allowing movement of the extension member and an attached device so as to reduce the chance for damage to the device, or injury to a user or third party, upon falling from the surfboard. In other implementations the device mounting adapter may include an extension member having a first connector that is operable to engage a device engagement mechanism of the device-mounting member and a second connector operable to engage the device. The first connector may be operable to engage the device engagement mechanism in a rotating or pivoting arrangement. The second connector may be operable to engage the device in a rotating or pivoting arrangement.

In some implementations, the base surface of the base member has a diameter of at least about 2.0 inches; the passage of the base member and the attachment member have complementary engagement structures for fixedly attaching the base member to the attachment member; and an upper portion of the base member has a diameter approximately equal to the interior diameter of the device-mounting member, and the upper portion has a height that is substantially equal to a height of the device-mounting member which may be rotated along the horizontal axis. The passage of the base member may include a fastening structure operable to be engaged by a second fastening structure on the superior end of the attachment member. In some implementations, the device-mounting member includes a securing member and a device engagement mechanism, the device engagement mechanism comprising a pivoting joint receiver, the pivoting joint receiver being operable to allow rotational movement of the engaged device in a vertical plane, about a horizontal axis, to a desired position. In other implementations, the device mounting member includes a securing member and an extension member with a device engagement mechanism on an upper end of the extension member. In some implementations, the device engagement mechanism may comprise a pivoting joint receiver. In other implementations, the device engagement mechanism may be operable to attach a device statically to the extension member.

The securing member may be operable to be rotated around a vertical axis to a desired angular position. In some embodiments, the securing member may comprise an inner cylindrical passage in a proximal end and a vertical passage in a distal end. In some embodiments, the inner cylindrical passage may comprise an inner diameter substantially greater than an outer diameter of a narrow cylindrical portion of the base member of the device mounting adapter. In some embodiments, the inner cylindrical passage may comprise a locking slot forming a shape complimentary to a locking tab on the narrow cylindrical portion. In some embodiments, the locking slot may comprises a plurality of locking slots and the locking tab may comprise a plurality of locking tabs, wherein each of the plurality of locking slots forms a shape complimentary to a locking tab of the plurality of locking tabs. In some embodiments the plurality of locking slots may be evenly spaced apart around the inner cylindrical passage and the plurality of locking tabs may be evenly spaced apart around the narrow cylindrical portion, such that the securing member may fit onto the base member in a plurality of angular positions about a central axis of the base member and cap member.

In some implementations, the fastening cap may have a smooth outer surface, may include a complementary channel to receive the superior end of the attachment member, and the receiver of the fastening cap may include a fastening structure that is complementary to and operable to be engaged with a second fastening structure on the superior end of the attachment member. In some implementations, the superior end of the attachment member has a threaded portion and the receiver of the fastening cap may have complementary threading. In such embodiments, the adapter system can be attached and detached from the attachment bar within the surfboard leash plug receiver without damaging the surfboard or the leash plug receiver, and may allow the surfboard leash plug receiver to be subsequently used for attaching a leash plug thereto.

In another embodiment, the invention relates to an adapter system for attachment to a surfboard leash plug receiver, the adapter system comprising a base system including a base member having a base surface for engagement and interfacing with a surface of a surfboard and a passage therein, and an attachment member with an inferior end having an anchor structure for engaging an attachment bar within the surfboard leash plug receiver and a superior end for insertion into the passage of the base member, wherein engagement of the base member with the superior end of the attachment member secures the adapter system to the surfboard when the anchor structure is engaged with the bar; a device-mounting structure for engaging and supporting a device; and a fastening cap having a fastening receiver for engaging the superior end of the attachment member. In some implementations, the device mounting structure may be fixedly attached and/or integrally formed with the base member. In some implementations, the device-mounting structure may be fixedly attached and/or integrally formed with the fastening cap. In some implementations, the attachment member may have an inferior end that has a hook-like shape for engaging with the attachment bar, the interior diameter of the hook-like shape being up to about 0.32 inch. In some implementations, the attachment member may include a flexible wire that engages the attachment bar and includes a first end and a second end, at least one hole to receive at least one fastening device, and an interior channel for receiving the flexible wire wherein the interior channel has a diameter of up to about 0.50 inch (e.g., about 0.125 inches to about 0.33 inches, about 0.25 inches, about 0.125 inches, or any value therein) and the attachment member has a total diameter of up to about 0.75 inches (e.g., about 0.33 in. to about 0.75 in., about 0.5 in., or any value therein). In some implementations, the attachment member is threaded, and the passage in the base member has complementary threading. In some implementations, the attachment member includes at least one notch to be engaged by at least one locking member in the base member, where the base member includes a first channel housing a first locking member and the fastening cap includes a second channel housing a second locking member. The first locking member and the second locking member may each have a cross section that is complementary to a set of notch grooves in the attachment member.

In some implementations, the base surface of the base member has a diameter of at least about 2.0 inches; the passage of the base member and the attachment member have complementary engagement structures for fixedly attaching the base member to the attachment member; and an upper portion of the base member has a diameter approximately equal to the interior diameter of the device-mounting member which may be moved along the vertical plane, and the upper portion has a height that is substantially equal to a height of the device-mounting member. The passage of the base member may include a fastening structure operable to be engaged by a second fastening structure on the superior end of the attachment member. In some implementations, the device-mounting member includes a securing member and a device engagement mechanism, the device engagement mechanism comprising a pivoting joint receiver, the pivoting joint receiver being operable to allow rotational movement of the engaged device in a vertical plane, about a horizontal axis, to a desired position.

In other implementations, the device mounting member includes a securing member and an extension member with a device engagement mechanism located at an upper end of the extension member. In some implementations, the device engagement mechanism may comprise a pivoting joint receiver. In other implementations, the device engagement mechanism may be operable to attach a device statically to the extension member.

The securing member may be operable to be rotated around a vertical axis to a desired angular position. In some embodiments, the securing member may comprise an inner cylindrical passage in a proximal end and a vertical passage in a distal end. In some embodiments, the inner cylindrical passage may comprise an inner diameter substantially greater than an outer diameter of a narrow cylindrical portion of the base member of the device mounting adapter. In some embodiments, the inner cylindrical passage may comprise a locking slot forming a shape complimentary to a locking tab on the narrow cylindrical portion. In some embodiments, the locking slot may comprises a plurality of locking slots and the locking tab may comprise a plurality of locking tabs, wherein each of the plurality of locking slots forms a shape complimentary to a locking tab of the plurality of locking tabs. In some embodiments the plurality of locking slots may be evenly spaced apart around the inner cylindrical passage and the plurality of locking tabs may be evenly spaced apart around the narrow cylindrical portion, such that the securing member may fit onto the base member in a plurality of angular positions about a central axis of the base member and cap member.

In some implementations, the fastening cap may have a smooth outer surface, may include a complementary channel to receive the superior end of the attachment member, and the receiver of the fastening cap may include a fastening structure that is complementary to and operable to be engaged with a second fastening structure on the superior end of the attachment member. In some implementations, the superior end of the attachment member has a threaded portion and the receiver of the fastening cap may have complementary threading. In such embodiments, the adapter system can be attached and detached from the attachment bar within the surfboard leash plug receiver without damaging the surfboard.

In further embodiments, the present invention relates to a method for attaching a device-mounting adapter to a surfboard leash plug, including engaging an anchoring end of an attachment member to an attachment bar within the surfboard leash plug, wherein the anchoring end has a complementary shape to the attachment bar; engaging a base member with the superior end of the attachment member to position the base surface of the base member firmly against the upper surface of the surfboard such that substantial tensile stress is applied to attachment member; positioning a device mounting member at a desired angular position on a plane that is substantially parallel to the upper surface of the surfboard; positioning an upper fastening member over the device mounting member, and engaging the upper fastening member with the superior end of the attachment member; and attaching a device to a device engagement mechanism on the device-mounting member. In some implementations, the base surface may be tightened on the attachment member and over the surfboard to apply a total force in a range of about 10 lb. to about 100 lb. when the device-mounting adapter is fully installed. In some implementations, the device-mounting adapter may be tightened on the attachment member and over the surfboard to apply a total tensile stress in a range of about 10 lb. to about 100 lb. to the attachment member.

In some implementations, the base surface has a diameter of at least about 2.0 inches, the upper fastening member has a smooth outer shape, and the device mounting member comprises a securing member and an extension member, the extension member comprising a flexible portion and a rigid portion with a device engagement mechanism. The inferior end of the attachment member may have a hook-like shape for engaging with the attachment bar, the hook having an inner diameter of about 0.32 inch. In some implementations, the attachment member may include a flexible wire that engages the attachment bar within the surfboard leash plug receiver and includes a first end and a second end, at least one transverse hole for a cinching screw, and an interior channel within the attachment member for receiving the flexible wire and the cinching screw, where the interior channel has a diameter of up to about 0.50 inch (e.g., about 0.125 inches to about 0.33 inches, about 0.25 inches, about 0.125 inches, or any value therein) and the outside diameter of the attachment member is up to about 0.75 inches (e.g., about 0.33 in. to about 0.75 in., about 0.5 in., or any value therein).

It is an objective of the present invention to provide a device mounting adapter that is universally adaptable to original manufacturer leash plugs, such that a surfer can easily attach the device mounting adapter to a surfboard without the need to make any alterations to the original surfboard.

It is a further objective of the present invention to provide a device mounting adapter that can be quickly and securely attached to a surfboard leash plug and removed quickly and securely from a surfboard leash plug.

It is a further objective of the present invention to provide a device mounting adapter that can be attached to and removed from a surfboard leash plug without any damage to the surfboard.

It is a further objective of the present invention to provide a device mounting adapter that can securely hold a device (e.g., a camera) on the surface of a surfboard to allow a surfer to record a first-person view as he or she surfs.

It is a further objective of the present invention to provide a tail-mounted device or camera adapter for a surfboard providing an elevated, forward facing perspective.

It is a further objective of the present invention to provide a device mounting adapter that has an adjustable mounting member for positioning a device (e.g., a camera) at various positions and angles.

It is a further objective of the present invention to provide a device mounting member with an extention member which is flexible, allowing movement of the extension member and an attached device upon contact with a user, third party, or other object, so as to reduce the chance for injuty to the user or third party, or damage to the device.

Additional aspects and objects of the invention will be apparent from the detailed descriptions and the claims herein.

BRIEF DESCRIPTION OF THE DRAWINGS

FIG. 1D shows an exploded perspective view of the base member and device mouting member according to an embodiment of the present invention.

FIG. 1E' shows a top view of the base member according to an embodiment of the present invention.

FIG. 1F' shows an exploded persepective view of attachment member according to an embodiment of the present invention.

FIG. 2 shows an exploded perspective view of an embodiment of a mounting adapter according to an embodiment of the present invention.

FIG. 7B shows an exploded crosssectional view of a mounting adapter according to an embodiment of the present invention

FIG. 14A shows side view of a surfboard with an exploded mounting adapter according to an embodiment of the present invention.

FIG. 14B shows a close-up, side view of a mounting adapter for attachment to a surfboard leash plug receiver according to an embodiment of the present invention.

DETAILED DESCRIPTION OF THE EXEMPLARY EMBODIMENTS

Figure 1A:
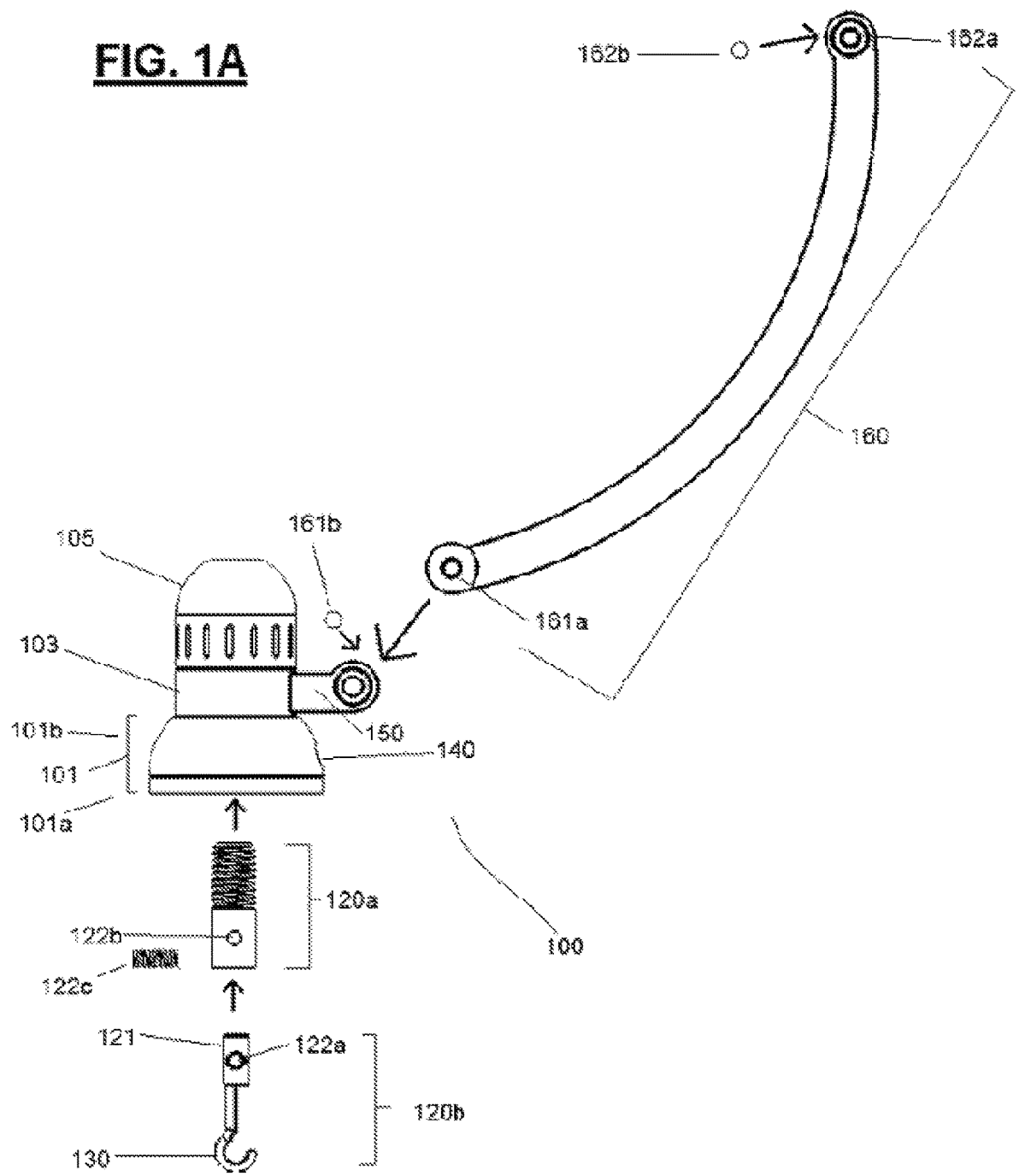
FIG. 1A shows an exploded side view of an embodiment of a mounting adapter according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. Conversely, the invention is intended to cover alternatives, modifications, and equivalents that are included within the scope of the invention as defined by the claims. In the following disclosure, specific details are given as a way to provide a thorough understanding of the invention. However, it will be apparent to one skilled in the art that the present invention may be practiced without these specific details.

Referring to the drawings, wherein like reference characters designate like or corresponding parts throughout the several views, and referring particularly to FIGS. 1-14E, it is seen that the present invention includes various embodiments of a surfboard leash plug adapter with mounting mechanism for devices (e.g., a camera). It is also evident in the drawings that the invention includes methods of using the surfboard leash plug adapter for attaching a device to a surfboard.

Figure 1B:
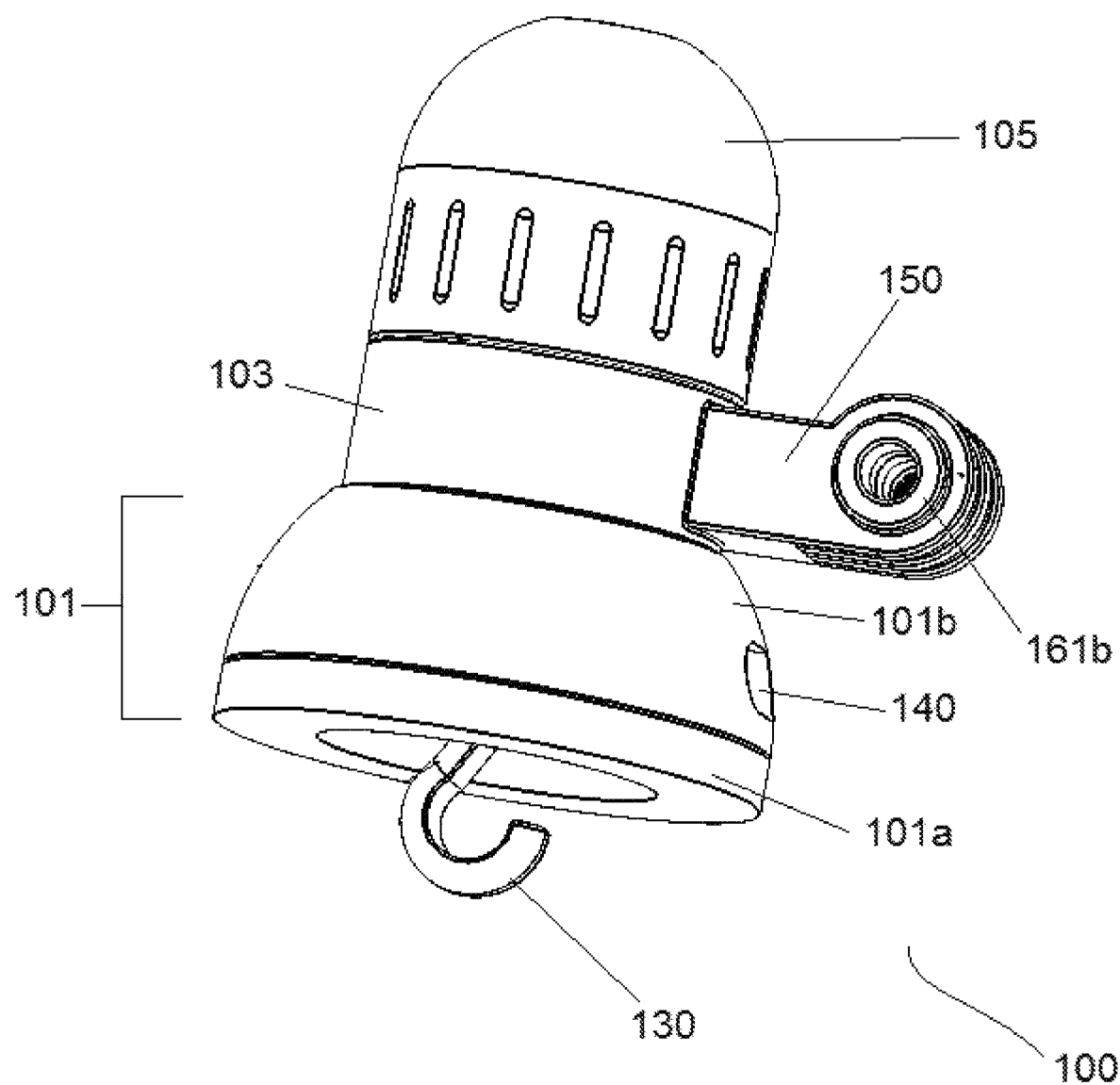
FIG. 1B shows a perspective view of a mounting adapter according to an embodiment of the present invention.
Figure 1C:
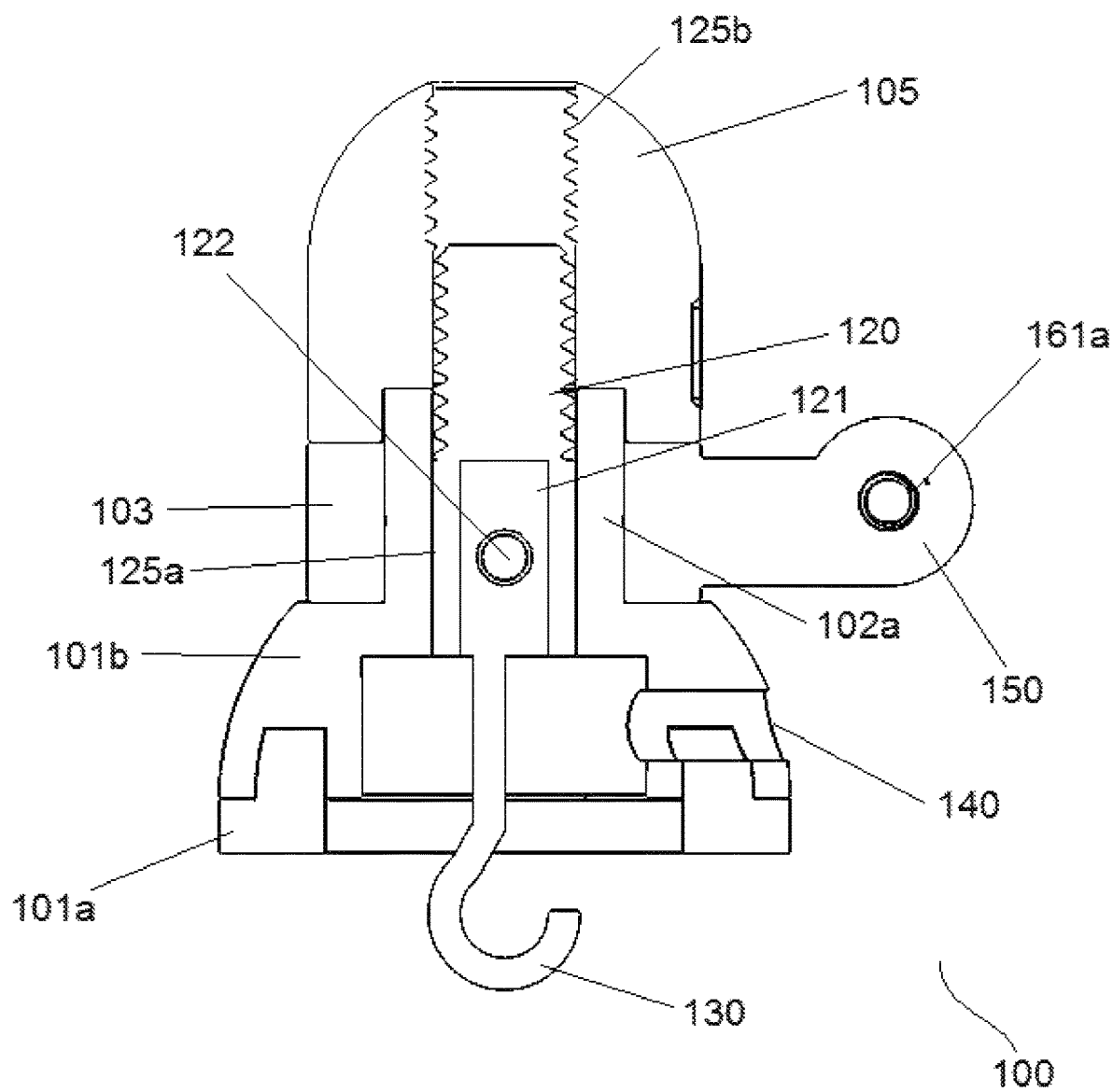
FIG. 1C shows a cross-sectional view of a mounting adapter according to an embodiment of the present invention.
Figure 1E:
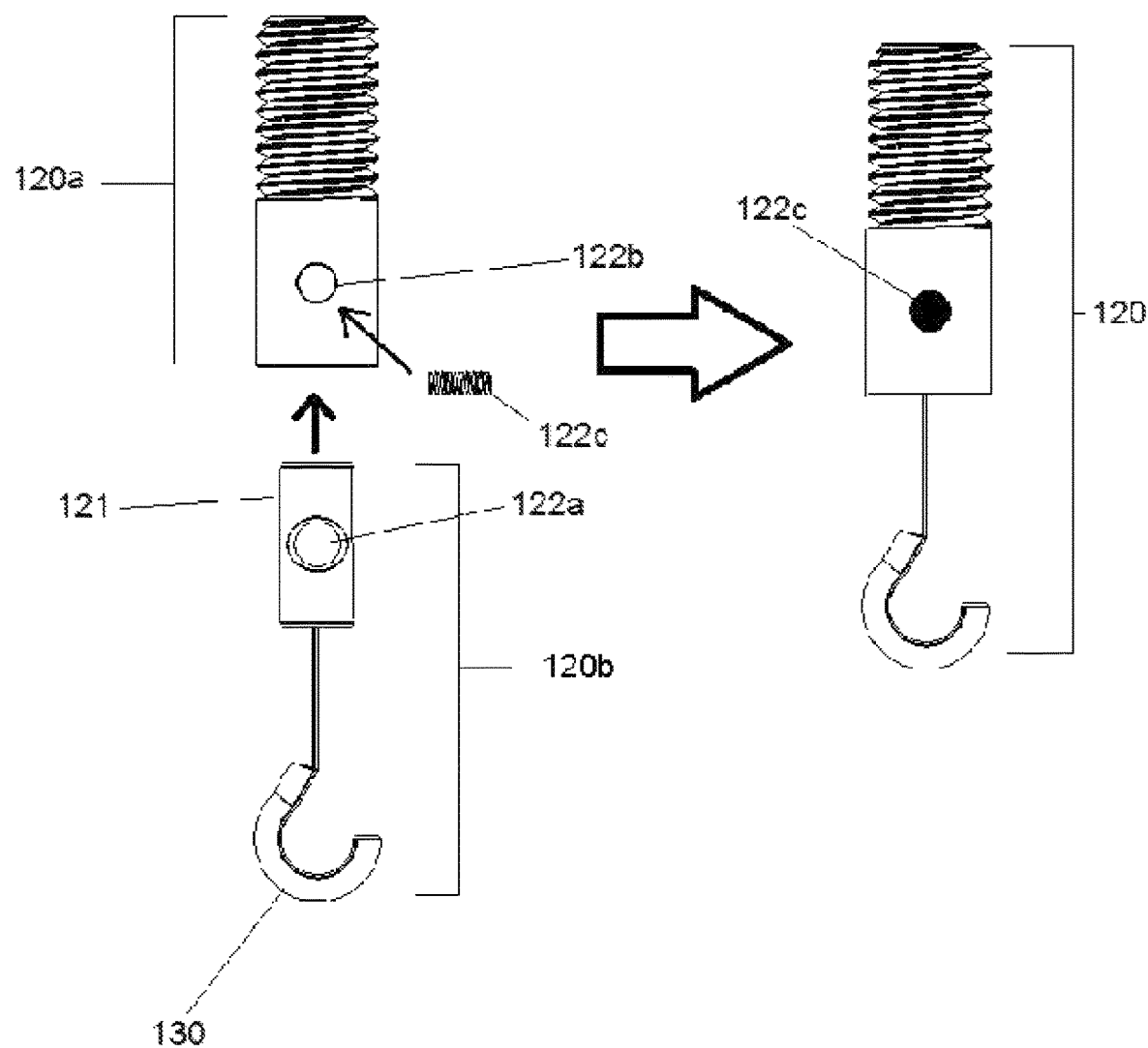
FIG. 1E shows an exploded view and an assembled view of an attachment member according to an embodiment of the present invention.

FIGS. 1A-F', without limiting the invention, illustrates a device-mounting adapter 100 for connecting to a surfboard leash plug according to an embodiment of the present invention. FIG. 1 provides an exploded view of the device-mounting adapter 100 to show the individual components thereof. The device-mounting adapter 100 includes a base member 101 comprising a base 101b and a compressible gasket 101a. The device-mounting adapter 100 also has an attachment member 120 comprising an inferior end 120b with a hook 130 for anchoring the device to the surfboard and a coupling end 121, whose outer diameter is substantially equal to the diameter of a complementary longitudinal channel within the superior end 120a of the attachment member. The coupling end 121 has a transverse hole 122a to be aligned with a complimentary hole 122b in receiver 120a to receive fastening member 122c (e.g., threaded screw, pin, bar, etc.). FIG. 1E shows an exploded view demonstrating how the attachment member 120 is assembled. The coupling end 121 is placed into the complementary channel of the superior end 120a, such that holes 122a and 122b are aligned. The fastening member 122c is inserted into holes 122a and 122b, securely joining 120b and 120a to form attachment member 120.

The device-mounting adapter 100 also includes a ring-shaped device-mounting member 103 having a device engagement mechanism 150 for attaching to devices (e.g., a camera) or extension device 160 to the mounting adapter 100. The device-mounting adapter 100 also includes a fastening cap 105. An exemplary, fully assembled device-mounting adapter 100 is shown in FIG. 1B. Once the device-mounting adapter 100 is fully installed on the surfboard, a device (e.g., a camera to allow the user to take photos and/or video of his surfing activities) or an extension device 160 may be attached to the device-engagement mechanism 150.

FIG. 1C shows a cross-sectional view of the mounting adapter 100. The attachment member 120 is shown assembled in FIG. 1C. The superior end of the attachment member 120 is received by complementary channel 125a of the base system 101. In some embodiments, and without limitation, the channel 125a may be a smooth-bore channel through which the superior end 120a of the attachment member 120 is passively inserted. In other embodiments, the channel 125a may have threading complementary to the external threading on the superior end 120a of the attachment member 120, allowing the base system itself to be tightened down on the upper surface of the surfboard. Additionally, the fastening cap 105 may engage and be attached to the superior end 120a by engaging a threaded channel 125b with the external threading of the superior end 120a.

FIG. 1A-1E' show that the base system 101 has a flat portion on bottom side thereof (the "base surface") that interfaces with the upper surface of a surfboard when the mounting adapter is engaged with a leash plug and installed on the upper surface of a surfboard. FIG. 1D shows that the base 101b has a recess in a bottom thereof that is complementary to an upper ridge of the compressible gasket 101a. The upper ridge of the gasket 101a is inserted into the complementary recess of the base 101b when the base is assembled. In some implementations, the upper ridge of the gasket 101a and the complementary recess of the base 101b may be adhered or fused together chemically or mechanically such that they function as a single unit.

The base system has a narrow cylindrical portion 102a extending upwardly that may have a plurality of splines 102b (e.g two, three, four, eight, twelve, etc.). The splines 102b on the narrow cylindrical portion are complementary to channels 102c in the device-mounting member 103. The splines 102b allow the user to rotationally orient the device mounting member 150 at different angular positions relative to the base system 101. The base system 101 may have a central opening that allows the attachment member 120 to be passed through the channel 125a. To illustrate, FIG. 1C provides a cross-sectional view that shows the superior end 120a of the securing member passed through base system 101 and the channel 125a in the narrow cylindrical portion 102a. The central opening may have an inner diameter that is greater than the diameter of the larger surfboard leash plugs for surfboards on the market: the inner diameter of the base system may be at least about 2 inches. The base surface may be engaged with the upper surface of the surfboard around and adjacent to the leash plug receiver when the base system is engaged with the attachment member and installed on the surfboard. The figure also shows that fastening cap 105 has channel 125b that is complementary to and may receive the threaded portion of the superior end 120a of the attachment member 120 to secure the device mounting adapter to the surfboard.

Additionally, FIGS. 1B-E show that the base system 101 has a lateral port 140 in the wall of the base system 101 that allows one to access the attachment member during installation of the device mounting adapter 100 to ensure that the hook 130 properly engages the attachment bar of the surfboard leash plug. Additionally, the lateral port 140 provides space so that one can still properly attach a surfboard leash to the leash plug receiver. The lateral port 140 may allow the surfboard leash to be fastened to the leash plug receiver bar (e.g., via a leash string, which is a typical component of the leash) and pass through the lateral port 140, allowing the surfer to use the leash while surfing.

FIG. 1E' shows one implementation of the base member 101 having internal grooves 127 for engaging with fastening member 122c to prevent the base member 101 from spinning with respect to the attachment member 120 during assembly and installation. The top down view provided in FIG. 1E' shows grooves that run along the interior diameter of the complementary channel 125a (which may be smooth without threading) to allow the attachment member 120 to be inserted through the channel 125a with the fastening member 122c protruding from the side of the attachment member 120.

Once the device mounting adapter 100 is completely assembled, as shown in FIG. 1B, and installed on the upper surface of a surfboard, a device (e.g., a camera) or an extension device 160 may be attached to the device-engagement mechanism 150. The extension device 160 has a first pivoting joint 161a for attachment to the device-engagement mechanism 150. The first pivoting joint 161a and the device-engagement mechanism 150 may each include plates with central holes in each such plate. The user may interleaf the plates of the first pivoting joint 161a and the device-engagement mechanism 150 such that central holes of the plates are aligned and may receive a pin, bolt, or other locking structure for securing the first pivoting joint to the device-engagement mechanism 150. The first pivoting joint 161a may include an anchor 161b that may have threading or other engagement mechanisms that may receive and secure the pin, bolt, or other locking structure. The extension device 160 may also have a second pivoting joint 162a for attachment to a device (e.g., a camera). The second pivoting joint 162a may also include plates with central holes in each such plate that may interleaf with plates on the device such that central holes of the plates are aligned with holes present in the plates of the device. A pin, bolt, or other locking structure may then be passed through the aligned central holes to secure the second pivoting joint 162a to the device. The second pivoting joint 162a may include an anchor 162b that may have threading or other engagement mechanisms that may receive and secure the pin, bolt, or other locking structure.

Figure 1F:
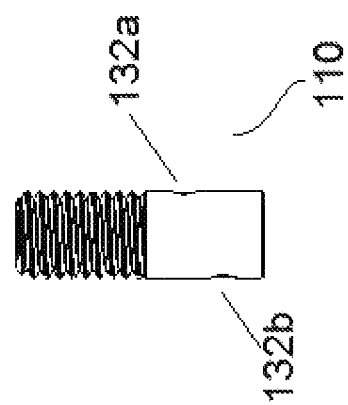
FIG. 1F shows an exploded persepective view of a mounting adapter according to an embodiment of the present invention.
Figure 1F:
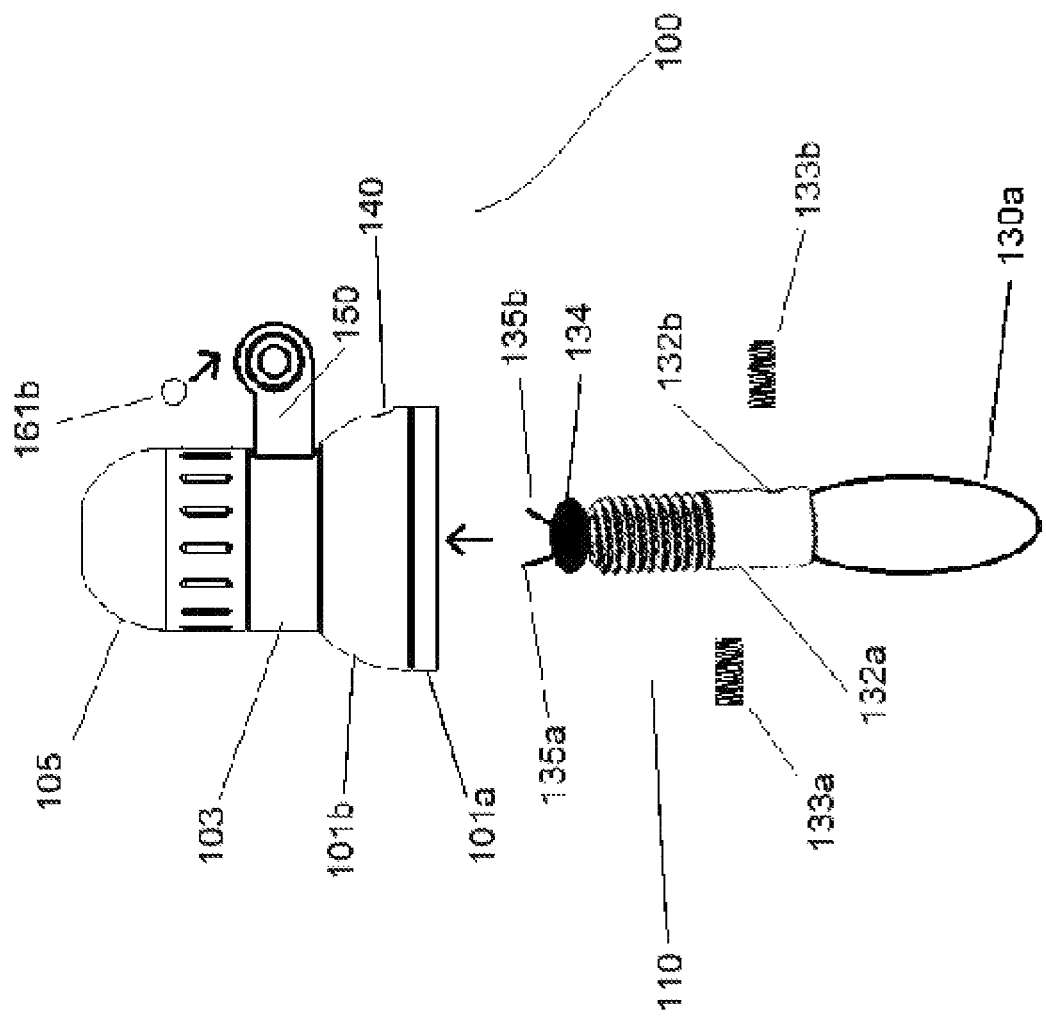

It is to be appreciated that FIG. 1F illustrates a similar embodiment to the embodiment of FIG. 1A-E; the most prevalent difference being that the attachment member 110 has a flexible wire 130a for engaging with the attachment bar, rather than a hook or other engagement structure.

FIGS. 1F and 1F', without limiting the invention, illustrates an embodiment of a device-mounting adapter 100 according to an embodiment of the present invention. FIG. 1F shows the components of the device-mounting adapter 100, which are similar to those shown for FIGS. 1A-1E, except for an attachment member 110 with an externally threaded body and a flexible wire 130 for anchoring the device to the leash plug attachment bar. FIG. 1F shows that the flexible wire 130 has a first end 135a and a second end 135b to be received within an interior longitudinal channel within the body of the attachment member 110. The flexible wire 130 may be a durable metal (e.g., braided steel) or composite material (e.g., a carbon fiber composite) that has sufficient tensile strength to withstand the force applied thereto when the device-mounting adapter is fully installed on the surfboard (e.g., a tensile force of about 10 lbs. to about 100 lbs.). The flexible wire 130 may also be resistant to abrasion wear, preventing or reducing damage that may be caused by the interface of the flexible wire 130a with the attachment bar of the leash plug (e.g., the flexible wire 130a may be coated with a polymer material such as nylon materials, polyester materials [e.g., PETP, PBT, etc.], polyethylene materials, polyamide-imide (PAI) materials, etc. The first end 135a and second end 135b of the flexible wire are inserted into an interior longitudinal channel 123 and two fastening members 133a and 133b (e.g., screws—such as Allen screws, locking pins, etc.) may be used to secure the flexible wire 130 when the fastening members 133a and 133b are inserted into the fastener holes 132a and 132b in the attachment member 110, and tightened. FIG. 1F' shows that the fastener holes 132a and 132b may be located on different sides of the attachment member 110. The first end 135a and second end 135b may be tied off to form a knot 134 that is larger than the interior channel diameter of the attachment member 110.

Once the wire 130a is wrapped around the leash plug attachment bar and the attachment member 110 is assembled, the attachment member 110 may be passed through the channel 125a of the base system and the channel 125b of the fastening cap 105 may be threaded onto the attachment member 110 to secure the device mounting adapter to the surfboard. It is to be appreciated that the present embodiment works in a very similar matter to what has been described in FIGS. 1A-1E.

FIG. 2 and FIG. 3 show that the base system 201 and narrower cylindrical portion 202 house the threaded superior end 220 of the attachment member. The narrower cylindrical portion 202 of base system 201 allows for the ring-shaped device-mounting member 203 to fit over the narrow cylindrical portion 202 when assembling the surfboard leash plug adapter. The inner diameter of the ring-shaped adapter 203 is just larger than (substantially equal to) the outer diameter of the narrow cylindrical portion 202. Therefore, the ring-shaped adapter 203 fits snugly when placed over the narrow cylindrical portion 202. In some implementations, as shown in FIGS. 2-6, the uppermost surface of 202 may protrude slightly over the upper most surface of the device-mounting member 203, when the device-mounting member 203 is placed on the base member 201. In such implementations, the fastening cap 205 may overlap with an upper portion of the narrow cylindrical portion 202 when the fastening cap is installed over the narrow cylindrical portion 202, thereby nesting the upper portion of the narrow cylindrical portion 202 within the fastening cap 205. In other implementations the height of the ring shape adapter 203 may be substantially equal to the height as the narrow cylindrical portion 202 so that when the device-mounting member 203 is placed on the narrow cylindrical portion 202 of the base system 201, the upper surfaces of narrow cylindrical portion 202 and device-mounting member 203 are flush with one another.

Figure 3A:
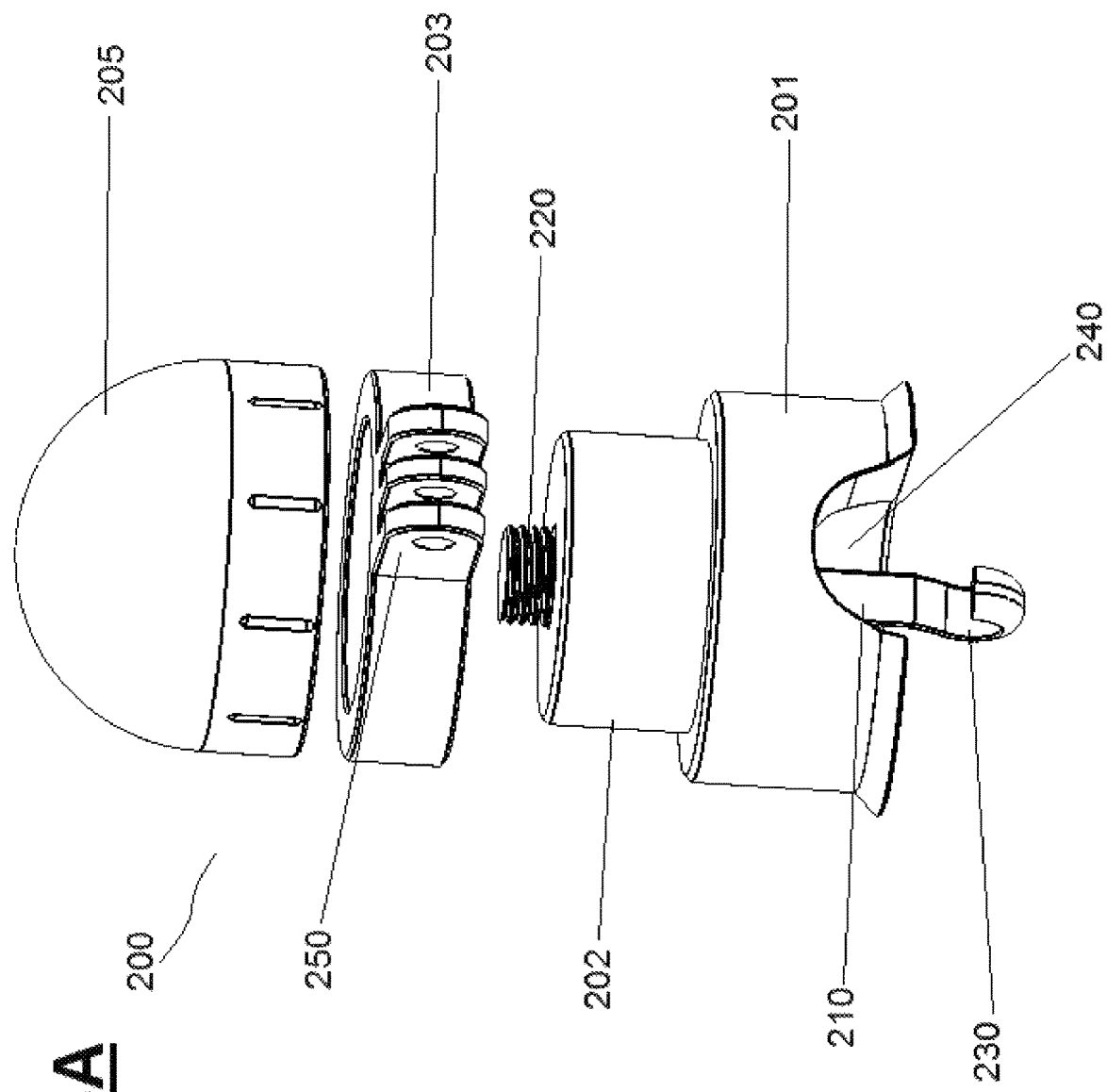
FIG. 3A shows an exploded perspective view of the device-mounting structure according to an embodiment of the present invention.
Figure 3B:
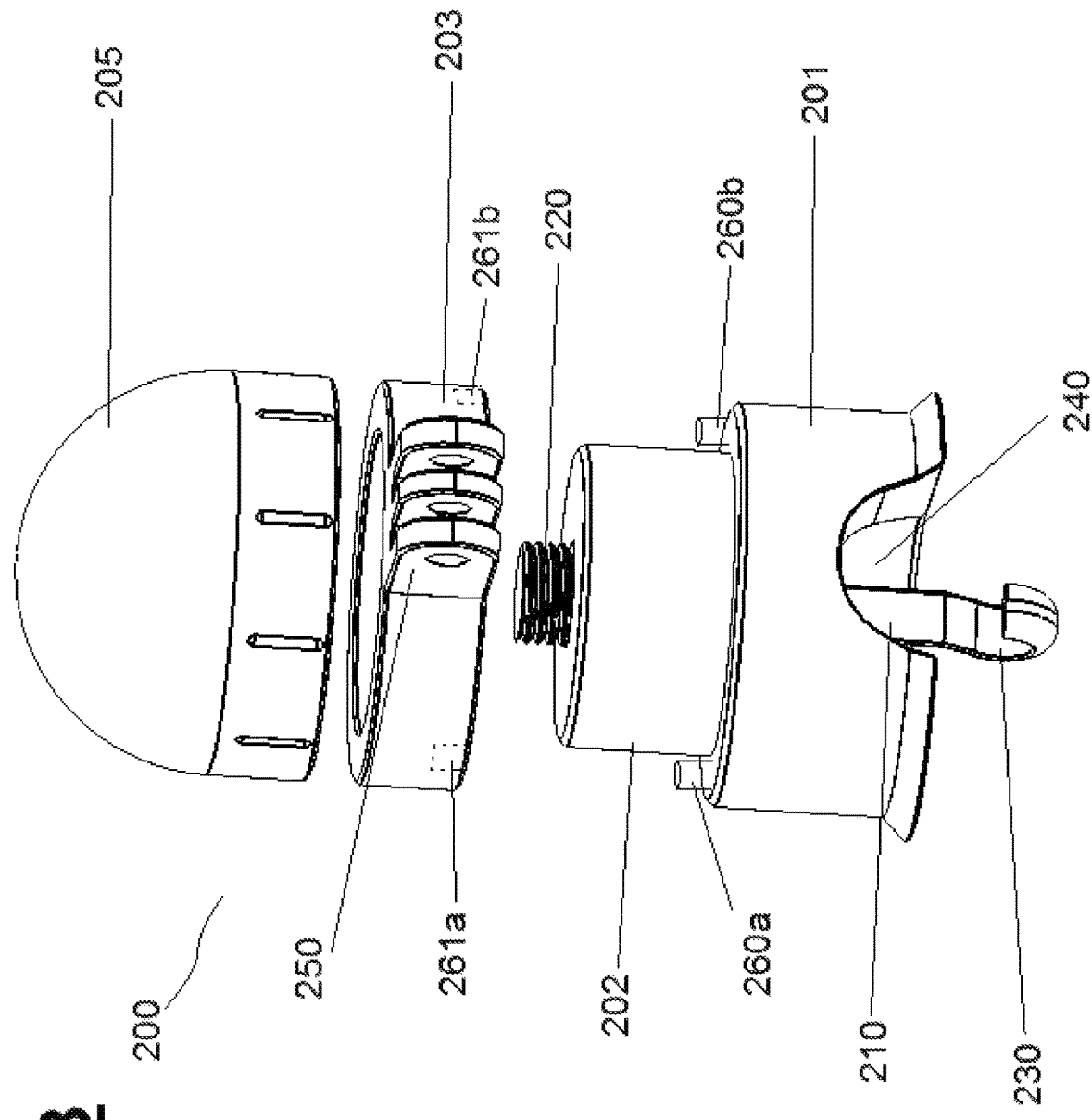
FIG. 3B shows an exploded perspective view of the device-mounting structure according to an embodiment of the present invention.
Figure 4:
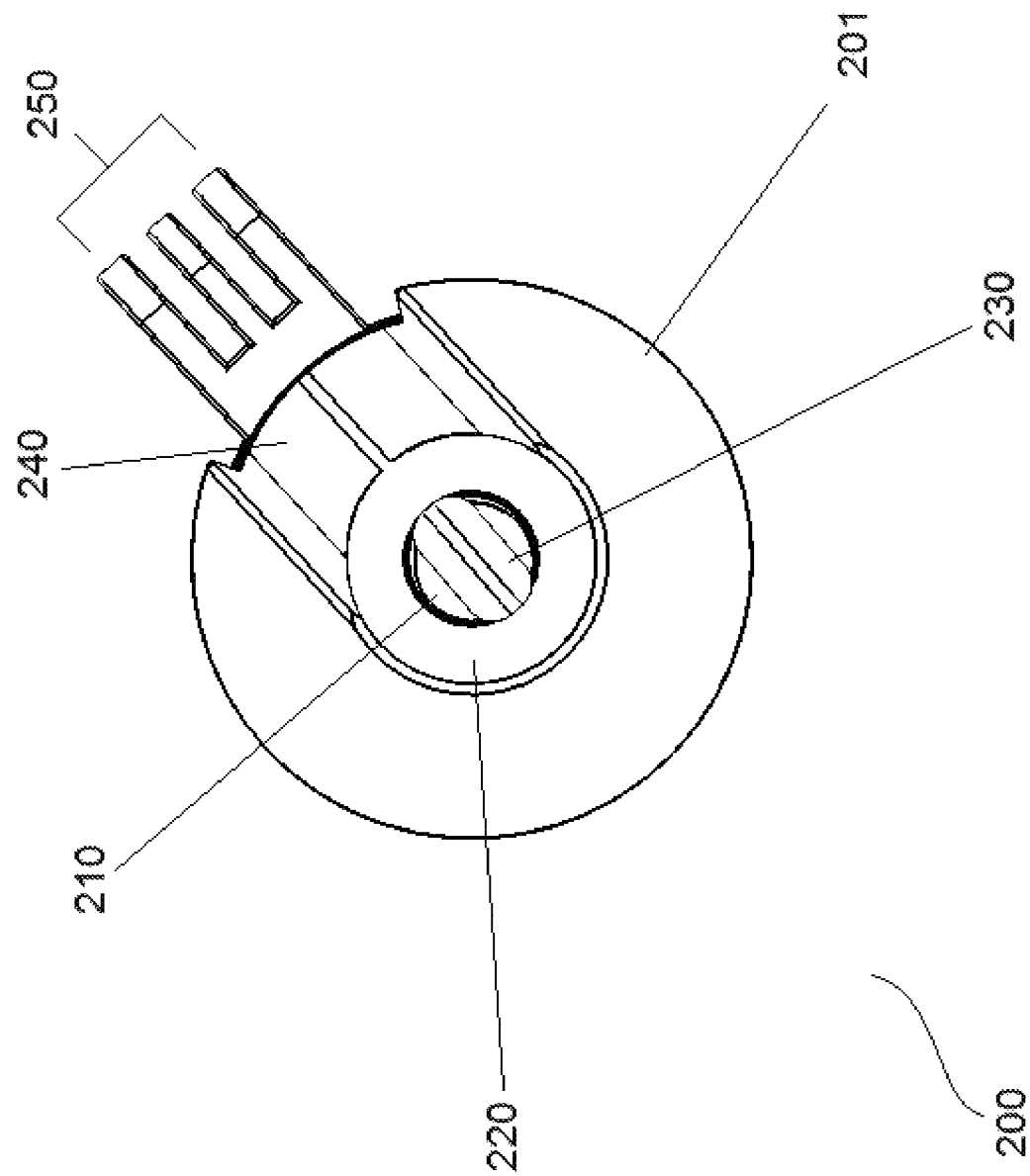
FIG. 4 shows a bottom view of a mounting adapter according to an embodiment of the present invention.
Figure 5:
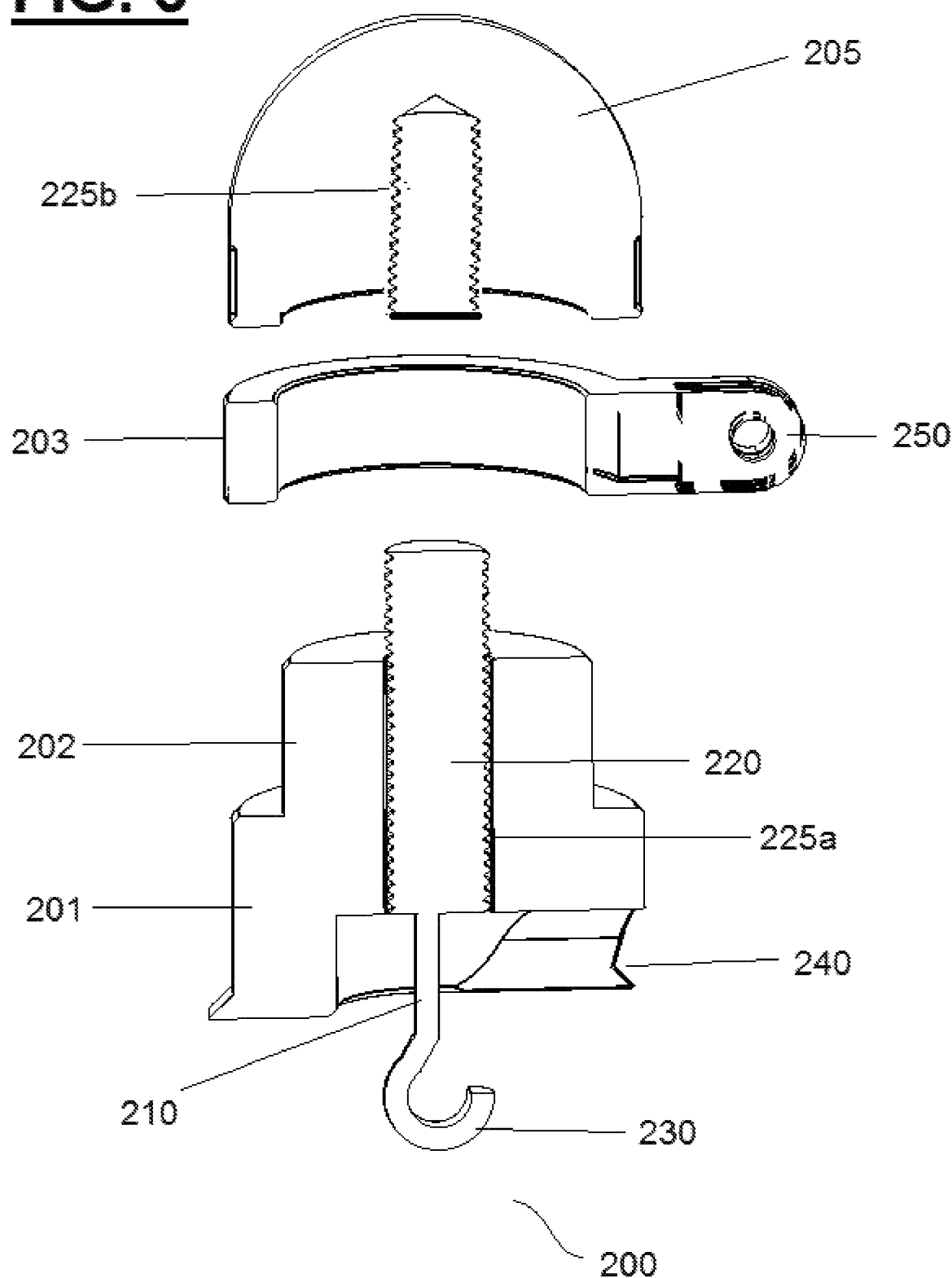
FIG. 5 shows an exploded cross-sectional view of a mounting adapter according to an embodiment of the present invention.

FIG. 2-6, without limiting the invention, illustrates a device-mounting adapter 200 for connecting to a surfboard leash plug according to an embodiment of the present invention. FIG. 2 provides an exploded view of the device-mounting adapter 200 to show the individual components thereof. The device-mounting adapter 200 includes a base member 201 which includes a narrow cylindrical portion 202. The device-mounting adapter 200 also has an attachment member 210 with a threaded superior end 220 and an inferior end 215 with a hook 230 for anchoring the device to the surfboard. The surfboard leash plug adapter 200 also includes a ring-shaped device-mounting member 203 having a device engagement mechanism 250 for attaching to devices (e.g., a camera) and a fastening cap 205. FIG. 5 shows a cross-sectional view of the mounting adapter 200 in which the threaded superior end 220 of the attachment member 210 may be inserted into the base member 201 via channel 225a. In some embodiments, and without limitation, the channel 225a may be a smooth-bore channel through which the superior end 220 of the attachment member is passively inserted. In other embodiments, the channel 225a may have threading complementary to the threading on the superior end 220 of the attachment member 210, allowing the base member itself to be tightened down on the upper surface of the surfboard. Additionally, the fastening cap 205 may engage and be attached to the superior end 220 by engaging a threaded channel 225b with the threading of the superior end 220.

FIG. 2-4 show that the base system 201 has a flat portion on bottom side thereof (the "base surface") that interfaces with the upper surface of a surfboard when the mounting adapter is engaged with a leash plug and installed on the upper surface of a surfboard. The base member 201 may have a central opening through the base surface through which the attachment member 210 may be passed through for passage through the channel 225a. To illustrate, FIG. 3 shows the superior end 220 of the attachment member passed through base system 201 and narrower cylindrical portion 202 and extends in an upward manner with respect to the base member 201. The central opening may have an inner diameter that is greater than the diameter of the larger surfboard leash plugs for surfboards on the market: the inner diameter of the base member may be at least about 2 inches. The base surface may be engaged with the upper surface of the surfboard around and adjacent to the leash plug when the base member is engaged with the attachment member and installed on the surfboard. In some embodiments, and without limitation, the base surface may have a compressible substance thereon (e.g., like a gasket), to be engaged with the surfboard to aid in preventing damage to the upper surface of the surfboard when the surfboard leash plug adapter 200 is anchored to the leash plug bar. In some embodiments, there may be a gasket that is separate and/or attachable to the bottom of base member 101. The compressible substance or gasket may be made from various materials, such as rubber, rubber foam, polymer foam, etc. In some embodiments, the compressible substance may be a non-stick material (e.g., polytetrafluoroethylene (PTFE)) to allow for quick and easy removal of the device mounting adapter from a surfboard, which may be sticky due to the application of surfing wax.

Additionally, FIG. 2 and FIG. 3A-B show that the base system 201 has a lateral port 240 in the wall of the base member 201 that allows one to access the attachment member during installation of the mounting adapter to ensure that the attachment member 210 properly engages the attachment bar of the surfboard leash plug. Additionally, the lateral port 240 provides space so that one can still properly attach a leash that is commonly used when surfing. The lateral port 240 may allow the surfboard leash to be fastened to the leash plug bar (e.g., via a leash string, which is a typical component of the leash) and pass through the lateral port 240, allowing the surfer to use the leash while surfing. In some examples, and without limitation, the lateral port 240 may be sufficiently small to pinch the leash against the surface of the surfboard, thereby anchoring the leash to the surfboard.

FIG. 2 and FIG. 3 show that the base system 201 and narrower cylindrical portion 202 house the threaded superior end 220 of the attachment member. The narrower cylindrical portion 202 of base system 201 allows for the ring-shaped device-mounting member 203 to fit over the narrow cylindrical portion 202 when assembling the surfboard leash plug adapter. The inner diameter of the ring-shaped adapter 203 is just larger than (substantially equal to) the outer diameter of narrow cylindrical portion 202. Therefore, the ring-shaped adapter 203 fits snugly when placed over 202. In some implementations, as shown in FIGS. 2-6, the uppermost surface of 202 may protrude slightly over the upper most surface of the device-mounting member 203, when the device-mounting member 203 is placed on the base member 201. In such implementations, the fastening cap 205 may overlap with an upper portion of the narrow cylindrical portion 202 when the fastening cap is installed over the narrow cylindrical portion 202, thereby nesting the upper portion of the narrow cylindrical portion 202 within the fastening cap 205. In other implementations the height of the ring shape adapter 203 may be substantially equal to the height as the narrow cylindrical portion 202 so that when the device-mounting member 203 is placed on the narrow cylindrical portion 202 of the base system 201, the upper surfaces of narrow cylindrical portion 202 and device-mounting member 203 are flush with one another.

Referring to FIG. 3A-B, the attachment member 210 has a superior end 220, an inferior end 215, and in this embodiment, a hook 230 which anchors the device-mounting adapter 200 to the attachment bar of the surfboard leash plug. FIG. 5 shows that the superior end 220 has a larger circumference than the inferior end 210 due to the threading. The superior end 220 may have a diameter of up to about 0.75 inch (e.g., in a range of about 0.125 in. to about 0.75, in a range of about 0.25 in. to about 0.5 in., or any value therein). The inferior end 220 includes a hook 230 having an inner diameter in a range of 0.15 inches to about 0.35 inches (e.g., about 0.25 inches, 0.30 inches, or any value therein) so that it can fit into any surfboard leash plug and around any attachment bar (which can have diameters of up to about 0.25 inch) and can be used to properly anchor the attachment member to the surfboard leash plug bar.

FIG. 5, without limiting the invention, further illustrates the current embodiment via a cross-sectional view. FIG. 5 shows the surfboard leash plug adapter 200, with the base system 201 and narrow cylindrical portion 202 housing the superior end of the attachment member 220 in the channel 225a. FIG. 5 illustrates that the device-mounting member 203 has an interior circumference that is complementary to the narrow cylindrical portion 202 of the base member so that it may securely slide over the portion. The device-mounting member 203 includes a device engagement mechanism 250, which provides a pivoting joint for engaging a complementary structure of a device. For example, there are camera devices available in the consumer electronics market (e.g., sports and action video cameras) that have attachment components that are complementary to the device engagement mechanism 250. Additionally, the fastening cap 205 has a complementary threaded channel 225b in the upper fastening cap and receives the threaded superior end 220 of the attachment member which protrudes in an upward manner with respect to 202. The fastening cap 205 is operable to compress the device mounting adapter 200 onto the upper surface of the surfboard as it is threaded onto the upper portion 220 of the attachment member 210. In some implementations, the channel 225a may have threading complementary to the threading on the superior end 220 of the attachment member 210, allowing the base member itself to be tightened down on the upper surface of the surfboard, as mentioned above.

In some embodiments, and without limitation, the bottom surface of the fastening cap 205 that is placed over the device mounting member 203 may have a compressible substance thereon (e.g., like a gasket), to be engaged with the upper surface of the device mounting member 203. In some embodiments, there may be a gasket that is separate and/or attachable to the bottom of fastening cap 205. The compressible substance or gasket may be made from various materials, such as rubber, rubber foam, polymer foam, etc.

FIG. 5 provides a cross-sectional view of the components of the device-mounting adapter, such that one of ordinary skill in the art can see and understand how the device-mounting adapter is assembled for use. The attachment member 210 may first be engaged with the attachment bar of a leash plug, and subsequently, the base member 201 may be passed over the attachment member 210 until the base surface of base member 201 is pressed against the upper surface of the surfboard around and adjacent to the leash plug. In some implementations, the base member 201 may have a smooth-bore central channel 225a, and the base member 201 may be simply passed over the superior end 220 of the attachment member. In other implementations, the channel 225a may be threaded, allowing the base member 201 to be threaded down over the attachment member 210 until it is snuggly pressed against the upper surface of the surfboard. In an exemplary method of tightening the base member 201 down over the attachment member 210, the user may engage the threading of the channel 225a prior to engaging the hook structure 230 with the attachment bar, then hook the hook structure 230 around the attachment bar, and then continue to thread the base member 201 down over the attachment member 210 while applying upward pressure on the attachment member (e.g., by pulling upward on the superior end of the attachment member as the base member is threaded down onto the upper surface of the surfboard). In some implementations, the base member 201 may be tightened down over the surface of the surfboard to the point that it applies total pressure in a range of about 10 lbs. to about 100 lbs. to the upper surface of the surfboard.

Once the base member is installed over the upper surface of the surfboard, the device-mounting member 203 may be positioned on the narrow cylindrical portion 202 of base member 201. In some implementations, the device-mounting member may be fixed in position when it is placed on the base member by an interlocking structure between the base member and the device-mounting member (e.g., such as pegs and complementary holes, interlocking hooks and flanges [e.g., Storz-style connectors], or other connecting structures). For example, FIG. 3b shows an implementation of device mounting adapter 200 in which pegs 260a and 260b are position on the annular horizontal surface of the base member 201 that is adjacent to the narrow cylindrical portion 202. These pegs 260a and 260b engage with receiver holes 261a and 261b in the bottom of the device-mounting member 203, and function to hold the device mounting member 203 in a static position relative to the base member 201. In such implementations, the position of the device engagement mechanism 250 relative to the base member 201 cannot be changed, but the position of the device engagement mechanism 250 relative to the surfboard may be changed by adjusting the rotational position of the base member 201 (e.g., where base member 201 has a smooth-bore channel 225a). Thus, the device engagement mechanism 250 has 360° of optional positions relative to the surfboard.

In other embodiments, the device-mounting member may be adjustable in its position over the base member, allowing it to be rotated such that a device-engagement mechanism thereon may be positioned according to the user's preferences. For example, FIG. 3A shows the device-mounting member 203 without pegs or other interlocking structures. In such implementations, the device-mounting member 203 may be freely rotatable when positioned on the narrow cylindrical portion 202 so that it can be positioned as desired by the user at any angular position around narrow cylindrical portion 202 (e.g., it has 360° of optional positions). Once the device-mounting member 203 in the user's desired position, the fastening cap 205 may be installed over the device-mounting member 203.

Figure 6:
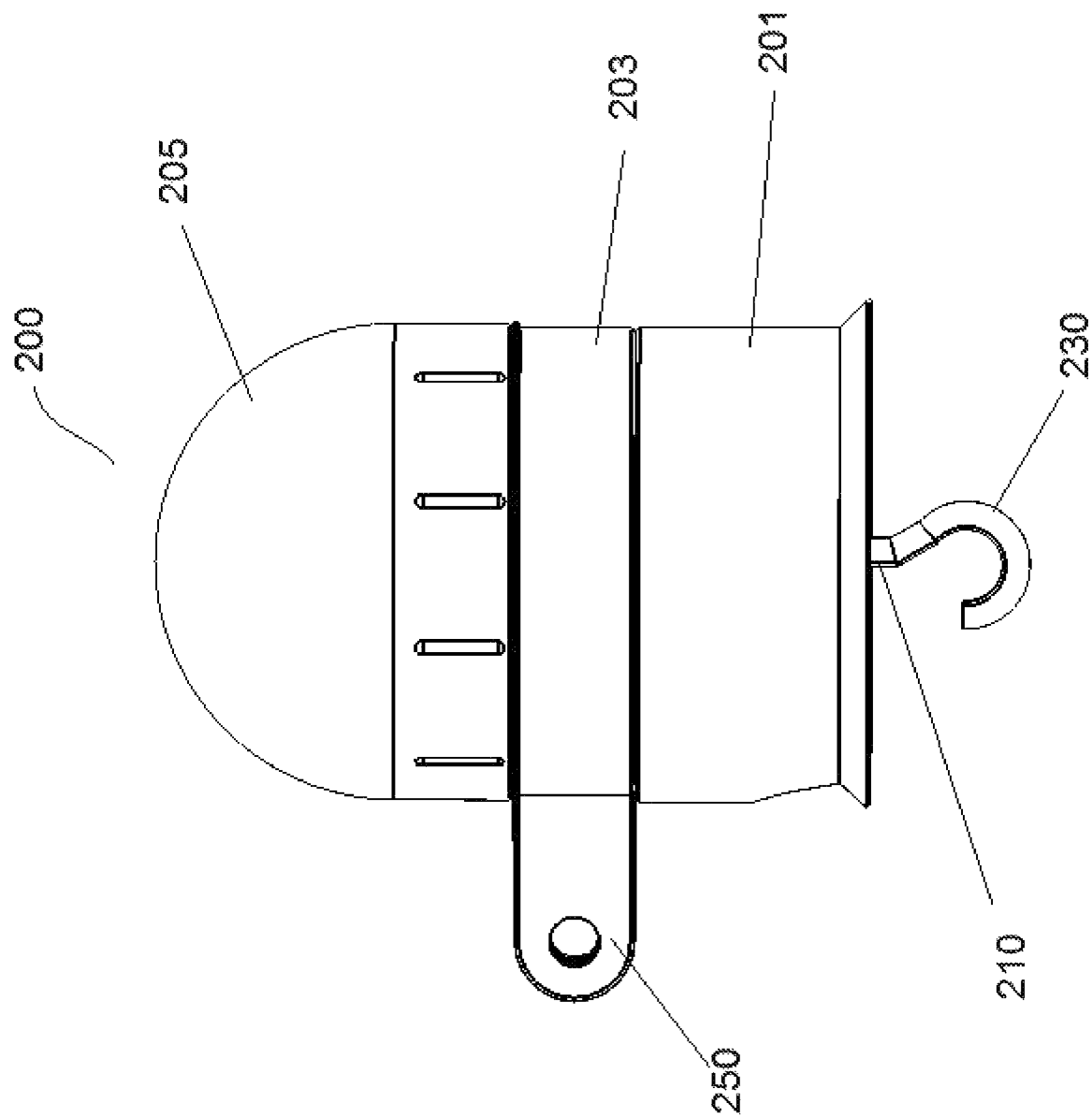
FIG. 6 shows a side view of a mounting adapter according to an embodiment of the present invention.

The fastening cap may be installed over the device-mounting member 203 by threading over the superior end 220 of the attachment member 210. Upon mating the complementary threaded channel 225b with the threading on the protruding superior end 220 of the attachment member 210, the fastening cap 205 may be threaded down over the device-mounting member 203 to secure the device-mounting member 203 in position. Once the fastening cap 205 is securely fastened over the superior end 220 of the attachment member 210 and the device-mounting member 203, device-mounting adapter 100 is fully installed on the surfboard, and is held tightly via the tensile stress applied to the attachment bar and the pressure applied by the base surface against the surfboard. An exemplary, fully assembled device-mounting adapter 200 is shown in FIG. 6. Once the device-mounting adapter 200 is fully installed on the surfboard, a device may be attached to the device-engagement mechanism 250 (e.g., a camera to allow the user to take photos and/or video of his surfing activities).

It is to be appreciated that the device engagement mechanism 250 secures a device by inserting a device (or device adapter) having a complementary structure for engaging the device engagement mechanism. A fastener (e.g., a screw, such as a thumb screw, pin, bar, etc.) may be used to secure the device (or device adapter) to the device engagement mechanism 250. The fastener is meant to be sturdy as to hold the device to the device mounting adapter but removable so that one can remove the device.

Figure 7A:
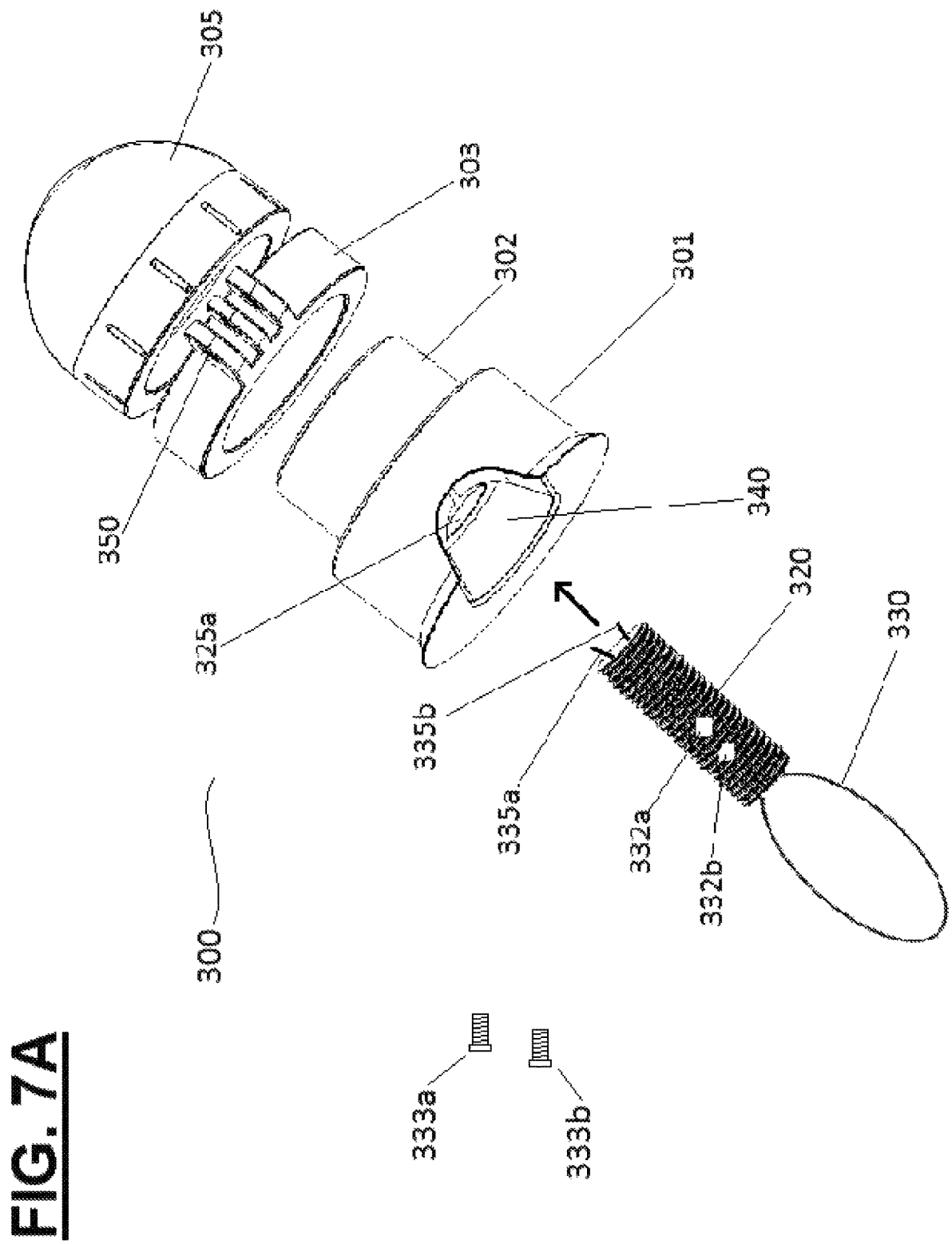
FIG. 7A shows an exploded perspective view of a mounting adapter according to an embodiment of the present invention.
Figure 8:
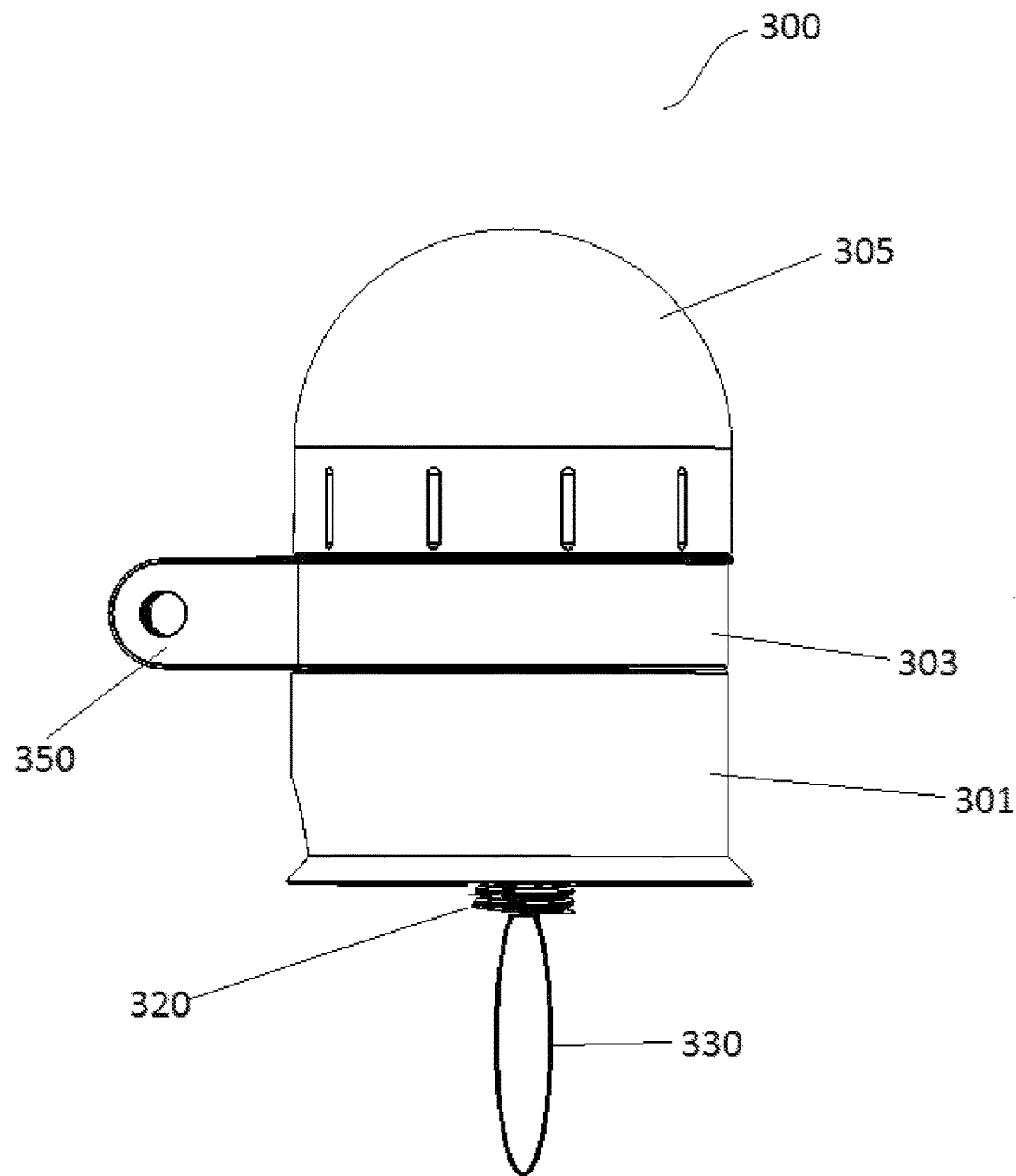
FIG. 8 shows a side view of assembled mounting adapter device according to an embodiment of the present invention.

FIGS. 7A-B and FIG. 8, without limiting the invention, illustrates an embodiment of a device-mounting adapter 300 according to an embodiment of the present invention. FIG. 7A shows the components of the surfboard leash plug adapter 300. The device-mounting adapter 300 includes a base member 301 which includes a narrow cylindrical portion 302. The device-mounting adapter 300 also has an attachment member 310 with a threaded body 320 and a flexible wire 330 for anchoring the device to the leash plug attachment bar. FIGS. 7A-B shows that the flexible wire 330 has a first end 335a and a second end 335b to be received an interior channel 323 within the body 320 of the attachment member 310. The flexible wire 330 may be a durable metal metal (e.g., woven steel) or composite material (e.g., a carbon fiber composite) that has sufficient tensile strength to withstand the force applied thereto when the device-mounting adapter is fully installed on the surfboard (e.g., a tensile force of about 10 lbs. to about 100 lbs.). The flexible wire 330 may also be resistant to abrasion wear, preventing or reducing damage that may be caused by the interface of the flexible wire 330 with the attachment bar of the leash plug (e.g., the flexible wire 330 may be coated with a polymer material such as nylon materials, polyester materials [e.g., PETP, PBT, etc.], polyethylene materials, polyamide-imide (PAI) materials, etc. The first end 335a and second end 335b of the flexible wire are inserted into interior channel 323 and two fastening members 333a and 333b (e.g., screws—such as Allen screws, locking pins, etc.) may be used to secure the flexible wire 330 when the fastening members 333a and 333b are inserted and tightening into the fastener holes 332a and 332b in the attachment member 310. The device-mounting adapter 300 includes a ring-shaped device-mounting member 303 with device-engagement mechanism 350 and a fastening cap 305. In some embodiments, the device-mounting member 303 may be fixed in position when it is placed on the base member 301 by an interlocking structure between the base member 301 and the device-mounting member 303 (e.g., such as pegs and complementary holes, interlocking hooks and flanges [e.g., Storz-style connectors], or other connecting structures). In other embodiments, the device-engagement mechanism 350 may be adjustable in its position over the base member 301, allowing it to be rotated such that a device-engagement mechanism 350 thereon may be positioned according to the user's preferences.

FIG. 7B shows a cross-sectional view of the device-mounting adapter 300 and shows that the body 320 of the attachment member 310 is passed through the channel 325a and is to be received in the fastening cap 305 within a complementary threaded channel 325b. In some implementations, the channel 325a of the base member 310 may have complementary threading that engages the threading of the body 320, allowing the base member 301 to be threaded down over the attachment member 310 until it is snuggly pressed against the upper surface of the surfboard.

FIG. 7a shows that the base system 301 has a flat portion on the bottom surface thereof that interfaces with the upper surface of a surfboard when the device-mounting adapter 300 is engaged with a leash plug and installed on the upper surface of a surfboard. The base member 301 may have a central opening and a channel 325a through which the attachment member 310 may be passed. To illustrate, FIG. 7B shows the body 320 of the attachment member 310 passes through base system 301 and narrower cylindrical portion 302 via the channel 325a and extends in an upward manner with respect to the base member 301. The central opening may have an inner diameter that is greater than the diameter of the larger surfboard leash plugs for surfboards on the market: the inner diameter of the base member may be at least about 2 inches. The base surface may be engaged with the upper surface of the surfboard around and adjacent to the leash plug when the base member is engaged with the attachment member and installed on the surfboard. In some embodiments, and without limitation, the base surface may have a compressible substance thereon (e.g., like a gasket) to be engaged with the surfboard to aid in preventing damage to the upper surface of the surfboard when the surfboard leash plug adapter 100 is anchored to the leash plug bar.

Additionally, FIG. 7A shows the base system 301 has a lateral port 340 in the wall of the base member 301 that allows one to access the attachment member during installation of the device-mounting adapter to aid in the process of positioning the base member 301 over the upper surface of the surfboard. Additionally, the lateral port 340 provides space so that one can still properly attach a leash that is commonly used when surfing. The lateral port 340 may allow the surfboard leash to be fastened to the leash plug bar and pass through the lateral port 340, allowing the surfer to use the leash while surfing. In some examples, and without limitation, the lateral port 340 may be sufficiently small to pinch the leash against the surface of the surfboard, thereby anchoring the leash to the surfboard.

FIG. 7A and FIG. 7B show that the base member 301 and narrower cylindrical portion 302 receive the threaded body 320 of the attachment member 310. The narrower cylindrical portion 302 of base system 301 allows for the ring-shaped device-mounting member 303 to fit over the narrow cylindrical portion 302 when assembling the device-mounting adapter 300. The inner diameter of the ring-shaped adapter 303 is just larger than (substantially equal) to the outer diameter of the narrow cylindrical portion 302. Therefore, the ring-shaped adapter 303 fits snugly over narrow cylindrical portion 302 when it is installed thereover. In some implementations, the uppermost surface of the narrow cylindrical portion 302 may protrude slightly over the upper most surface of the device-mounting member 303, when the device-mounting member 303 is placed on the base member 301. In such implementations, the fastening cap 305 may overlap with an upper portion of the narrow cylindrical portion 302 when the fastening cap is installed over the narrow cylindrical portion 302, thereby nesting the upper portion of the narrow cylindrical portion 302 within the fastening cap 205. In other implementations, the height of the ring shape adapter 303 may also be substantially equal to the height as the narrow cylindrical portion 302 so that when the device-mounting member 303 is placed on the narrow cylindrical portion 302 of the base system 301, the upper surfaces of narrow cylindrical portion 302 and device-mounting member 303 are flush with one another.

Referring to FIGS. 7A and 7b, the attachment member 310 has a body 320 and a flexible wire 330 that anchors the device-mounting adapter 300 to the attachment bar of the surfboard leash plug. The flexible wire 330 may have a diameter of up to about 0.20 inches (e.g., in a range of about 0.1 in. to about 0.20 in., in a range of about 0.13 to about 0.18 in., about 0.19 in., or any value therein) that anchors the device-mounting adapter 300 to the attachment bar. It is to be appreciated that the flexible wire 330 has a sufficient length to accommodate all surfboard leash plugs, wherein the interior channel 323 is meant to house any excess flexible wire. Protrusions of the flexible wire 330 from the interior channel 323 do not interfere with the attachment of the fastening cap 305 during the assembling of the device-mounting adapter 300. FIGS. 7A and 7B show that the flexible wire is secured within an interior channel 323 of the attachment member 310. The first end 335a and second end 335b of the flexible wire 330 may be inserted into interior channel 323 and then secured within the channel 323 by two fastening members 333a and 333b (e.g., screws, such as Allen screws, locking pins, etc.) which are inserted into complementary holes 332a and 332b on the attachment member 310.

FIG. 7B, without limiting the invention, provides a cross-sectional view of the device-mounting adapter 300, with the base member 301 and narrow cylindrical portion 302 receiving the body 320 of the attachment member 310 in channels 325a and 325b, which may have threading complementary to the threading on the attachment member 310. FIG. 7B illustrates that the device-mounting member 303 has an interior circumference that is complementary to the narrow cylindrical portion 302 of the base member so that it may securely slide over the portion. The device-mounting member 303 includes a device engagement mechanism 350, which may include a pivoting joint for engaging a complementary structure of a device. For example, there are camera devices available in the consumer electronics market (e.g., sports and action video cameras) that have attachment components that are complementary to the device engagement mechanism 350. The fastening cap 305 may be threaded down over the device-mounting member 303 to secure the device-mounting member 303 in position. Once the fastening cap 305 is securely fastened over the body 320 of the attachment member 310 and the device-mounting member 303, the device-mounting adapter 300 is fully installed on the surfboard, and is held tightly via the tensile stress applied to the attachment bar and the pressure applied by the base surface against the surfboard. An exemplary, fully assembled device-mounting adapter 300 is shown in FIG. 8. Once the device-mounting adapter 300 is fully installed on the surfboard, a device may be attached to the device-engagement mechanism 350 (e.g., a camera to allow the user to take photos and/or video of his surfing activities).

Figure 9A:
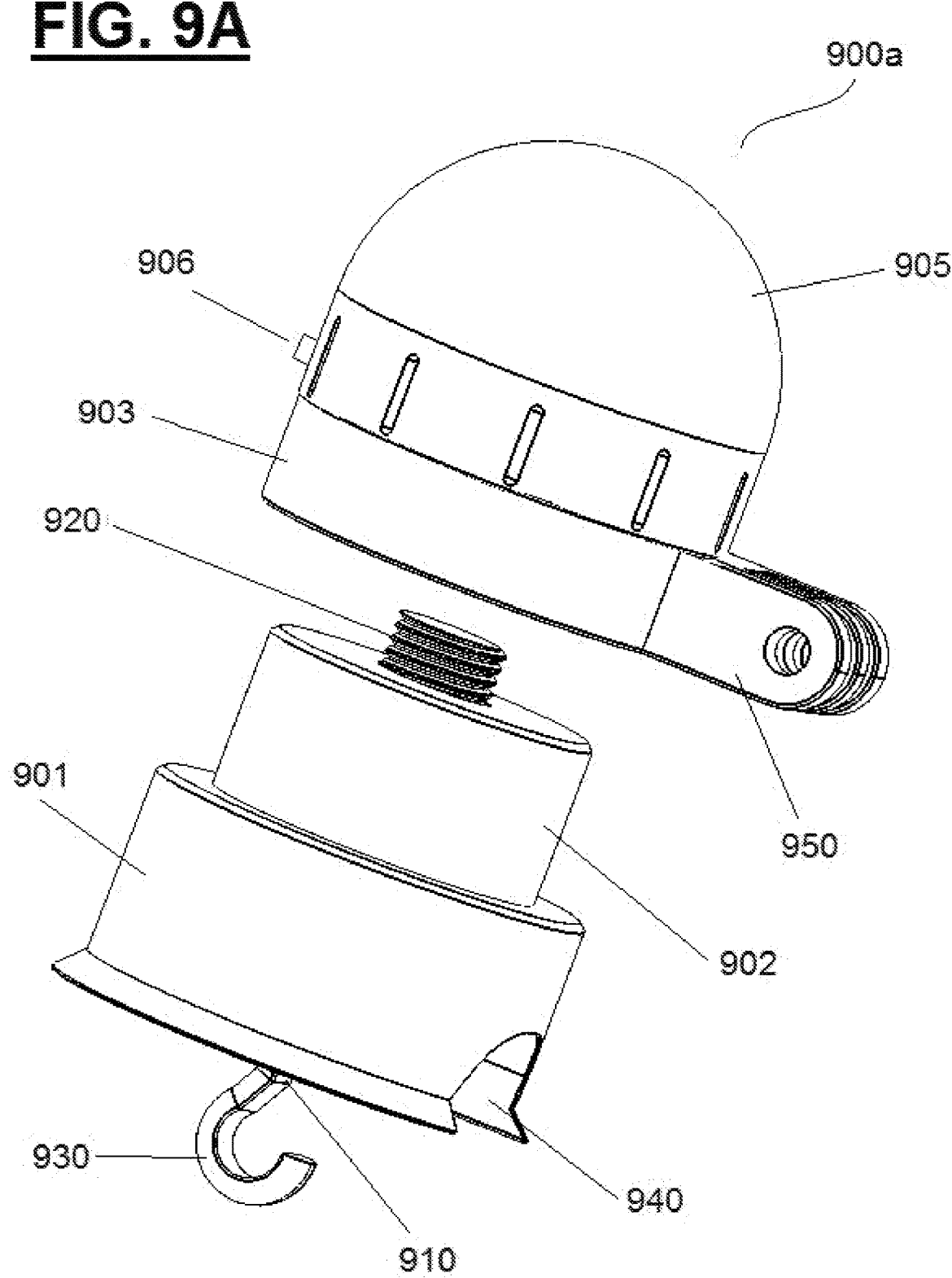
FIG. 9A shows a perspective view of a mounting adapter according to an embodiment of the present invention.
Figure 9B:
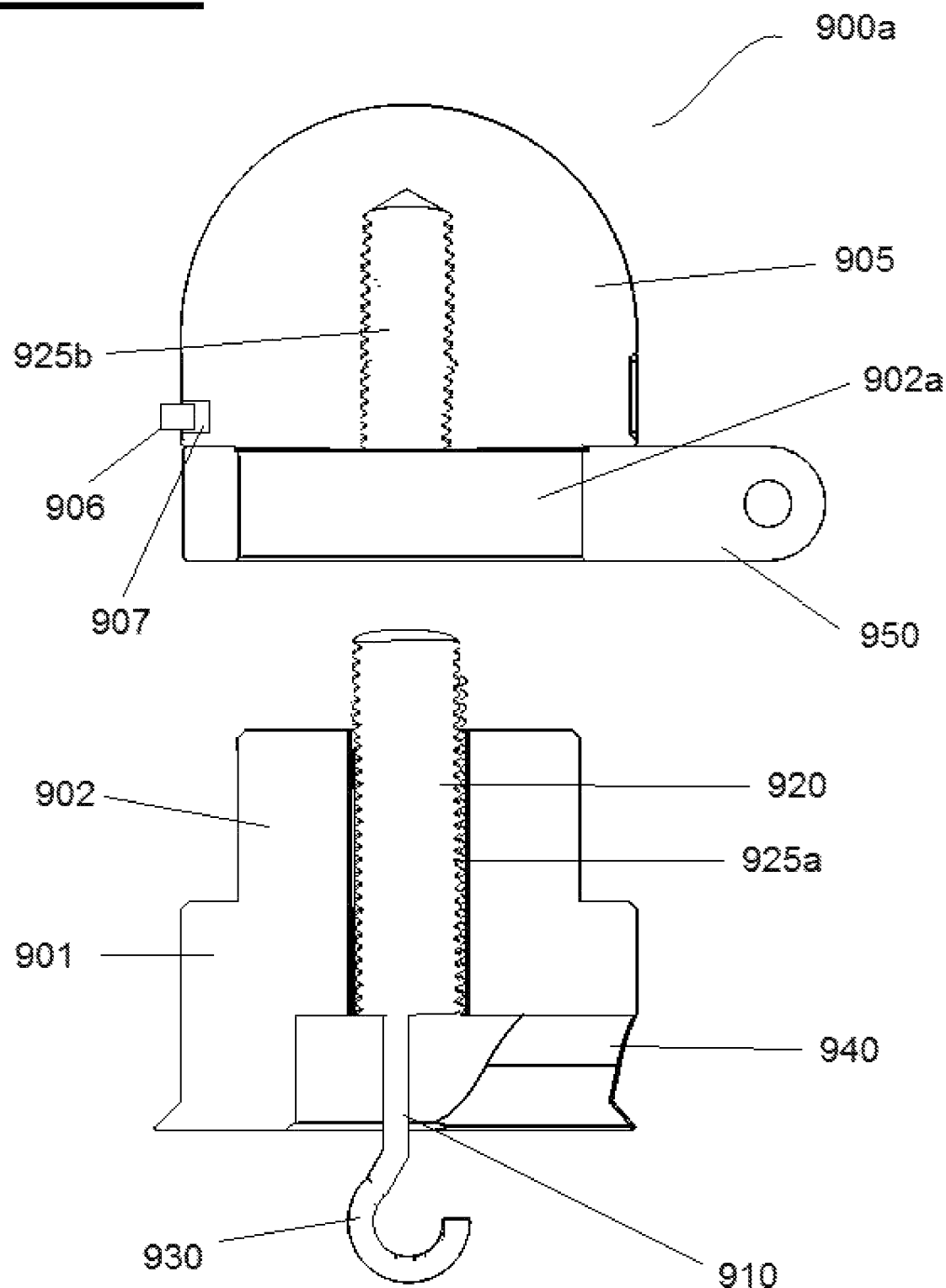
FIG. 9B shows a cross-sectional view of a mounting adapter according to an embodiment of the present invention.
Figure 9C:
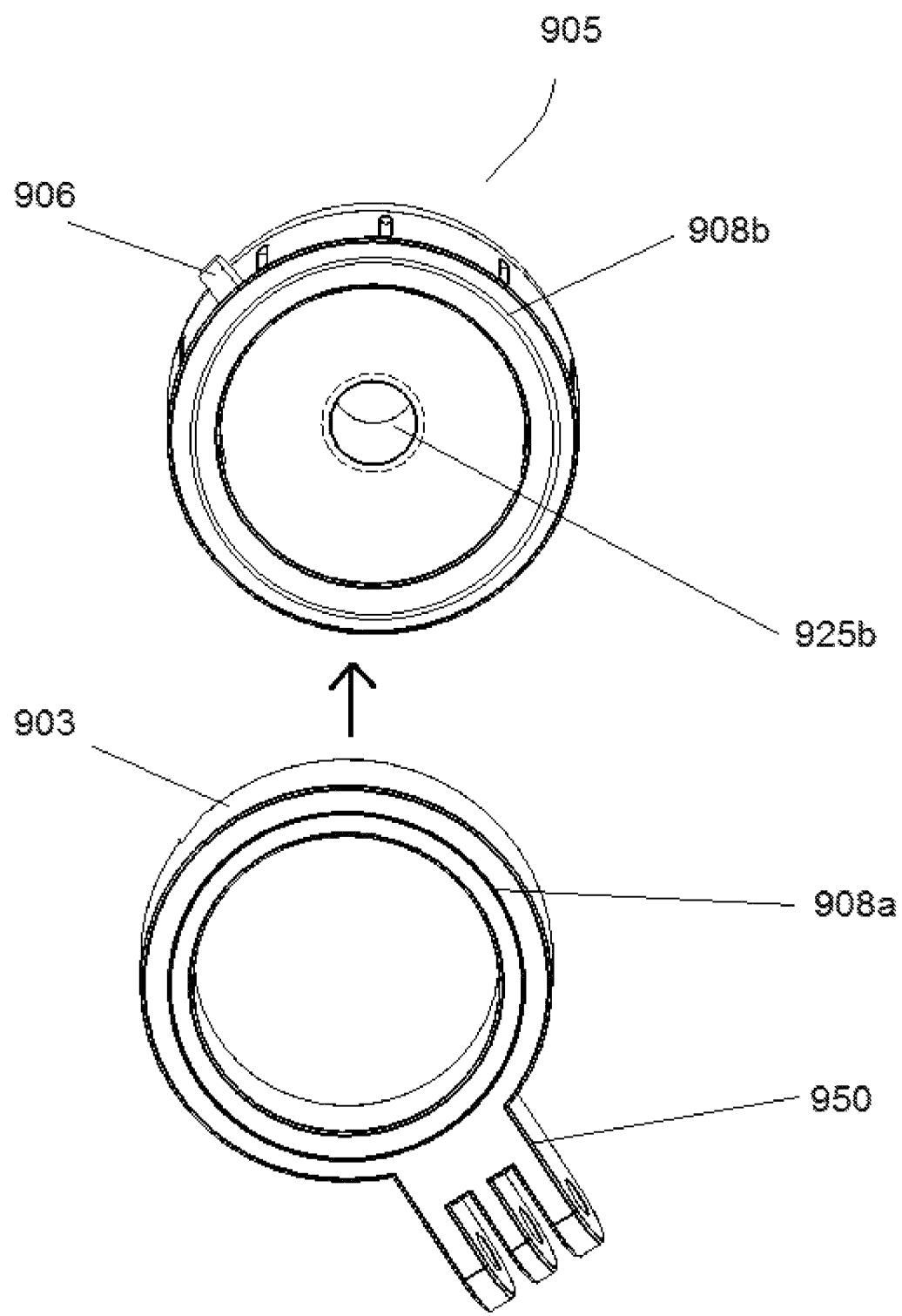
FIG. 9C shows a bottom perspective view of a fastener cap and a device-mounting member of a mounting adapter according to an embodiment of the present invention.

FIG. 9A-C, without limiting the invention, illustrates an embodiment of the device-mounting adapter 900a for connecting to a surfboard leash plug attachment bar according to an embodiment of the present invention. Several aspects of the embodiment are similar or the same as those disclosed and described above with respect to other embodiments. FIG. 9A provides a side view of the device-mounting adapter 900 to show the components thereof. The device-mounting adapter 900a includes a base member 901 which includes a narrow cylindrical portion 902. The device mounting adapter 900 also has an attachment member 910a with a threaded superior end 920 and an inferior end 915 with a hook 930 for anchoring the device to the surfboard. The device-mounting adapter 900 also includes a device engagement mechanism 950 on the fastening cap 905. FIG. 9B shows fastening cap 905 has a complementary cavity 902a that has an interior circumference that is just larger than (substantially equal to) the outer circumference of the narrow cylindrical portion 902. Furthermore, FIG. 9B shows that the complementary cavity 902a has a depth that is substantially equal to the height of the narrower cylindrical portion 902. FIG. 9C shows that the fastener cap 905 has a ratcheting mechanism comprising a protrusion 908a and a complementary groove 908b to receive the protrusion 908a. The ratcheting mechanism allows the device engagement mechanism 950 to be rotated to a desired position. FIGS. 9A-C depict, without limitation, a locking device 906 (e.g., a spring and ball, a bar, a pin, etc.). The locking device 906 is housed in channel 907 in the fastening cap 905 and when engaged, the locking device 906 interacts ratcheting mechanism in fastening cap 905 to lock the device engagement mechanism 950 in position and prevent movement of the device-mounting member 903 and the device engagement mechanism 950. FIG. 9A and FIG. 9B show that the superior end 920 of the attachment member 910 is received in a channel 925a in the base member 901. The superior end 920 may also be received in a complementary channel 925b in the fastening cap 905 when the device-mounting adapter 900a is assembled.

FIG. 9B, without limiting the invention, provides a cross-sectional view of device-mounting adapter 900a, with the base member 901 and narrow cylindrical portion 902 receiving the superior end 920 of the attachment member 910 in channel 925a. FIG. 9B illustrates that the fastening cap 905 with device-mounting member 950 has an interior circumference that is complementary to the narrow cylindrical portion 902 of the base member so that it may securely slide over the portion. The device engagement mechanism 950 of the fastening cap provides a pivoting joint for engaging a complementary structure of a device. For example, there are camera devices available in the consumer electronics market (e.g., sports and action video cameras) that have attachment components that are complementary to the device engagement mechanism 950. Additionally, the fastening cap 905 has a channel 925b for receiving the threaded superior end 920 of the attachment member 910.

Figure 9D:
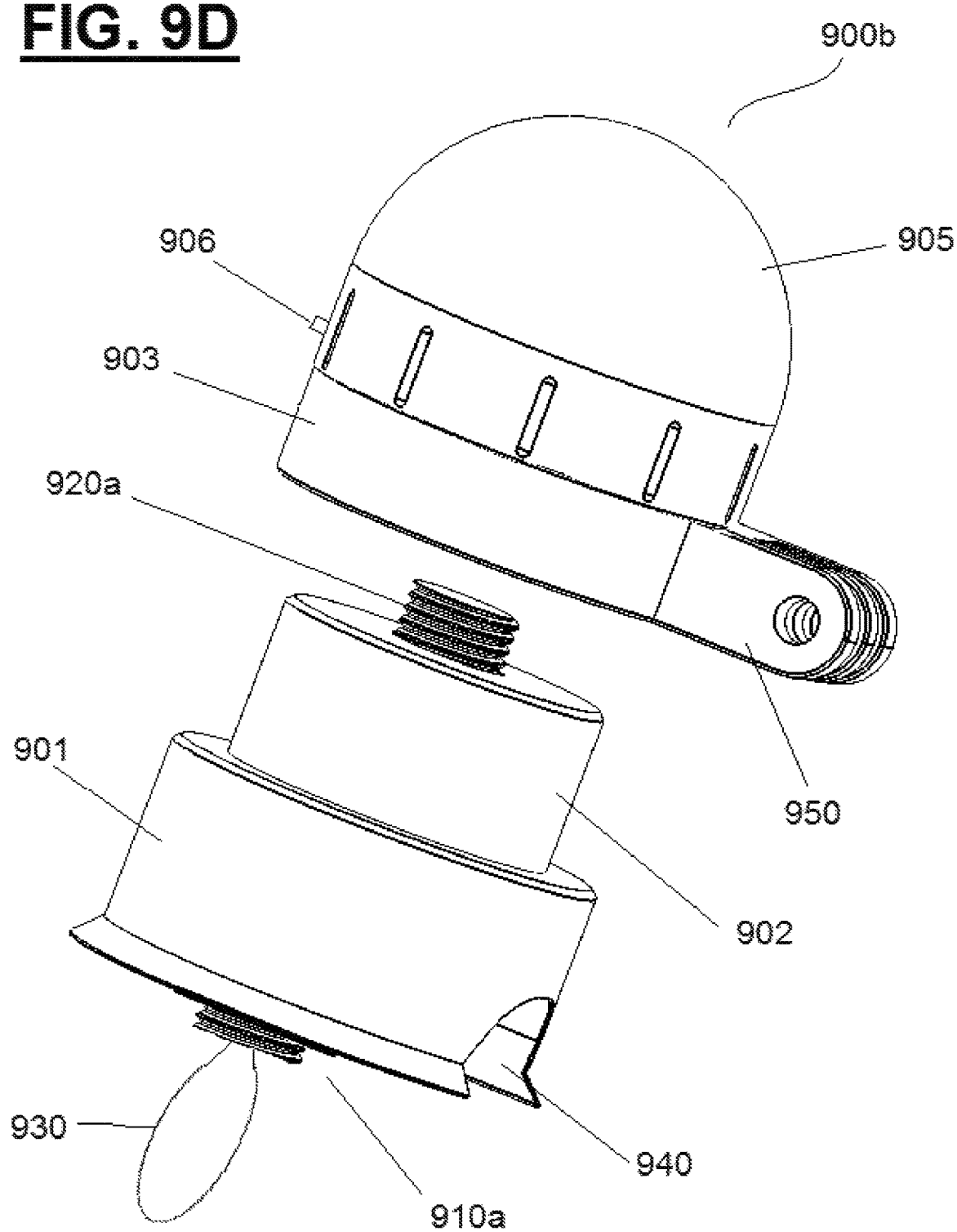
FIG. 9D shows a perspective view of a mounting adapter according to an embodiment of the present invention.
Figure 9E:
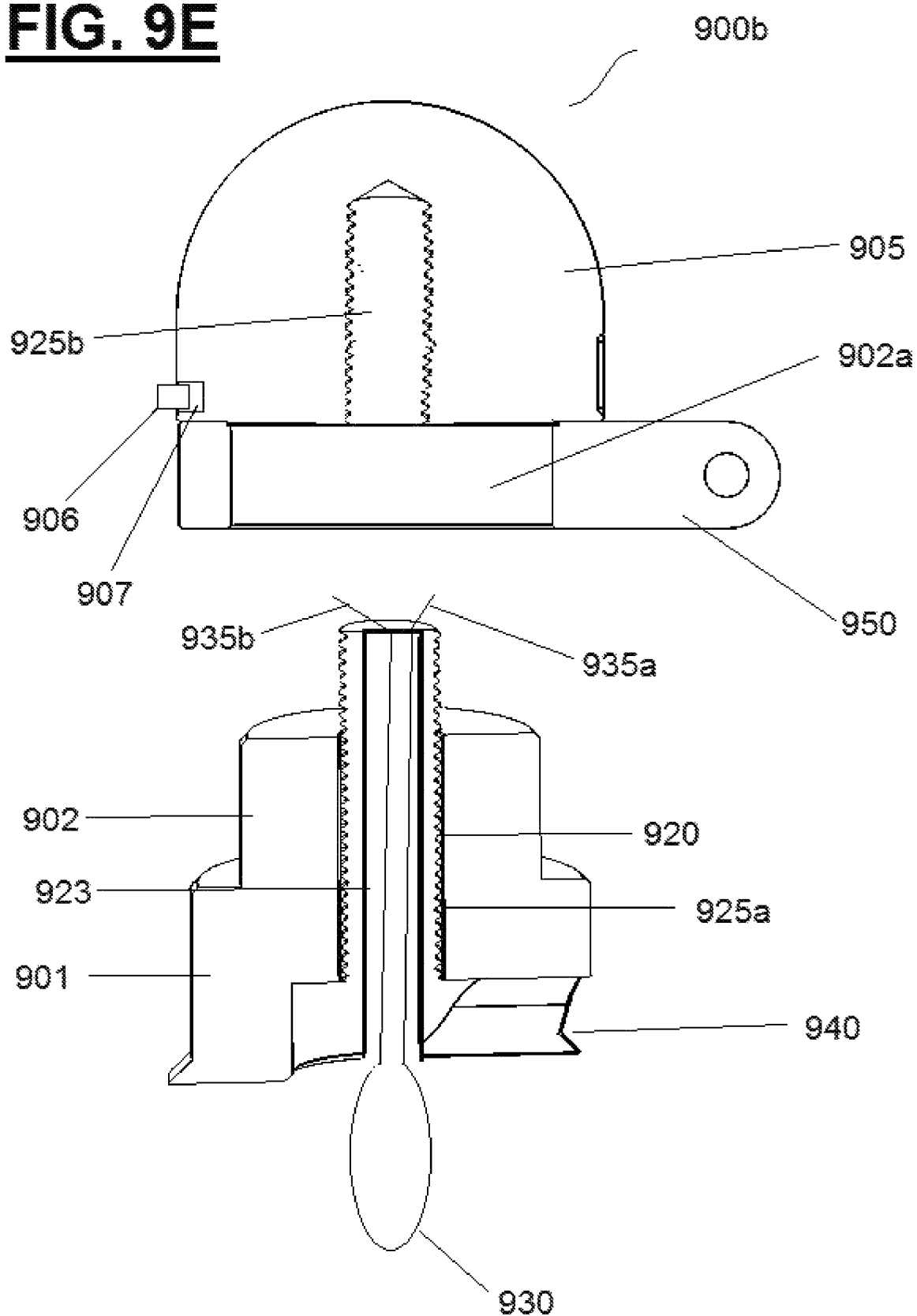
FIG. 9E shows a cross-sectional view of a mounting adapter according to an embodiment of the present invention.

In still further embodiments, the device-mounting adapter 900b may be used with an attachment member 910a having a flexible wire 930 as a mechanism for engaging an attachment bar of a surfboard leash plug, as previously described herein. FIGS. 9D-E, without limiting the invention, illustrate an embodiment of the device-mounting adapter 900 that includes an attachment member 910a with a threaded body 920a and a flexible wire 930 for anchoring the device to the attachment bar. The flexible wire has a first end 935a and a second end 935b to be received an interior channel 923 within the attachment member 910a. The first end 935a and second end 935b of the flexible wire are inserted into interior channel 923 and two fastening members (e.g., screws, such as Allen screws, locking pins, etc.) may be used to secure the flexible wire 930b when the fastening members are inserted and tightened into the fastener holes in the attachment member 910b.

FIGS. 9D and 9E show that the base member 901 and narrow cylindrical portion 902 receive the body 920a of the attachment member 910a in a similar manner to other embodiments described herein. The body 920a may have a diameter of up to about 0.50 inches such that it can fit in any surfboard leash plug and the flexible wire may have a thickness of up to about 0.20 inch (e.g., in a range of about 0.1 in. to about 0.20 in., in a range of about 0.13 to about 0.18 in., about 0.19 in., or any value therein), such that it has sufficient structural strength to properly anchor the attachment member to an attachment bar. The flexible wire 930 may have a length that can accommodate all surfboard leash plugs, and the interior channel 923 is meant to house any excess flexible wire. Protrusions of the flexible wire 930 from the interior channel 923 do not interfere with the ability to assemble the surfboard leash plug adapter 900b. The remaining aspects of the device-mounting adapter 900 are as described above with respect to FIGS. 9A-C.

Figure 10A:
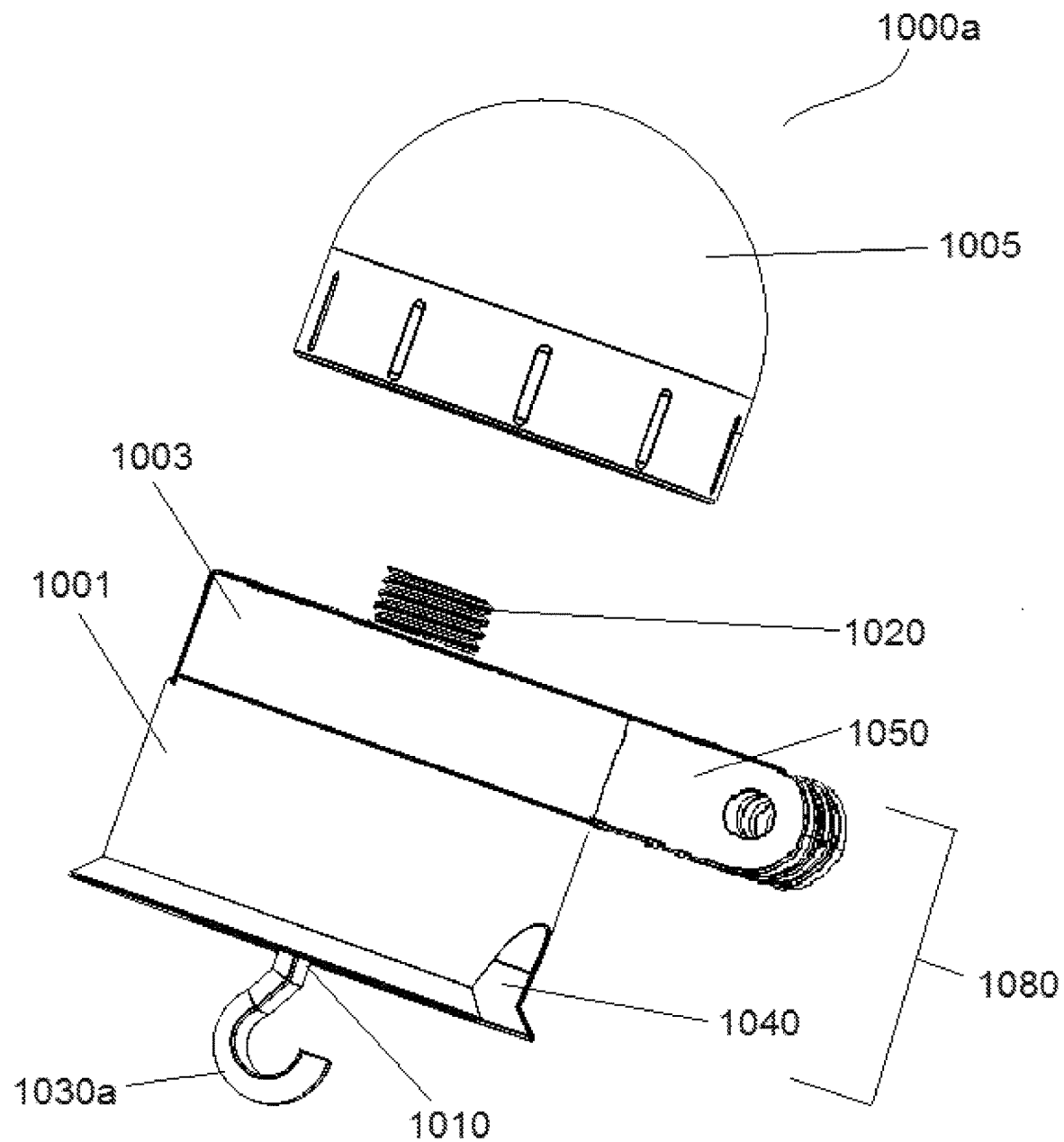
FIG. 10A shows a side view of a mounting adapter according to an embodiment of the present invention.
Figure 10B:
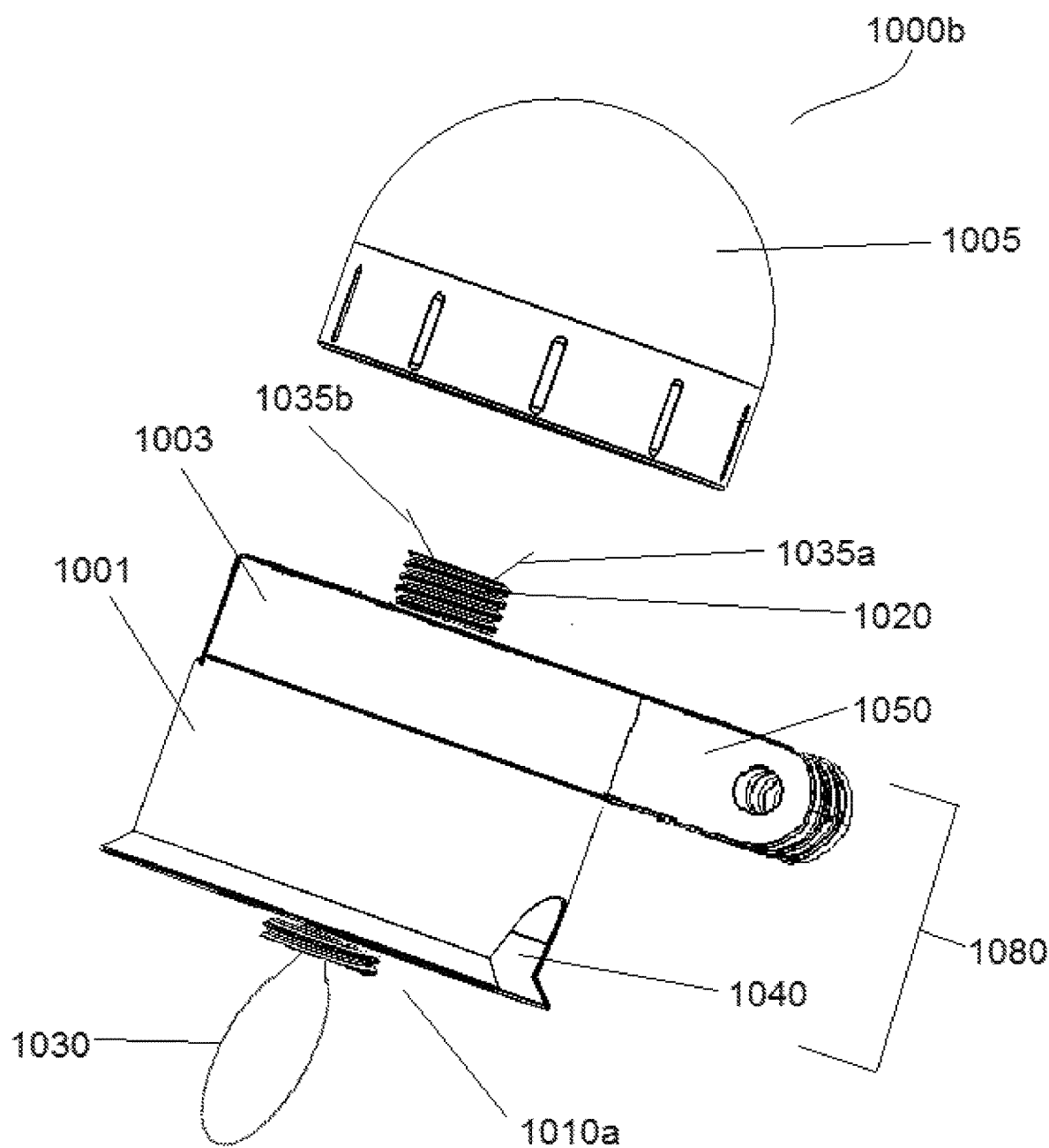
FIG. 10B shows a side view of a mounting adapter according to an embodiment of the present invention.

FIGS. 10A-B show an alternate embodiment in which the ring-shaped adapter with mount 1003 is attached to the base 1001 making a base member unit 1080. The embodiment may include a base member 1001 and a device-mounting member 1003 that are connected to each other as a base member unit 1080. The base member 1001 may include a central channel 1023 through which an attachment member may be passed. The device-mounting member may include a device engagement mechanism 1050 for engaging a device. It is to be understood that FIGS. 10A-B are not meant to be limiting with respect to the orientation of the mount. In some implementations, the base member unit 1080 may be rotated relative to the upper surface of the surfboard to place the device-engagement mechanism in a preferred position. In other implementations, the device-mounting adapter may have a ratchet system similar to that shown in FIG. 10C to allow for the rotation of the device-mounting member 1050.

FIG. 10A, without limiting the invention, illustrates a device-mounting adapter 1000a according to an embodiment of the present invention. FIG. 10A shows the components of one embodiment of the device-mounting adapter 1000a. The device-mounting adapter 1000a includes a base unit 1080 with having a rotatable and lockable device-mounting member 1050. The device-mounting adapter 1000a also has an attachment member 1010 with a threaded superior end 1020 and a hook 1030a for anchoring the device to the surfboard. The superior end 1020 of the attachment member 1010 can be inserted into and engaged with the base member 1001 of the base unit 1080. The base member 1001 may have a channel therein (optionally having threading that is complementary to threading on the superior end 1020 of the attachment member 1010), which is similar to embodiments previously discussed herein. The fastening cap 1005 may engage with threading of the superior end 1020. The fastening cap 1005 may include a channel therein having threading that may be complementary to the threading on the superior end 1020 of the attachment member 1010.

FIG. 10B, without limiting the invention, illustrates a device-mounting adapter 1000b that is engaged with an attachment member 1010a having a threaded body 1020b and a flexible wire 1030 with a first end 1035a and a second end 1035b for anchoring the device to the surfboard. FIG. 10B shows that the base member 1001 and narrow cylindrical portion 1002 (not shown on FIG. 10B) receive the threaded body 1020b of the attachment member 1010b in a similar manner to other embodiments described herein. The body 1020b may have a diameter of up to about 0.50 inches such that it can fit in any surfboard leash plug and the flexible wire may have a thickness of up to about 0.20 in. (e.g., in a range of about 0.1 in. to about 0.20 in., in a range of about 0.13 to about 0.18 in., about 0.19 in., or any value therein), such that it has sufficient structural strength to properly anchor the attachment member to an attachment bar. The flexible wire 1030 may have a length that can accommodate all surfboard leash plugs, and the interior channel 1023 (not shown on FIG. 10B) is meant to house any excess flexible wire. Protrusions of the flexible wire 1030b from the interior channel 1023 do not interfere with the ability to assemble the device-mounting adapter 1000b.

Figure 11A:
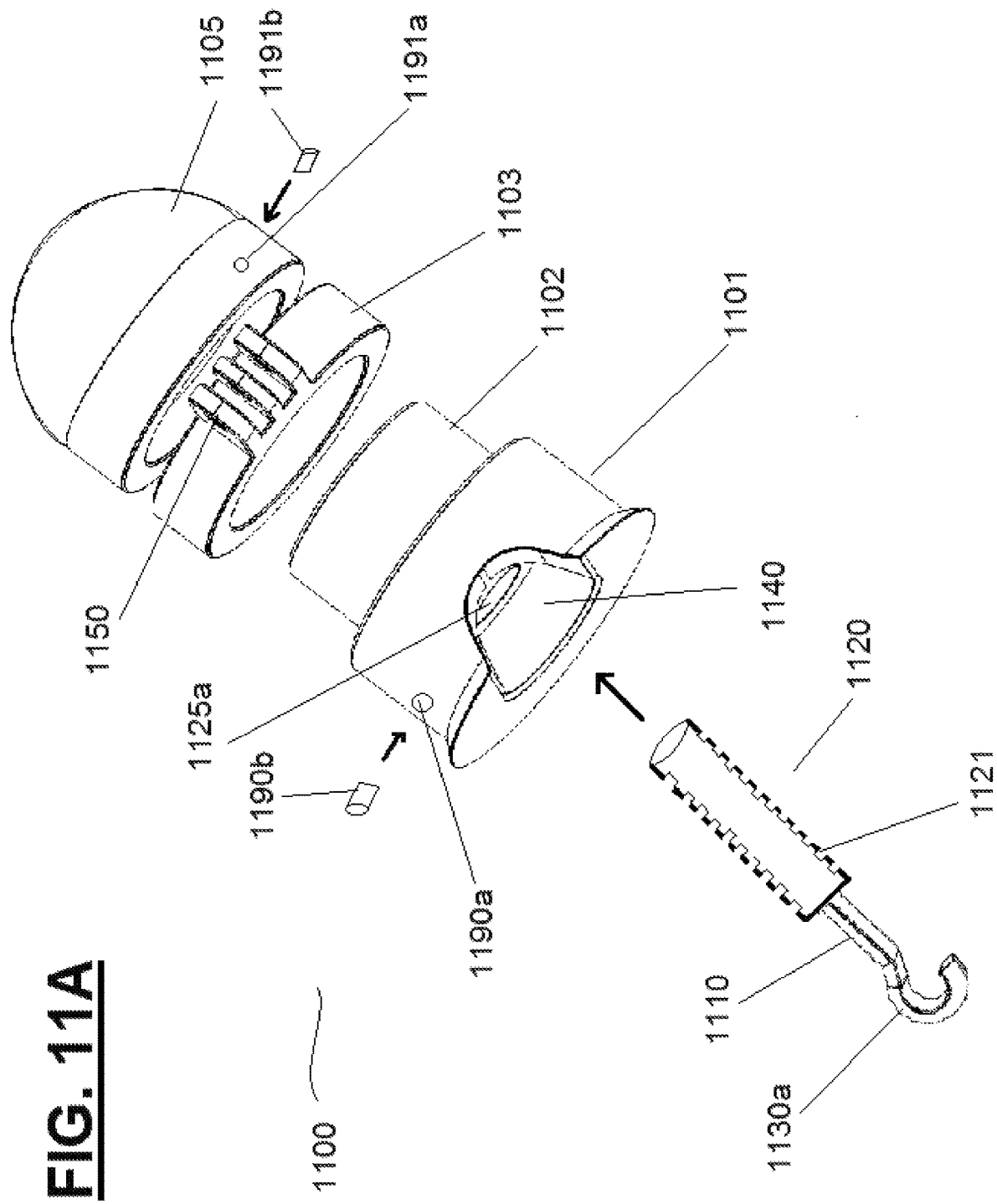
FIG. 11A shows an exploded perspective view of disassembled mounting adapter according to an embodiment of the present invention.
Figure 11B:
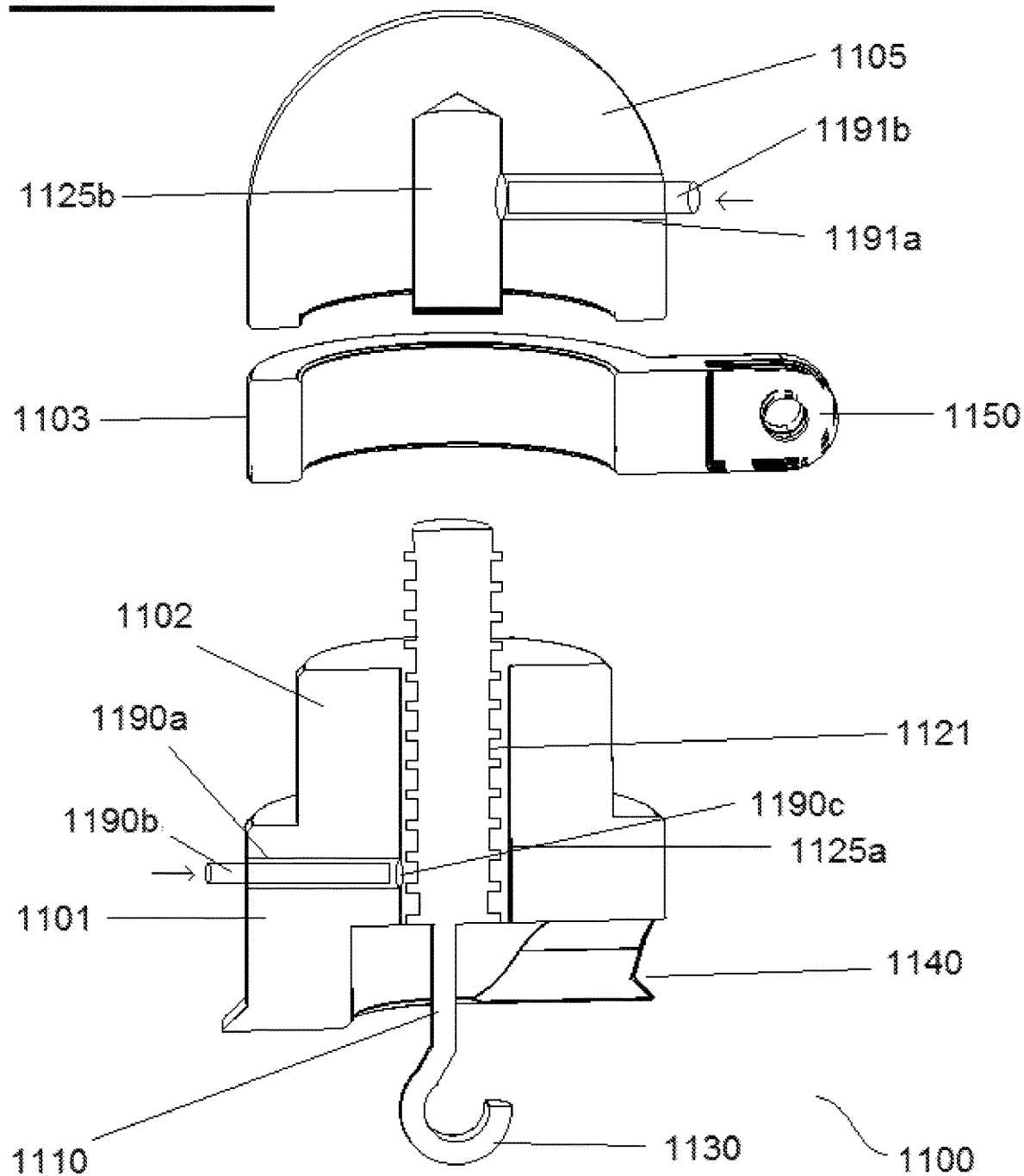
FIG. 11B shows an exploded cross-sectional view of a mounting adapter according to an embodiment of the present invention.

FIGS. 11A-B, without limiting the invention, illustrate device-mounting adapter 1100 according to an embodiment of the present invention. It is to be understood that many of the components and aspects of the exemplary device-mounting adapter 1100 are similar to embodiments previously described herein. The most prevalent difference between device-mounting adapter 1100 and embodiments described above is the attachment member 1110.

FIGS. 11A-B show the components of the device-mounting adapter 1100. Without limiting the invention, FIG. 11A illustrates a device mounting adapter 1100 for connecting to a surfboard leash plug, including a base member 1101 having a narrow cylindrical portion 1102 that receives the attachment member 1110. The attachment member 1110 may have a plurality of notches 1121 on a superior end 1120 thereof and an inferior end with a hook 1130 for anchoring the device to the leash plug bar of the surfboard. Furthermore, the device-mounting adapter 1100 includes a device-mounting member 1103 with a device engagement mechanism 1150 and a fastening cap 1105.

FIG. 11B shows a cross-sectional view of the surfboard leash plug adapter 1100 and shows that the notched superior end 1120 of the attachment member is received in the base member 1101 via channel 1125a. The superior end is held in place with locking member 1190b (e.g., a ball and spring, pin, bar, etc,) in the base member 1101. There is a channel 1190a in base member 1101 in which the locking member 1190b is housed. The superior end of the attachment member 1120 and is to be received in the fastening cap 1105 via channel 1125b. The superior end is held in place with locking member 1191b (e.g., a ball and spring, pin, bar, etc,) in the fastener cap 1105. It is to be appreciated that the bottom surface of the base member 1101 may have a compressible substance thereon (e.g., like a gasket) so that one can place the notched attachment member through a longitudinal channel 1125a in the base member, and push down on the base member as one pulls up on the attachment member, while also engaging the locking mechanism 1190b. The user may thereby connect the base member to the attachment member in a sufficiently tight manner to provide a sturdy and stable interface of the base member with the upper surface of the surfboard.

The fastening cap may have a channel 1191a with a locking member 1191b (e.g., a ball and spring, pin, bar, etc.) that is housed therein. The fastening cap 1105 may also have a compressible substance thereon (e.g., a gasket) so that pressure may be applied, if needed, to align the locking mechanism 1191b with a notch 1121 in the superior end 1120 (not designated in FIG. 11B) of the attachment member 1110. The locking device 1190b, when engaged, passes through hole 1190c into the interior channel 1125a and may engage with one of the notches 1121 on the superior end 1120, securing the attachment member 1110 to the fastening cap 1105.

FIG. 11B provides a cross-sectional view of device-mounting member 1100 that illustrates the how to assemble the device-mounting member 1100. Upon engaging hook with the leash plug attachment bar, one may pass the notched superior end 1120 of the attachment member 1110 through channel 1125a in the base member 1101. The user may push down on the base member 1101 while pulling up on the attachment member 1110 and engage the locking mechanism 1190b so that it may lock into one of the notches 1121 on attachment member 1110. There may be a compressible substance (e.g. a gasket) on the bottom surface of base system 1101 that may some leeway in aligning the locking mechanism 1190b with a notch on the attachment member 1110 to allow the user to engage the locking mechanism with a notch. Once the base member 1101 is engaged with the attachment member 1110, the device-mounting member 1103 may be positioned over the narrow portion 1102 of the base member 1101. The fastening cap 1105 may then be placed over the superior end 1120 of the attachment member 1110. There may a compressible gasket on the bottom of fastening cap 1105 that may some leeway in aligning and engaging the locking mechanism 1191b with a notch 1121 in the superior end 1120 of the attachment member 1110 (e.g., by compressing the gasket against the device-mounting member 1103 until the locking mechanism aligns with a notch).

Figure 12:
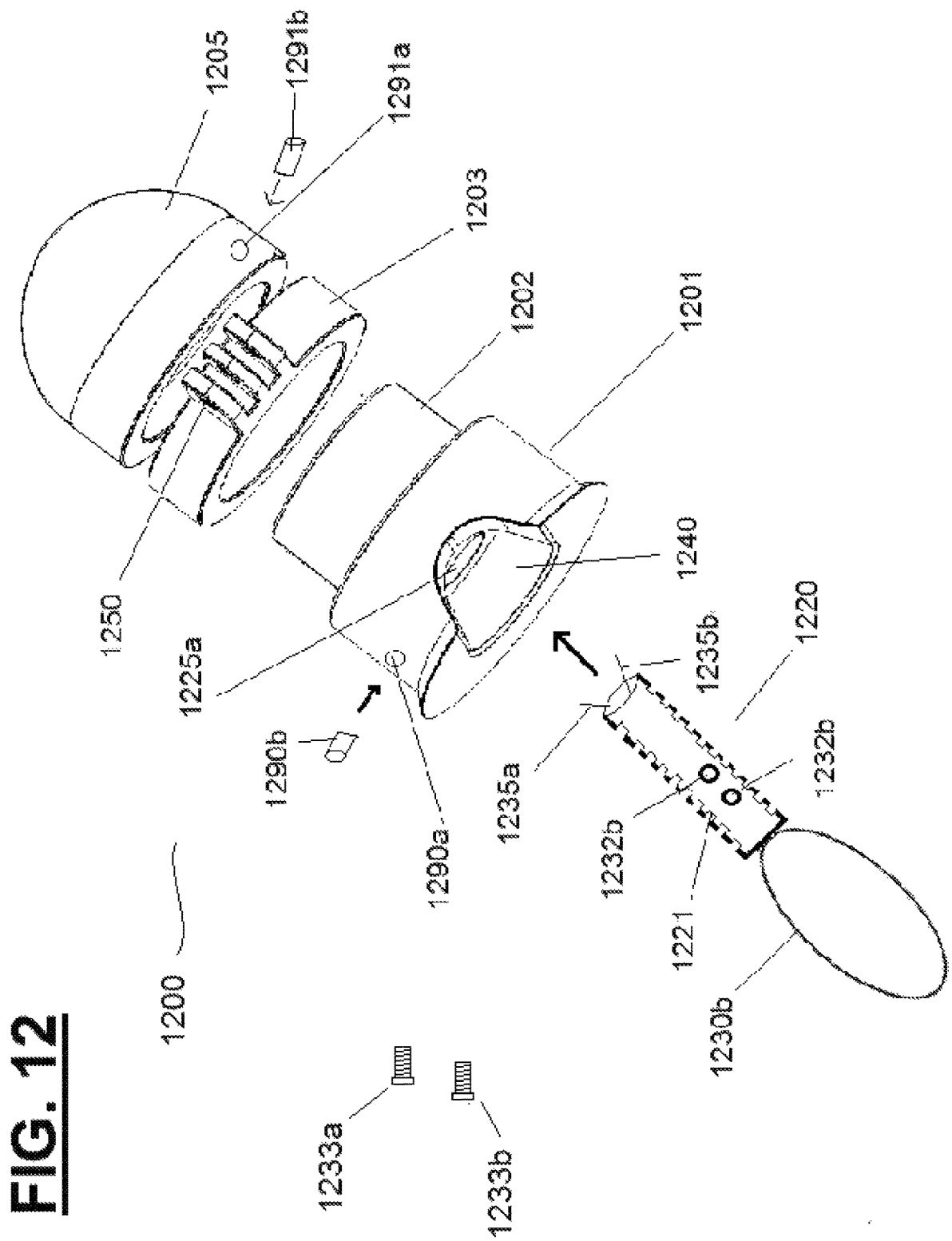
FIG. 12 shows an exploded perspective view of a mounting adapter according to an embodiment of the present invention.

It is to be appreciated that FIG. 12 illustrates a similar embodiment to the embodiment of FIG. 1A-11B; the most prevalent difference being that the attachment member 1210 has a flexible wire 1230 for engaging with the attachment bar, rather than a hook or other engagement structure. The flexible wire 1230 may be anchored in the attachment member 1210 in a similar manner to the flexible wire of the attachment shown in FIG. 7 and the attachment member 1210 may secure the device-mounting adapter 1200 onto the surfboard with the same notching system described for FIG. 12A-B.

FIG. 12 shows the components of the device-mounting adapter 1200. Without limiting the invention, FIG. 12 illustrates a device mounting adapter 1200 for connecting to a surfboard leash plug, including a base member 1201 having a narrow cylindrical portion 1202 that receives the attachment member 1210. The attachment member 1210 may have a plurality of notches 1221 on a superior end 1220 thereof and an inferior end with a hook 1230 for anchoring the device to the leash plug bar of the surfboard. Furthermore, the device-mounting adapter 1200 includes a device-mounting member 1203 with a device engagement mechanism 1250 and a fastening cap 1205.

The notched superior end 1220 of the attachment member 1210 is received in the base member 1201 via channel 1225a. The superior end is held in place with locking member 1290b (e.g., a ball and spring, pin, bar, etc,) in the base member 1201. There is a channel 1190a in base member 1201 in which the locking member 1290b is housed. The superior end of the attachment member 1220 and is to be received in the fastening cap 1205 via channel 1225b. The superior end is held in place with locking member 1291b (e.g., a ball and spring, pin, bar, etc,) in the fastener cap 1205. It is to be appreciated that the bottom surface of the base member 1201 may have a compressible substance thereon (e.g., a gasket) so that one can place the base member over the notched attachment member, and push down on the base member while engaging the locking mechanism 1290b. The user may thereby connect the base member to the attachment member in a sufficiently tight manner to provide a sturdy and stable interface of the base member with the upper surface of the surfboard.

The fastening cap may have a channel 1291b with a locking member 1291b (e.g., a ball and spring, pin, bar, etc.) that is housed therein. The fastening cap 1205 may also have a compressible substance thereon (e.g., a gasket) so that pressure may be applied, if needed, to align the locking mechanism 1291b with a notch 1221 in the superior end 1220 of the attachment member 1210. The locking device 1290b, when engaged, passes through channel 1290a into the interior channel 1225a and may engage with one of the notches 1221 on the superior end 1220, securing the attachment member 1210 to the fastening cap 1205.

Embodiments of the present invention may also include an extension device that is operable to attach to the device-mounting mechanism of the device-mounting adapter and provide additional elevation and clearance for an attached device (e.g., a camera) relative to the upper surface of the surfboard. Such extension devices may have a first end having a first pivoting joint attachment for engaging with a device-mounting mechanism of the device-mounting adapter and a second end having a second pivoting joint attachment for engaging with a device (e.g., a camera).

Figure 13:
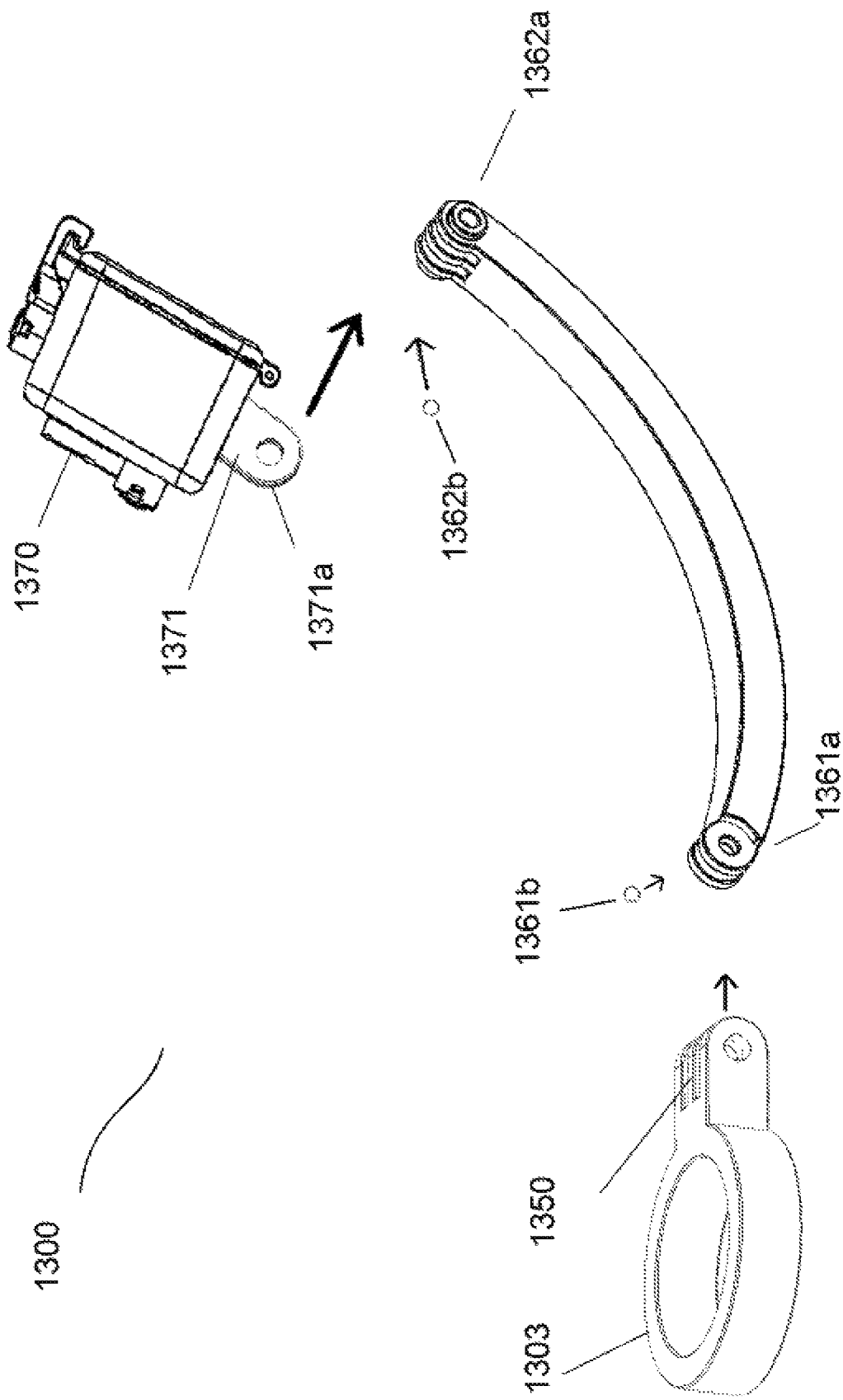
FIG. 13 shows an exploded perspective view of an extension device according to an embodiment of the present invention.

FIG. 13 illustrates an exemplary extension device 1300 of the present invention. The extension device includes a first pivoting joint structure 1361a and a second pivoting joint structure 1362a. The first pivoting joint structure 1361a be secured with insert 1361b to the device-engagement mechanism 1350 a device-mounting member 1303 (device mounting member 1303 is shown in isolation in FIG. 13, but should be understood to be a component of a device-mounting adapter according to any one of the embodiments of the present invention). For example, the pivoting joint structure 1361a may have at least two engagement plates that are operable to interleaf with engagement plates of the device-engagement member 1350. The engagement plates and may each have holes therein that may be aligned with each other in order to allow a locking pin to be inserted through the aligned holes of the engagement plates. Once the locking pin is positioned through the engagement plates, the extension device 1300 is fully engaged with the device-engagement mechanism 1350. The pivoting joint created by the engagement of the device-engagement mechanism 1350 and the first pivoting joint structure is operable to pivot to adjust the position of the extension device relative to the device-mounting member 1303. The locking pin may have a securing mechanism that engages a distal end of the locking pin a to hold the locking pin in position within the engagement plates and, such as a nut that allows the pivoting joint to be cinched down or loosened for rotational adjustment.

The second pivoting joint structure 1362a may have a configuration that is complementary to an engagement mechanism 1371 of a device 1370 (e.g., a camera) to be attached to the device-mounting adapter. The second pivoting joint structure 1362a may have at least two engagement plates that are operable to interleaf with engagement plates 1371a of the engagement mechanism 1371. The engagement plates 1362a and 1371a may each have transverse holes therein that may be aligned with each other in order to allow a locking pin 1362b to be inserted through the aligned holes of the engagement plates 1362a and 1371a. A threaded insert 1362b may be present in the engagement mechanism 1371 of the device 1370 and may engage a locking pin that may be through the interleafed engagement plates to thereby secure the connection between the device 1370 to the distal end of the extension device 1300. Once the locking pin is positioned through the engagement plates 1362a and 1371a, the extension device 1300 is fully engaged with the engagement mechanism 1371. The pivoting joint created by the engagement of the engagement mechanism 1371 and the second pivoting joint structure 1362a is operable to pivot to adjust the position of the device 1370 relative to the extension device 1300. The locking pin may have a securing mechanism that engages a distal end of the locking pin to hold the locking pin in position within the engagement plates 1362a and 1371a, such as a nut that allows the pivoting joint to be cinched down to secure angular position or loosened to allow rotational adjustment. The examples are not meant to limit the invention as one with ordinary skill in the art will appreciate that the pivoting joints may be secured in a different manner; the two examples above mean to be exemplary.

The extension device of the present invention may have additional features, including articulable joints between the first pivoting joint structure and the second pivoting joint structure, branches having their own pivoting joint structures for attaching additional devices, holes for reducing weight and other features. It is to be understood that the extension device described above is operable to be used with any of the embodiments described herein. Additionally, it is to be noted that the device-engagement mechanisms described herein may be engaged directly with attachment mechanisms of devices (e.g., cameras) in the same manner the device-engagement mechanism 1350 engages with the first pivoting joint structure 1361a, as described above.

FIGS. 14A-B show how a device-mounting adapter according to the present invention may to be attached to a surfboard. FIG. 14A shows a surfboard 1401 having a surfboard leash plug 1403, and an exploded view of a device-mounting adapter 100. The device mounting adapter 100 is operable to be attached and secured to the surfboard leash plug receiver 1403 when the device-mounting adapter and extension device 1400 is assembled. FIG. 14B shows an enlarged portion of the surfboard tail 1401 wherein the surfboard leash plug attachment bar 1405 is shown within the surfboard leash plug receiver 1403. The hook of the device-mounting adapter may be engaged with the attachment bar 1405; the base member of the device-mounting adapter may then be positioned over the attachment member and on the upper surface of the surfboard 1401, and the device-mounting member and fastening cap may then be placed over the base member and attached as discussed above, thereby tightening the device-mounting adapter 100 to the upper surface of the surfboard 1401.

Figure 14C:
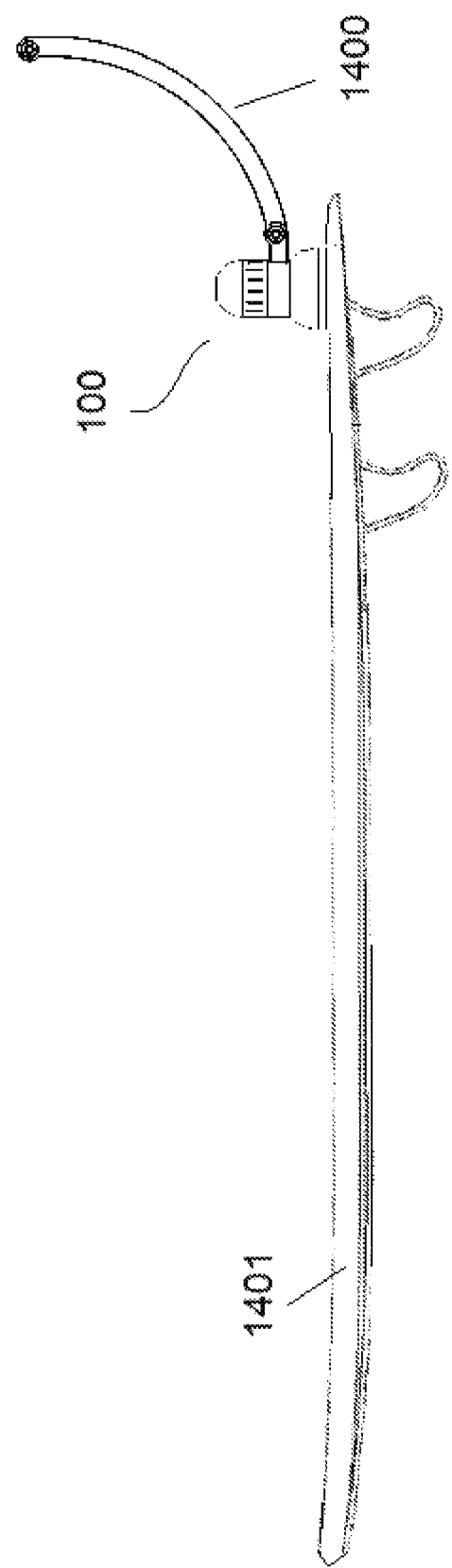
FIG. 14C shows a side view of a surfboard with an attached mounting adapter according to an embodiment of the present invention installed thereon.
Figure 14D:
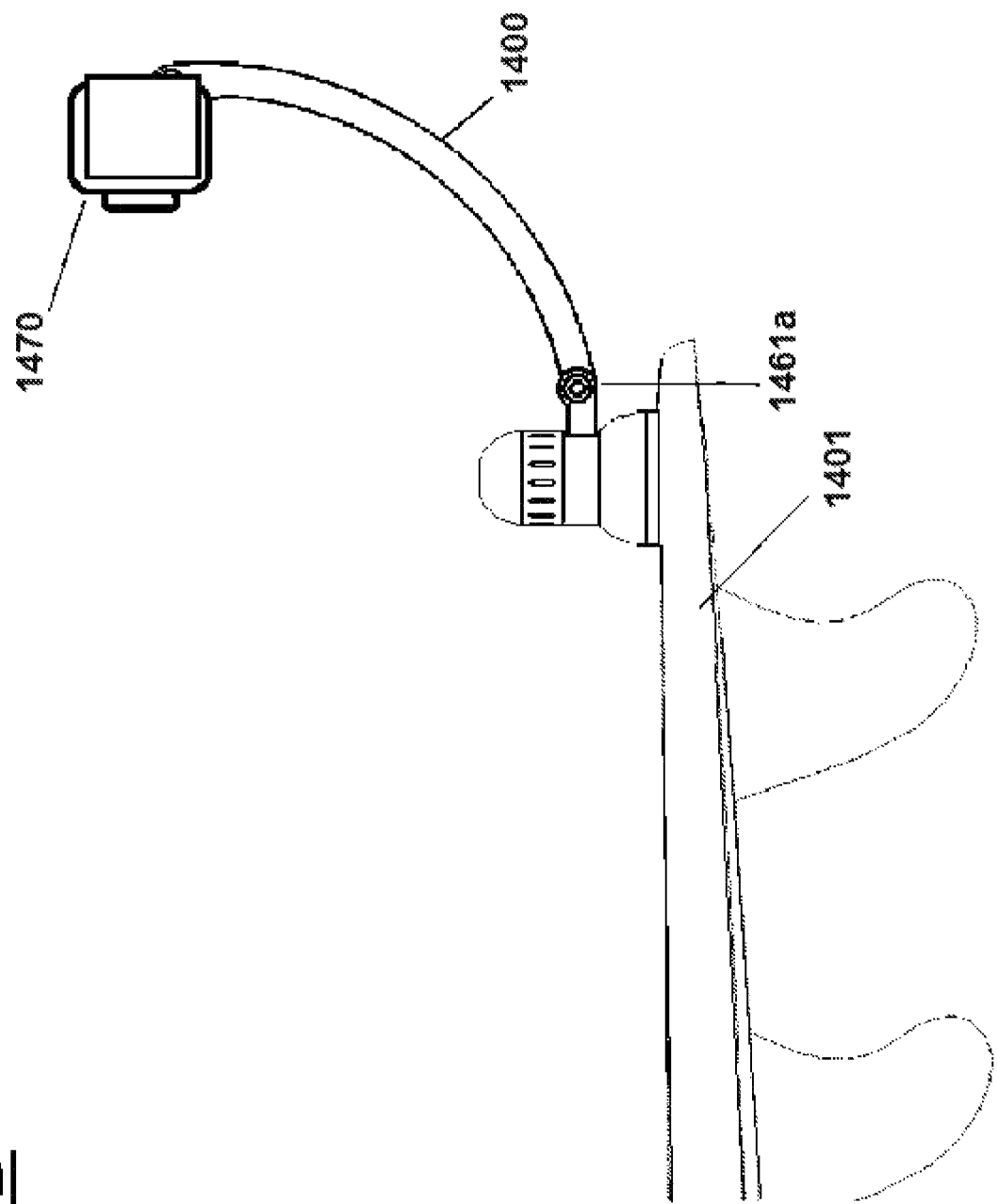
FIG. 14D shows a close-up side view of a mounting adapter according to an embodiment of the present invention with a device attached thereto.

FIGS. 14C-D depicts the assembled device-mounting adapter 100 installed at the surfboard leash plug receiver, on the upper surface of the surfboard 1401. FIG. 14D shows an implementation in which the extension device 1400 is attached to the device-mounting adapter 100 at one end and to the device 1470 at the opposite end, thereby allowing the device 1470 to be at an elevated position above the upper surface of the surfboard 1401. The extension device 1400 may be rotated on the pivot joint 1461*a* at various angles, constrained only by surfboard 1401 and the fastening cap of the device-mounting adapter 100. Also, the device 1470 may be rotated on the distal pivot joint at various angles, constrained only by the extension device 1400. It is to be appreciated that the figures are not meant to limit the orientation of the device, each embodiment allows for the device-mounting member to be positioned as the user prefers.

Figure 14E:
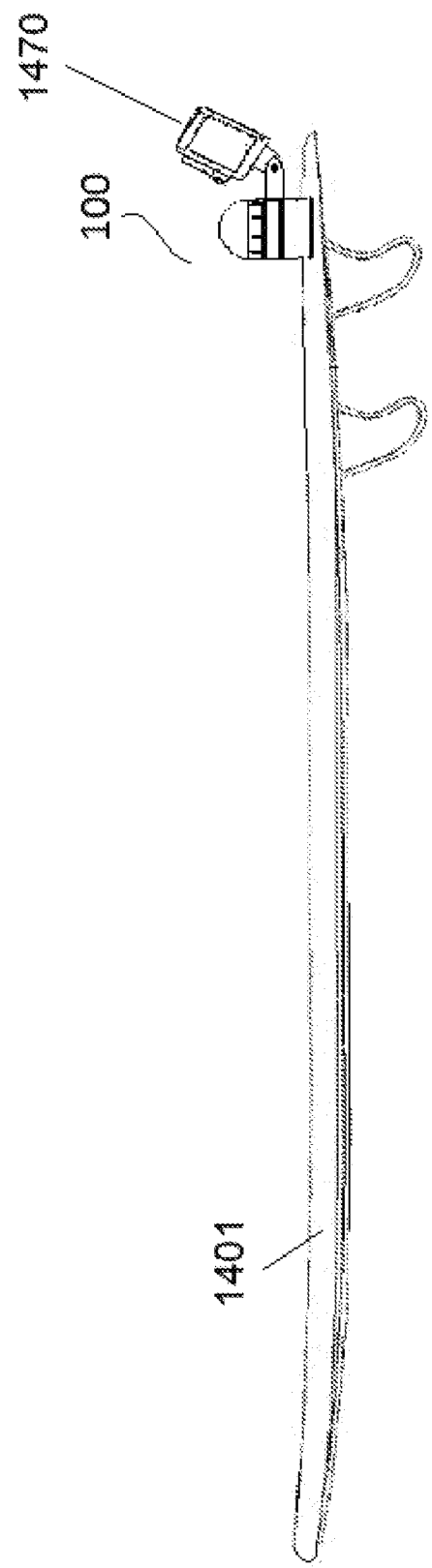
FIG. 14E shows a side view of a surfboard with an attached mounting adapter according to an embodiment of the present invention and a device installed thereon.

FIG. 14E shows the device-mounting adapter 100 with a device 1470 mounted directly on the device-mounting adapter 100. FIG. 14E shows the device 1470 positioned near the back of the surfboard 1401, but it is to be understood that the device mounting adapter 100 can be positioned such that the device 1470 may be positioned anywhere in a 360° range around the device-mounting adapter 100.

As shown, e.g., in FIG. 14D, the device-mounting adapters of the present invention allow the user to mount a forward facing camera at the back of a surfboard for taking pictures and/or video while surfing, without altering or damaging the surfboard or the leash plug receiver thereof. The device-mounting adapter is operable to be connected to leash plug receivers of all surfboards, and therefore can be universally used to attach devices to surfboards from any manufacturer.

Figure 15:
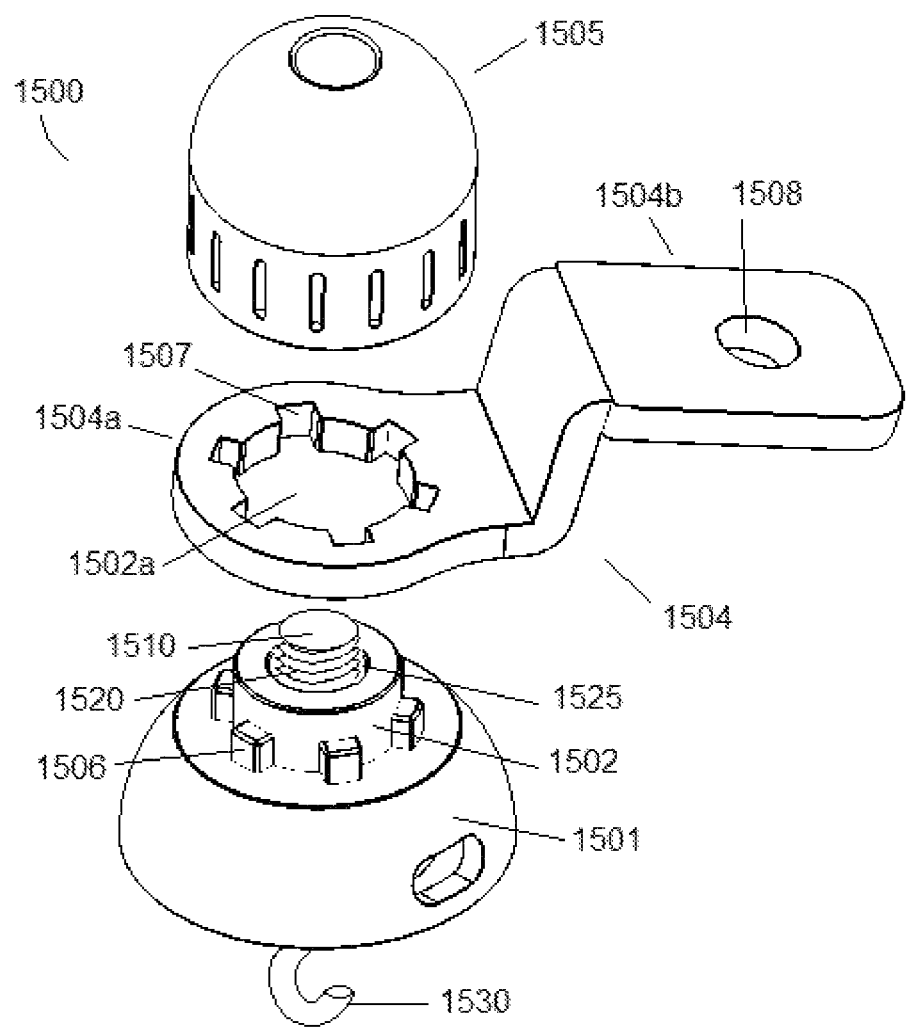
FIG. 15 shows an exploded perspective view of a device mounting adapter according to an embodiment of the present invention.

FIGS. 15-19 show another embodiment of the device mounting adapter of the present invention. FIG. 15 shows a device mounting adapter 1500 having a base member 1501, a cap member 1505, an attachment member 1510, and a securing member 1504.

In some embodiments, the base member 1501 may comprise a narrow cylindrical portion 1502 and a channel 1525, the channel 1525 allowing the attachment member 1510 to pass through the base member 1501 and engage with the cap member 1505. In some embodiments, the narrow cylindrical portion 1502 may comprise a plurality of locking tabs 1506. In some embodiments, the plurality of locking tabs 1506 may each extend radially from a central axis of the narrow cylindrical portion 1502 and form a shape complementary to the plurality of locking slots 1507. In some embodiments, the plurality of locking slots 1507 may be evenly spaced apart around the inner cylindrical passage 1502*a* and the plurality of locking tabs 1506 may be evenly spaced apart around the narrow cylindrical portion 1502, such that the securing member 1504 may fit onto the base member 1501 in a plurality of angular positions about the central axis of the base member 1501.

Figure 16:
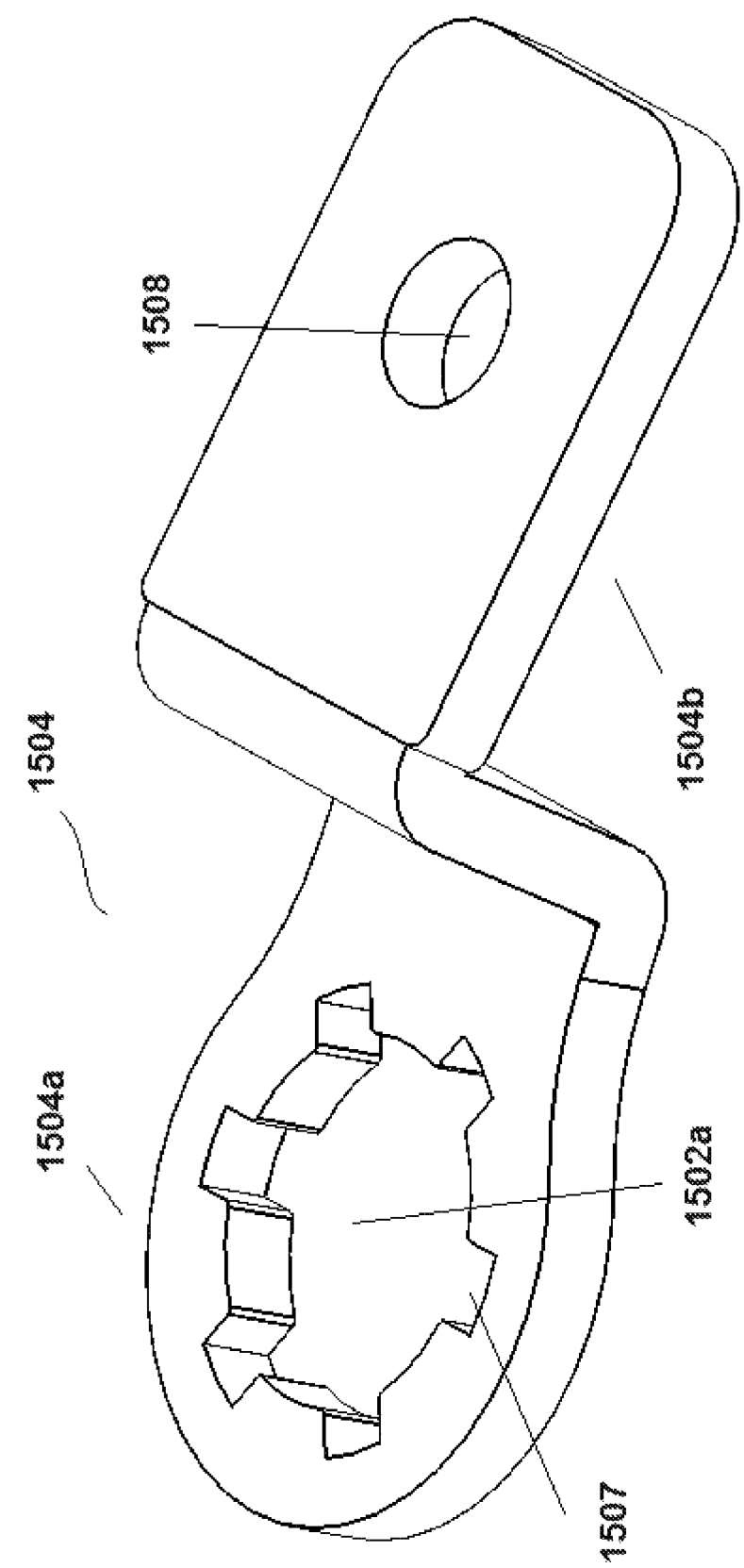
FIG. 16 shows a perspective view of a securing member according to an embodiment of the present invention.

As shown in FIG. 16, the embodiment shown in FIGS. 15-19 may include a securing member 1504 having an anchoring portion 1504*a* that engages with the narrow cylindrical portion 1502 and the plurality of locking tabs 1506 thereon, and a boom attachment portion 1504*b*. The anchoring portion 1504*a* may include an inner cylindrical passage 1502*a* with a plurality of locking slots 1507 that are operable to engage with the locking tabs 1506 when the device mounting adapter 1500 is assembled and installed.

The boom attachment portion 1504*b* may protrude from the device mounting adapter when assembled and may include a vertical passage 1508 that may receive a boom 1511 for elevating and attaching a device 1570.

For assembly and attachment, the device mounting adapter 1500 may include the attachment member 1510 having a threaded superior end 1520 for engagement with the cap member 1505, and a lower anchoring member 1530 for engagement with a leash plug attachment bar (see, e.g., leash plug attachment bar 1405 in FIG. 14B). The securing member 1504 may be positioned over the base member 1501. The narrow cylindrical portion 1502 of the base member 1501 may have an outer diameter slightly smaller than an inner diameter of the inner cylindrical passage 1502*a* of the securing member 1504. The inner cylindrical passage 1502*a* may slide onto the narrow cylindrical portion 1502 with a close, snug fit, and the plurality of locking slots 1507 may engage with the plurality of locking tabs 1506, thereby creating an interlocking engagement between the narrow cylindrical portion 1502 and the inner cylindrical passage 1502*a* such that the securing member 1504 cannot be rotated. In some embodiments, the lower anchoring member 1530 may be hooked onto the leash plug attachment bar, and the cap member 1505 may then be threaded onto the attachment member 1510, creating downward pressure against the anchoring portion 1504*a* of the securing member 1504, thereby pinching the securing member 1504 in a static position (see, e.g., FIGS. 18 and 19).

Figure 17:
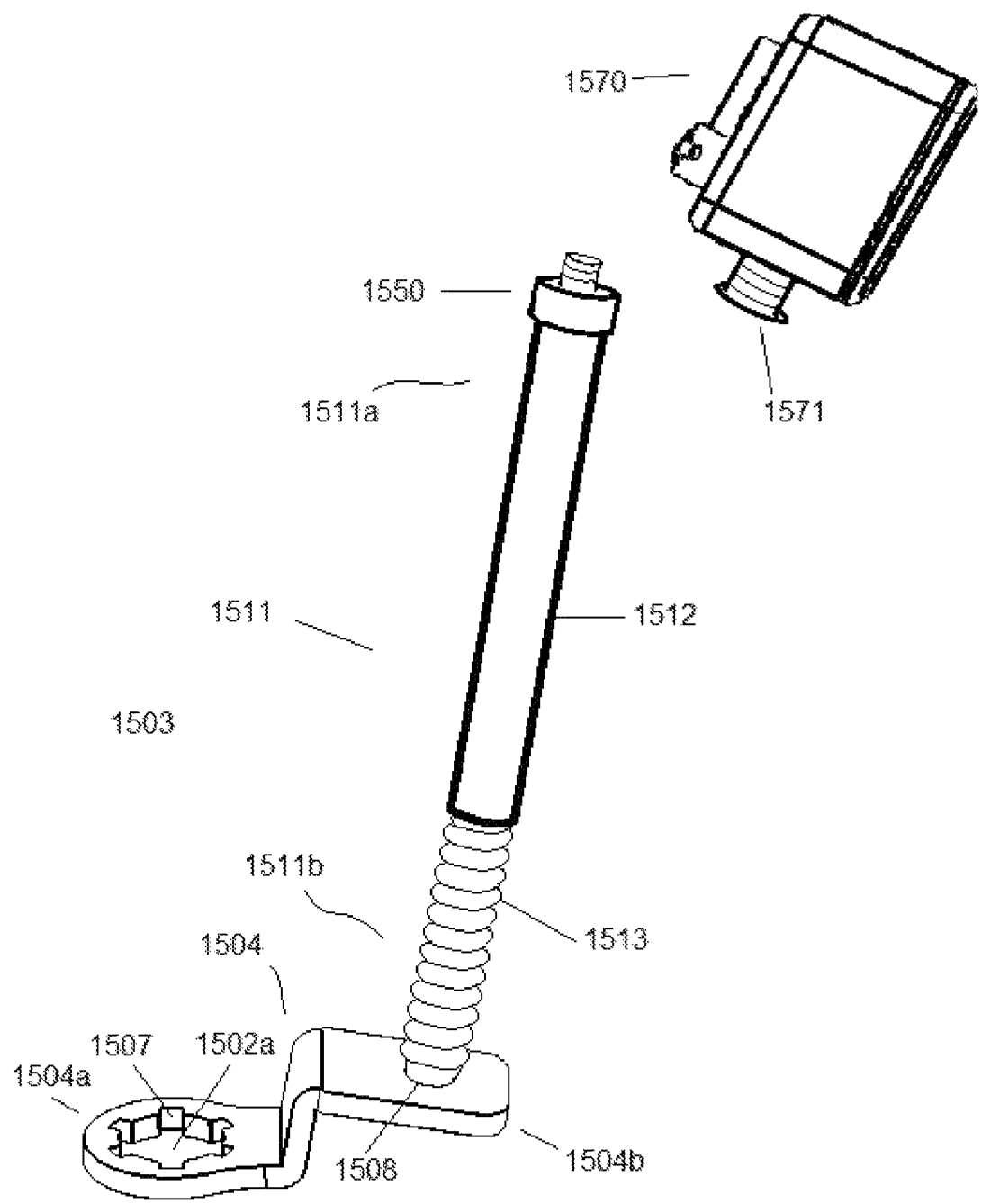
FIG. 17 shows a perspective view of a device mounting adapter according to an embodiment of the present invention.

FIG. 17 shows a boom 1511 for mounting a device 1570 according to an embodiment of the present invention. In some embodiments, the boom 1511 may be attached to the securing member 1504 through the vertical passage 1508. The boom 1511 may include an upper end 1511*a* and a lower end 1511*b*, and a device engagement mechanism 1550 located at the distal end of the boom 1511. In some embodiments, the upper end 1511*a* may comprise a rigid portion 1512 and the lower end 1511*b* may comprise a flexible portion 1513. In some embodiments, the flexible portion 1513 may comprise a spring made from a resilient metal, a resilient metal alloy (e.g., spring steel), a resilient composite material (e.g., glass-reinforced epoxy composite), or other suitable resilient, flexible materials. The flexible portion may allow the boom to flex during surfing in the case of a collision of the boom 1511 with the surfer (e.g., when the surfer falls) or other objects to prevent injuries to the surfer and damage to the surfboard (e.g., the leash plug attachment). The flexible portion 1513 may also allow for shock absorption to reduce potential damage to the attached device (e.g., a camera).

The rigid portion 1512 may have various cross-sectional shapes (e.g., circular, elliptical, square, rectangular, triangular, various other polygonal shapes, etc.) and may be have a hollow tube or a solid bar. In some embodiments, the cross-sectional shape and/or area may vary along the length of the rigid portion 1512, and the rigid portion 1512 may be solid in some portions and hollow in others. The rigid portion 1512 (e.g., a hollow tube) may comprise a fiberglass, carbon composite (e.g., carbon fiber reinforced polymer), aluminum, or other light-weight, rigid, non-corroding material. The rigid portion 1512 may include a device engagement structure 1550 at the distal end thereof. The device engagement structure 1550 may have a connection mechanism (e.g., threaded male post, Storz-style connector, a spring and ball mechanism, a pin and receiver mechanism, or other attachment mechanism) for engaging with the attachment mechanism 1571 of device 1570. The attachment member 1571 may have a structure that is complementary to the connection mechanism 1550 (e.g., female threaded socket, Storz-style connector, etc.). In some embodiments, the device engagement structure 1550 may provide a static attachment to the device 1570. In other embodiments, the device engagement structure 1550 may comprise a pivoting joint structure, the pivoting joint structure allowing the device 1570 to be attached at various angles relative to the boom 1511. For example, the connection mechanism 1550 may be an interleafing pivot joint structure that includes plates with central holes in each plate that may interleaf with plates on the corresponding attachment mechanism 1571 of the device 1570 such that central holes of the plates of the connection mechanism 1550 align with holes present in the plates of the attachment mechanism 1571. A pin, bolt, or other locking structure may then be passed through the aligned central holes to secure the pivoting joint. The pivoting joint may include an anchor that may have threading or other engagement mechanisms that may receive and secure the pin, bolt, or other locking structure. The direction of the device 1570 may also be adjusted to the user's preferred position by loosening the cap member 1505, lifting securing member 1500 to disengage the tabs 1506 from the slots 1507, rotating securing member 1504 about a central axis of the base member 1501, re-engaging the tabs 1506 and the slots 1507, and re-tightening the cap member 1505.

Figure 18:
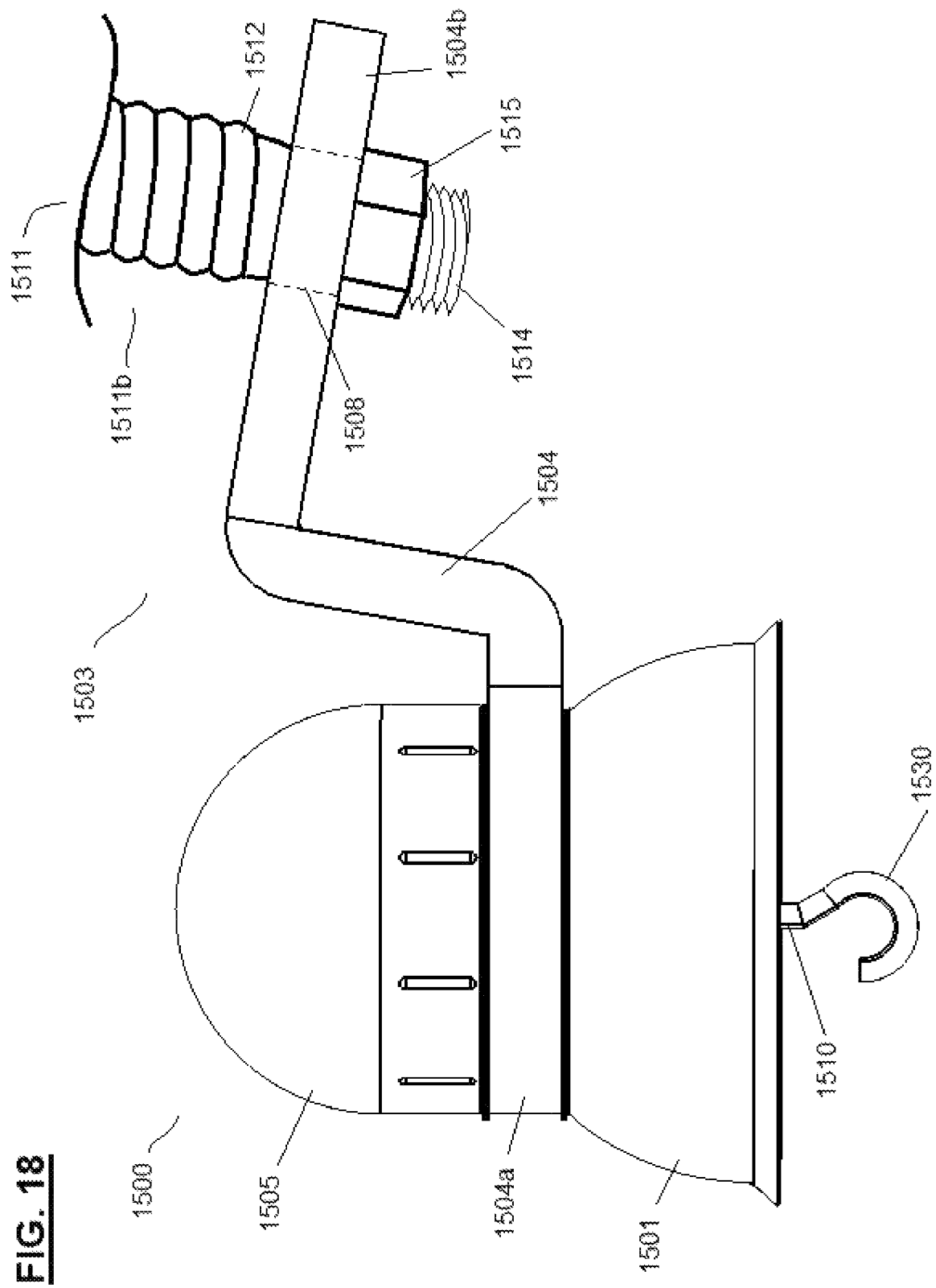
FIG. 18 shows a side view of a device mounting adapter according to an embodiment of the present invention.
Figure 19:
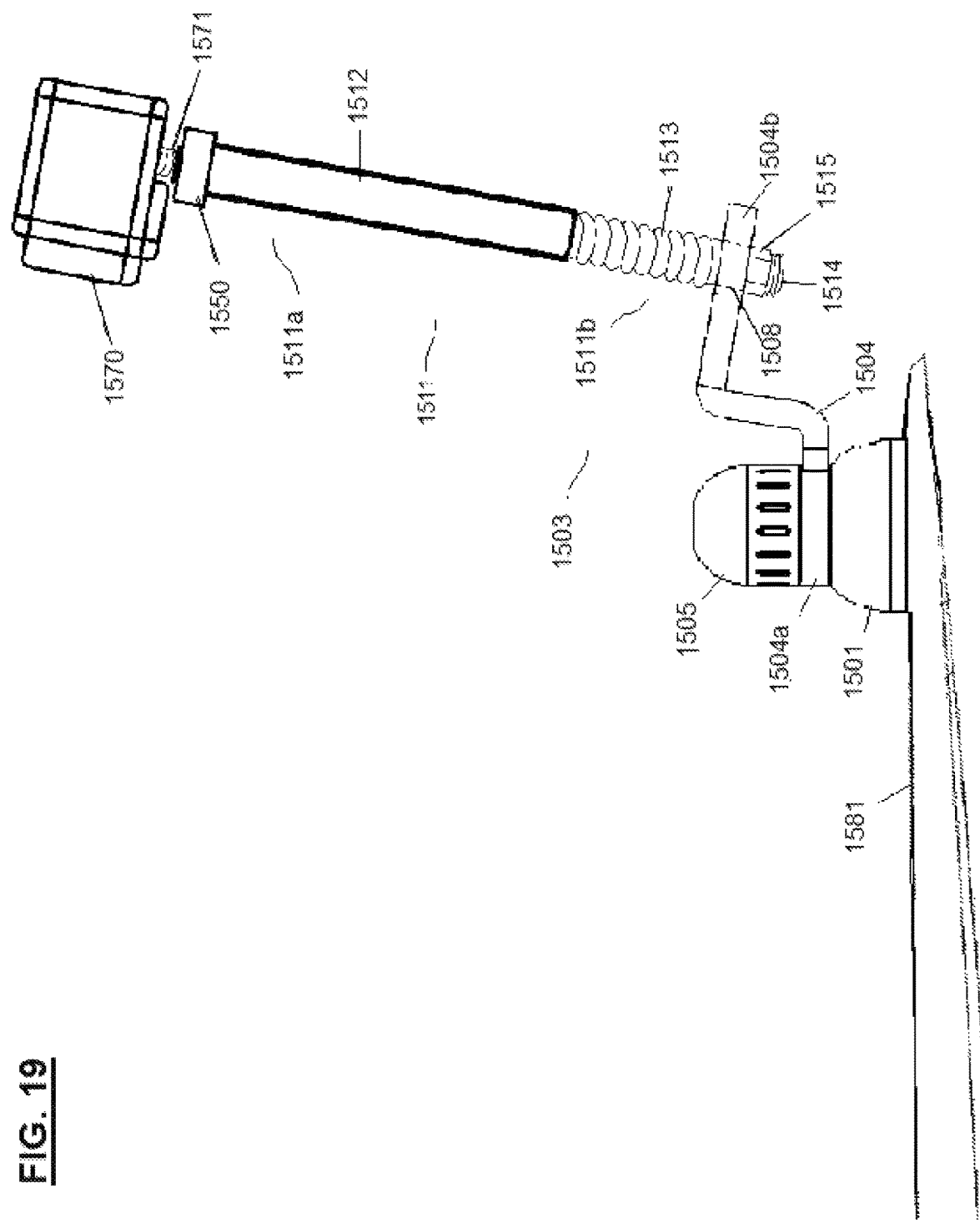
FIG. 19 shows a side view of a device mounting adapter according to an embodiment of the present invention.

FIGS. 18-19 show the device mounting adapter 1500 fully assembled and installed. The figures show the base member 1501, cap member 1505, attachment member 1510, boom 1511, and the device 1570 in their intended mechanical arrangement for installation on a surfboard 1580. The assembled device-mounting adapter 1500 allows the user to mount a forward facing device 1570 (e.g., a camera) at the back of the surfboard 1580 for taking picutres and/or video while surfing with a flexible attachment to reduce or prevent injuries to the surfer in the case of a fall. The device-mounting adapter 1500 may also reduce wear and tear on the attached device 1570 by providing a shock-absorption function.

Figure 20:
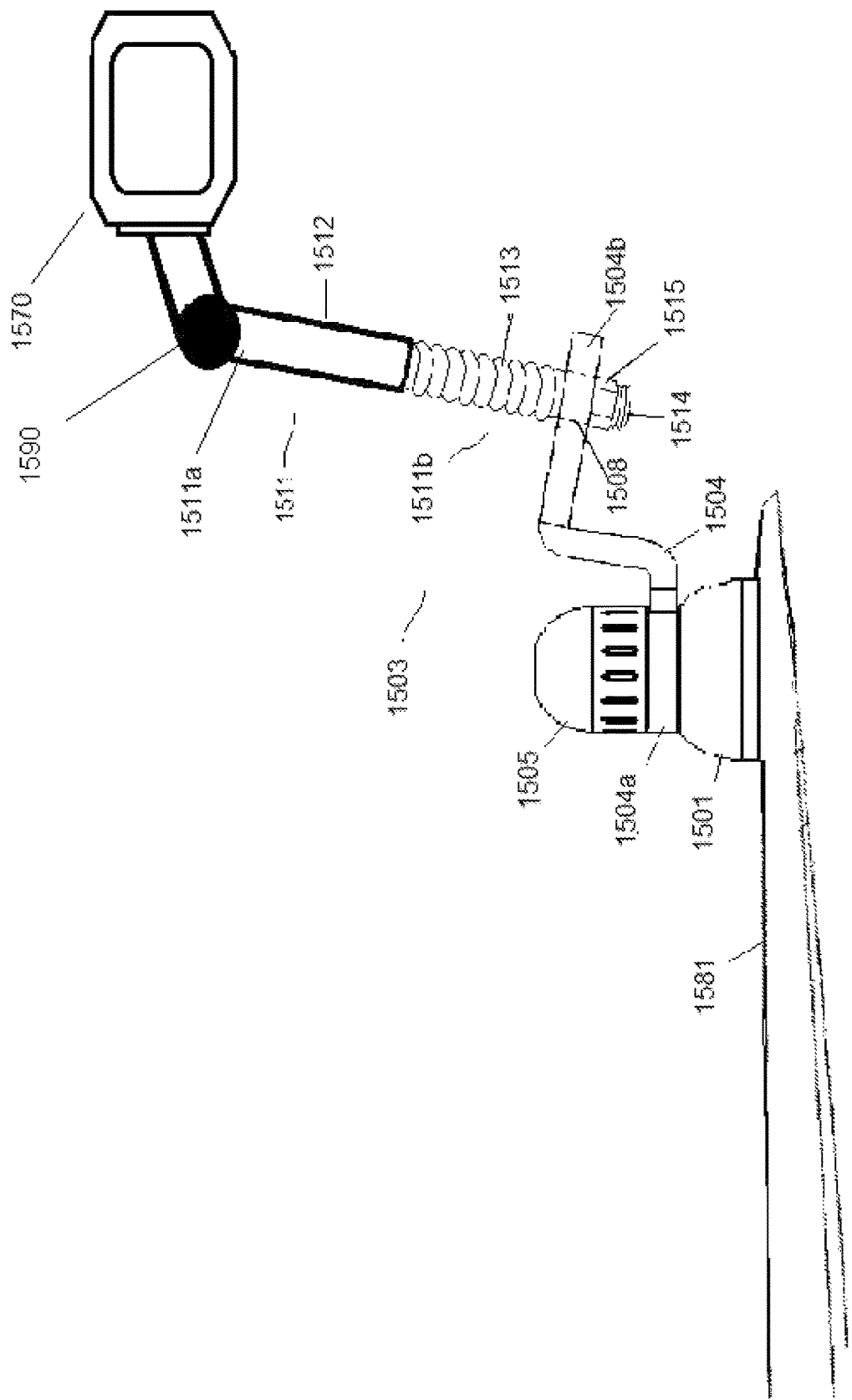
FIG. 20 shows a side view of a boom including a joint that may allow a camera device to be placed in various positions, according to an embodiment of the present invention.

In some embodiments, the boom 1511 may also include one or more joints (e.g., pivoting joints) along its length that allow the device 1570 to be positioned lateral to the vertical plane along the length of the surfboard 1580. As shown in FIG. 20, the boom 1511 may include a a joint 1590 (e.g., a ball joint) that may allow a camera device to be placed in various positions (e.g., lateral to the person riding the surfboard 1580) to avoid obstruction of the images taken by the camera device 1570 by the body of the person. The attachment mechanism 1571 and the connection mechanism 1550 are obscured in FIG. 20.

CONCLUSION/SUMMARY

The present invention provides an apparatus and methods for using the apparatus for securing a device-mounting adapter to a surfboard to allow the user to attach devices to a surface of a surfboard, including but not limited to cameras. It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. A device mounting adapter system for attachment to a surfboard leash plug receiver, said adapter system comprising:
   a. a base system for engagement with an upper surface of a surfboard, said base system comprising
      (i) a base member having a passage and a base surface for interfacing with said upper surface of said surfboard, and
      (ii) an attachment member with an inferior end having an anchor for engaging an attachment bar within said surfboard leash plug receiver and a superior end for insertion into said passage of said base member;
   b. a device-mounting member on said base member for engaging and supporting a device, wherein said device-mounting member comprises a securing member, and said adapter system further comprises an extension member operable to be attached to said securing member at a first end thereof and to attach and support said device at a second end thereof, wherein said extension member elevates the position of said device relative to said upper surface of said surfboard, and said extension member comprises a flexible portion that includes a spring located at a lower end of said extension member capable of absorbing vibrational energy; and
   c. a fastening mechanism for engaging said superior end of said attachment member, wherein engagement of said fastening mechanism with said superior end of said attachment member secures said device mounting adapter system to said surfboard when said anchor structure is engaged with said attachment bar.

2. The adapter system of claim 1, wherein said inferior end of said attachment member has a hook-like shape for engaging with said attachment bar, said interior diameter of said hook-like shape being up to about 0.25 inch.

3. The adapter system of claim 1, wherein:
   i. said base surface has an outer diameter of at least about 2.0 inches;
   ii. said fastening member is a cap having a fastening receiver for engaging said superior end of said attachment member, wherein said fastening receiver engages with said superior end of said attachment member to secure said device mounting adapter system to said surfboard, and said fastening cap has a smooth, convex outer surface; and
   iii. an upper portion of said base member has an external diameter approximately equal to an interior diameter of said device-mounting member, and said upper portion has a height that is substantially equal to a height of said device-mounting member.

4. The adapter system of claim 1, wherein said device-mounting member is operable to be rotated around a central axis to a desired angular position.

5. The adapter system of claim 1, wherein said passage in said base member includes a fastening structure operable to be engaged by a second fastening structure on said superior end of said attachment member.

6. The adapter system of claim 1, wherein said adapter system can be attached and detached from said attachment bar within said surfboard leash plug receiver without damaging or altering said surfboard or said leash plug receiver.

7. An adapter system for attachment to a surfboard leash plug receiver, said adapter system comprising:
  a. a base system including,
    i. a base member having a base surface for engagement and interfacing with an upper surface of a surfboard, and
    ii. an attachment member with an inferior end having an anchor for engaging an attachment bar within said surfboard leash plug receiver and a superior end for insertion into a passage of said base member, wherein said inferior end of said attachment member comprises a hook for engaging with said attachment bar, said hook having an inner diameter of up to about 0.25 inch;
  b. a device-mounting member for engaging and supporting a device; and
  c. a fastening cap having a fastening receiver for engaging said superior end of said attachment member.

8. The adapter system of claim 7, wherein said base surface has a diameter of at least about 2.0 inches, and said fastening cap has a smooth outer shape.

9. The adapter system of claim 7, wherein said adapter system can be attached and detached from said attachment bar without damaging said surfboard, and allows said surfboard leash plug receiver to be subsequently used for attaching a leash plug thereto.

10. A method for attaching a device-mounting adapter to a surfboard leash plug receiver, comprising:
  a. engaging an anchoring end of an attachment member to an attachment bar within a surfboard leash plug receiver, wherein said anchoring end has a complementary shape to said attachment bar, wherein said anchoring end of said attachment member comprises a hook for engaging with said attachment bar, said hook having an inner diameter of up to about 0.32 inches;
  b. positioning a superior end of said attachment member through a passage of a base member, said base member comprising a base surface for engagement and interfacing with an upper surface of the surfboard;
  c. positioning a device-mounting member in contact with said base member, and;
  d. positioning an upper fastening member over said device-mounting member, engaging said upper fastening member with said superior end of said attachment member, and tightening down said upper fastening member over said securing member; and
  e. attaching a device to a device engagement mechanism.

11. The method of claim 10, further comprising attaching an extension member to said device-mounting member having a superior end having said device engagement mechanism, wherein said extension member elevates the position of said device relative to said upper surface of said surfboard.

12. The method of claim 11, wherein said extension member comprises a flexible portion capable of absorbing vibrational energy.

13. The method in claim 10, wherein said base surface applies total force against said upper surface in a range of about 10 lb. to about 100 lb. when said upper fastening member is tightened down on said attachment member.

14. The method in claim 10, wherein a tensile stress in a range of about 10 lb. to about 100 lb. is applied to said attachment member when said upper fastening member is tightened down on said attachment member.

15. The method in claim 10, further comprising removing the device-mounting adapter from the leash plug receiver, said device-mounting adapter being operable to be attached and detached from said leash plug receiver without damaging said surfboard, and allowing said surfboard leash plug to retain leash assembly without interruption.

16. The adapter system of claim 7, wherein said device-mounting member comprises a securing member, and said adapter system further comprises an extension member operable to be attached to said securing member at a first end thereof and to attach and support said device at a second end thereof, wherein said extension member elevates the position of said device relative to said upper surface of said surfboard, and said extension member comprises a flexible portion capable of absorbing vibrational energy.

17. A device mounting adapter system for attachment to a surfboard leash plug receiver, said adapter system comprising:
  a. a base system for engagement with an upper surface of a surfboard, said base system comprising
    (i) a base member having a passage and a base surface for interfacing with said upper surface of said surfboard, and
    (ii) an attachment member with an inferior end having an anchor for engaging an attachment bar within said surfboard leash plug receiver and a superior end for insertion into said passage of said base member, wherein said passage in said base member includes a fastening structure operable to be engaged by a second fastening structure on said superior end of said attachment member;
  b. a device-mounting member on said base member for engaging and supporting a device, and
  c. a fastening mechanism for engaging said superior end of said attachment member, wherein engagement of said fastening mechanism with said superior end of said attachment member secures said device mounting adapter system to said surfboard when said anchor structure is engaged with said attachment bar.

18. The adapter system of claim 17, wherein said inferior end of said attachment member has a hook-like shape for engaging with said attachment bar, said interior diameter of said hook-like shape being up to about 0.25 inch.

19. The adapter system of claim 17, wherein:
  i. said base surface has an outer diameter of at least about 2.0 inches;
  ii. said fastening member is a cap having a fastening receiver for engaging said superior end of said attachment member, wherein said fastening receiver engages with said superior end of said attachment member to secure said device mounting adapter system to said surfboard, and said fastening cap has a smooth, convex outer surface; and
  iii. an upper portion of said base member has an external diameter approximately equal to an interior diameter of said device-mounting member, and said upper portion has a height that is substantially equal to a height of said device-mounting member.

20. The adapter system of claim 17, wherein said device-mounting member comprises a securing member, and said adapter system further comprises an extension member operable to be attached to said securing member at a first end thereof and to attach and support said device at a second end thereof, wherein said extension member elevates the position of said device relative to said upper surface of said surfboard, and said extension member comprises a flexible portion capable of absorbing vibrational energy.

21. The adapter system of claim 17, wherein said device-mounting member is operable to be rotated around a central axis to a desired angular position.

22. The adapter system of claim 17, wherein said adapter system can be attached and detached from said attachment bar within said surfboard leash plug receiver without damaging or altering said surfboard or said leash plug receiver.

* * * * *